US012654153B2

(12) United States Patent
Zhao et al.

(10) Patent No.: US 12,654,153 B2
(45) Date of Patent: Jun. 16, 2026

(54) CARBON-SUPPORTED PLATINUM GROUP METAL CATALYST, PREPARATION METHOD THEREFOR AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Hong Zhao, Beijing (CN); Junfeng Rong, Beijing (CN); Houpeng Wang, Beijing (CN); Jiakang Zhang, Beijing (CN); Qian Peng, Beijing (CN); Xianrui Gu, Beijing (CN); Yunge Zhang, Beijing (CN); Nanhong Xie, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 653 days.

(21) Appl. No.: 18/043,307

(22) PCT Filed: Aug. 27, 2021

(86) PCT No.: PCT/CN2021/114870
§ 371 (c)(1),
(2) Date: Feb. 27, 2023

(87) PCT Pub. No.: WO2022/042667
PCT Pub. Date: Mar. 3, 2022

(65) Prior Publication Data
US 2023/0364587 A1 Nov. 16, 2023

(30) Foreign Application Priority Data

Aug. 27, 2020 (CN) .......................... 202010876796.2
Aug. 27, 2020 (CN) .......................... 202010877426.0
(Continued)

(51) Int. Cl.
*B01J 21/18* (2006.01)
*B01J 23/42* (2006.01)
*H01M 4/92* (2006.01)

(52) U.S. Cl.
CPC ............... *B01J 21/18* (2013.01); *B01J 23/42* (2013.01); *H01M 4/926* (2013.01)

(58) Field of Classification Search
CPC ........... B01J 21/18; B01J 23/42; C01B 32/05; H01M 4/92; H01M 4/923; H01M 4/926; H01M 2008/1095; Y02E 60/50
See application file for complete search history.

(56) References Cited

U.S. PATENT DOCUMENTS

2012/0070764 A1* 3/2012 Chung ................... B01J 27/043
546/10
2015/0141666 A1 5/2015 Chen et al.

FOREIGN PATENT DOCUMENTS

CN 104528685 A 4/2015
CN 108313999 A 7/2018
(Continued)

OTHER PUBLICATIONS

Zhang, Xin et al.; "Palladium Nanoparticles Supported on Nitrogen and Sulfur Dual-Doped Graphene as Highly Active Electrocatalysts for Formic Acid and Methanol Oxidation", ACS Applied Materials & Interfaces, vol. 8, No. 17; Apr. 15, 2016; ISSN:1944-8244; pp. 1-24.

(Continued)

*Primary Examiner* — Brian A McCaig
(74) *Attorney, Agent, or Firm* — NKL Law; Allen Xue

(57) ABSTRACT

A platinum-on-carbon catalyst, a preparation method therefor and the use thereof are provided. Among S2P spectral (Continued)

peaks thereof analyzed by means of XPS between 160 eV and 170 eV, the area of characteristic peaks (preferably a characteristic peak of thiophenic sulfur) located between 162 eV and 166 eV is more than 92%, or more than 95%, or more than 98%, or even only the characteristic peaks (preferably the characteristic peak of thiophenic sulfur) located between 162 eV and 166 eV. A carrier of the platinum-on-carbon catalyst is sulfur-doped conductive carbon black. The carrier of the platinum-on-carbon catalyst, i.e. conductive carbon black, is modified, and by controlling the doping form of the doping element, the mass specific activity and the electrochemical active area of the platinum-on-carbon catalyst are significantly improved. The stability and carbon corrosion resistance of the platinum-on-carbon catalyst can also be improved.

15 Claims, 27 Drawing Sheets

(30) Foreign Application Priority Data

| | | |
|---|---|---|
| Sep. 24, 2020 | (CN) .......................... | 202011012715.0 |
| Sep. 24, 2020 | (CN) .......................... | 202011012749.X |
| Oct. 26, 2020 | (CN) .......................... | 202011151992.X |
| Oct. 26, 2020 | (CN) .......................... | 202011151999.1 |

(56) References Cited

FOREIGN PATENT DOCUMENTS

| CN | 108554432 A | 9/2018 |
|---|---|---|
| CN | 110391087 A | 10/2019 |
| CN | 110627030 A | 12/2019 |

OTHER PUBLICATIONS

Li, Oi Lun et al.; "Enhanced Electrocatalytic Stability of Platinum Nanoparticles Supported on Sulfur-Doped Carbon using in-situ Solution Plasma", Scientific Reports, vol. 9, 12704; Sep. 3, 2019; ISSN:2045-2322 ; pp. 1-10.

Meng, Zhen et al.; "The Synthesis and Levulinic Acid Hydrogenation Performance of Ru Catalysts Supported on Sulfur/Nitrogen-doped Carbon Nanotubes"; A Dissertation Submitted for the Degree of master, South China University of Technology; Jun. 2018; pp. 1-97.

Zhang, Xin et al., "Palladium Nanoparticles Supported on Nitrogen and Sulfur Dual-Doped Graphene as Highly Active Electrocatalysts for Formic Acid and Methanol Oxidation", ACS Applied Materials & Interfaces, Apr. 15, 2016, vol. 08, No. 17, pp. 10858-10865.

Pereira, Viviane Santos et al., "PtRu Nanoparticles Supported on Phosphorous-Doped Carbon as Electrocatalysts for Methanol Electro-Oxidation", Electrocatalysis, Feb. 24, 2017, vol. 08, pp. 245-251.

* cited by examiner

CARBON-SUPPORTED PLATINUM GROUP METAL CATALYST, PREPARATION METHOD THEREFOR AND USE THEREOF

TECHNICAL FIELD

The present invention relates to a carbon-supported platinum group metal catalyst and process of producing the same and use thereof, in particular to a carbon-supported platinum group metal catalyst for a proton membrane hydrogen fuel cell, and a preparation method and use thereof.

BACKGROUND

The Oxygen Reduction Reaction (ORR) is a key reaction in the field of electrochemistry, for example, in fuel cells and metal air cells, Oxygen Reduction Reaction is a major factor affecting cell performance. The carbon material doped with atoms can be directly used as a catalyst for an oxygen reduction reaction. When used as an oxygen reduction catalyst, it has been reported in literatures that elements such as nitrogen, phosphorus, boron, sulfur, fluorine, chlorine, bromine, iodine, etc. are doped into a carbon material, wherein nitrogen has a radius close to that of carbon atoms and is easily incorporated into the carbon lattice, and thus is the most commonly used doping element. Although there are many reports of the doped carbon material directly used as a fuel cell catalyst, there is a large gap compared with the platinum on carbon catalyst.

To date, the most effective oxygen reduction catalyst is the platinum on carbon catalyst, but it still has disadvantages. On the other hand, the currently used commercial platinum on carbon catalyst has unsatisfactory platinum metal dispersion and is easy to agglomerate and deactivate, and the platinum surface area is obviously reduced with time due to platinum dissolution and agglomeration at the hydrogen fuel cell cathode, thereby affecting the service life of the fuel cell. The prior art mainly improves the performance of the platinum on carbon catalyst by controlling the particle size, morphology and structure of platinum and the specific surface area and pore structure of the support, there are also reports in the literature of improving the performance of platinum on carbon catalysts by modifying the carbon support.

The carbon support can improve the specific surface area of the catalyst, reduce the agglomeration of metal particles and improve the metal utilization rate. The increased platinum-supporting amount of the carbon support can result in the membrane electrode having thinner thickness and better performance, but when the platinum-supporting amount is greatly increased, the accumulation of platinum metal particles is easily caused, and the utilization rate of active sites is sharply reduced. In addition, the platinum supporting amount of the platinum on carbon catalyst of the hydrogen fuel cell in practical application is at least 20 wt %, or more, which is much more difficult to be produced compared with the chemical platinum on carbon catalyst (the platinum loading capacity is less than 5 wt %).

The problem of deactivation of platinum on carbon catalysts in proton exchange membrane fuel cells due to carbon corrosion has been highly interested in the art. In addition, platinum accelerates the carbon corrosion rate, and the greater the amount of platinum carried, the faster the carbon corrosion. On the one hand, more carbon support defect sites are beneficial to increasing the platinum supporting amount, but at the same time, carbon corrosion is intensified accordingly. On the other hand, increasing the degree of graphitization alleviates carbon corrosion, but also renders the carbon support surface chemically inert, making it difficult to uniformly disperse platinum on the carbon support.

The information disclosed in the foregoing Background section is only for enhanced understanding to background of the invention, and thus may include information that is not already known to a person of ordinary skill in the art.

SUMMARY OF THE INVENTION

The first purpose of the present invention is to provide a carbon-supported platinum group metal catalyst, which is capable of significantly improving specific activity by weight and electrochemical activity area, especially in the case of high platinum supporting amount.

The second purpose of the present invention is to improve the overall performance of the catalyst, in particular the stability of the specific activity by weight and the electrochemical activity area, on the basis of the aforementioned objects. The third purpose of the invention is to improve the carbon corrosion resistance of the carbon-supported platinum group metal catalyst based on the aforementioned purposes. The fourth purpose of the present invention is to provide a simple process for producing a carbon-supported platinum group metal catalyst in addition to the above purposes. Other purposes of the invention will be apparent from the detailed discussion and Examples of the invention.

To achieve one or more of the above purposes, the present invention provides technical solutions of the following aspects.

1. A carbon-supported platinum group metal catalyst, characterized in that, between 160 ev and 170 ev in the $S_{2P}$ spectrum peaks analyzed by XPS, the peak area between 162 ev and 166 ev accounts for greater than 92%, or greater than 95%, or greater than 98%; the support of the carbon-supported platinum group metal catalyst is conductive carbon black doped with sulfur; the carbon-supported platinum group metal catalyst comprises the platinum group metal in a content by weight of 20% to 70%, preferably 40% to 70%, more preferably 45% to 65%.

2. The carbon-supported platinum group metal catalyst according to aspect 1, characterized in that, between 160 ev to 170 ev, the peak area of any one characteristic peak located outside the range from 162 ev to 166 ev accounts for less than 5%, preferably less than 1%; or preferably, between 160 eV and 170 eV, there is only a characteristic peak between 162 eV and 166 eV being present.

3. The carbon-supported platinum group metal catalyst according to aspect 1, characterized in that bimodal peaks exist between 162 ev and 166 ev.

4. The carbon-supported platinum group metal catalyst according to aspect 1, characterized in that the conductive carbon black is a common conductive carbon black, a superconducting carbon black or an extra conductive carbon black.

5. The carbon-supported platinum group metal catalyst according to aspect 1, characterized in that the support of the carbon-supported platinum group metal catalyst is sulfur-boron doped conductive carbon black.

6. The carbon-supported platinum group metal catalyst according to aspect 5, characterized in that: in the $B_{1s}$ spectrum peaks by XPS analysis, there is not characteristic peak existing between 185 ev and 200 ev; and preferably, signals of $B_2O_3$ and B are detected out in a TG-MS test.

7. The carbon-supported platinum group metal catalyst according to aspect 1, characterized in that the support of the carbon-supported platinum group metal catalyst is sulfur-phosphorus doped conductive carbon black.

8. The carbon-supported platinum group metal catalyst according to aspect 7, characterized in that: in the $P_{2p}$ spectrum peaks by XPS analysis, there is not characteristic peak existing between 125 ev and 145 ev; and preferably signals of P, $P_2O_3$ and $P_2O_5$ are detected out in a TG-MS test.

9. The carbon-supported platinum group metal catalyst according to aspect 1, characterized in that the support of the carbon-supported platinum group metal catalyst is sulfur-phosphorus-boron doped conductive carbon black.

10. The carbon-supported platinum group metal catalyst according to aspect 9, characterized in that, in an XPS analysis, there is not characteristic peak of $B_{1s}$ existing between 185 ev and 200 ev and there is not characteristic peak of $P_{2p}$ existing between 125 ev and 145 ev; and preferably, signals of $B_2O_3$ and B are detected out in a TG-MS test and signals of P, $P_2O_3$ and $P_2O_5$ are detected out in a TG-MS test.

11. The carbon-supported platinum group metal catalyst according to aspect 1, characterized in that the platinum group metal is selected from platinum (Pt), palladium (Pd), rhodium (Rh), iridium (Ir), osmium (Os), and ruthenium (Ru), preferably from platinum, palladium, rhodium, and iridium, further preferably from platinum and palladium, for example, platinum.

12. The carbon-supported platinum group metal catalyst according to aspect 1, characterized in that the carbon-supported platinum group metal catalyst has a resistivity of <10 Ω·m, preferably <5 Ω·m, or preferably <2 Ω·m.

13. A hydrogen fuel cell, characterized in that the carbon-supported platinum group metal catalyst according to any one of aspects 1 to 12 is used in the anode and/or the cathode of the hydrogen fuel cell.

14. A carbon material, characterized in that the carbon material is a sulfur doped conductive carbon black; wherein between 160 ev and 170 ev in the $S_{2P}$ spectrum peaks analyzed by XPS, there are only characteristic peaks between 162 ev and 166 ev being present; and preferably, the carbon material has an oxygen content by weight of 4% or more, preferably 4% to 15% in XPS analysis.

Without being limited with any known theory, preferably, the characteristic peak between 162 ev and 166 ev is believed to be a characteristic peak of thiophenic sulfur, based on analysis of experimental data of characteristic peaks between 162 ev and 166 ev, e.g. as disclosed and discussed in the Examples of the present invention. In one embodiment, preferably, the characteristic peak of thiophenic sulfur is believed to be bimodal.

The heteroatoms and the carbon material have various combination modes, and various interactions are present between heteroatoms, and the combination modes of the heteroatoms with the carbon material and the interactions between the heteroatoms can be influenced by different preparation processes and raw materials and different operation steps and conditions in the doping process, so that the properties of the heteroatoms and the carbon materials are greatly different, and the functions of the heteroatoms and the carbon material are remarkably changed. In the field, how to control the binding mode of the heteroatom with the carbon material and the interaction between the heteroatoms is a difficulty for doping atoms. The research of the invention finds that when the conductive carbon black is doped, a carbon material with unique property can be manufactured by controlling the combination mode of the heteroatom with the conductive carbon black and the interaction between the heteroatoms, thereby obviously improving the specific activity and the electrochemical activity area, improving the comprehensive performance of the catalyst, improving the stability of the specific activity and the electrochemical activity area, improving the carbon corrosion resistance of the carbon-supported platinum group metal catalyst, and the like.

Compared with the prior art, the invention can achieve the following beneficial technical effects.

I. The invention produces a type of conductive carbon black with atoms-doped surface with unique properties by a simple process, compared with the existing doped carbon material, the sulfur doped on the surface of the conductive carbon black only exists in the form of thiophenic sulfur, and the nitrogen doped on the surface can only exist in the form of pyrrolic nitrogen, and the characteristics can obviously improve the specific activity by weight and the electrochemical activity area of the carbon-supported platinum group metal catalyst.

Furthermore, the surface of the conductive carbon black can be doped with phosphorus and/or boron, wherein phosphorus doped on the surface can only have a characteristic peak between 132.5 ev and 134.5 ev, and boron doped on the surface can only have a characteristic peak between 189 ev and 191 ev, so that the comprehensive performance of the carbon-supported platinum group metal catalyst can be improved, and particularly the weight specific activity and the stability of the electrochemical active area are improved.

Furthermore, the surface of the conductive carbon black can be doped with multiple (for example, three or four) hetero elements, which is beneficial to improving the carbon corrosion resistance of the carbon-supported platinum group metal catalyst.

II. The doped conductive carbon black of the present invention is suitable for producing carbon-supported platinum group metal catalysts with high supporting amount of the platinum group metal, and has excellent comprehensive catalytic performance and carbon corrosion resistance when the platinum group metal supporting amount reaches 70 wt %.

III. The supporting amount of the platinum group metal of the carbon-supported platinum group metal catalyst for the hydrogen fuel cell in practical application is generally 20 wt % or more, and manufacturing catalysts with high platinum group metal supporting amount with excellent performance is very difficult. The chemical reduction process has simple process, but the utilization rate of the platinum group metal is low, and the catalytic activity is relatively low. However, the doped conductive carbon black produced by the present invention is used as a support, and a chemical reduction process in an aqueous phase is adopted, so that a catalyst with both high platinum supporting amount having both good specific activity by weight and stability can be easily produced.

The present invention provides, by way of example, the following illustrative embodiments, or combinations thereof:

A first series of exemplary embodiments of the present invention, comprising:

1, A platinum on carbon catalyst, characterized in that between 160 ev and 170 ev in the $S_{2P}$ spectrum peaks as analyzed by XPS, there is only characteristic peak located between 162 ev and 166 ev being present (preferably a characteristic peak of thiophenic sulfur).

2, The platinum on carbon catalyst according to exemplary embodiment 1, characterized in that platinum is comprised in an content by weight of 20% to 70%, preferably 40% to 70%, based on the weight of the catalyst.

3, The platinum on carbon catalyst according to exemplary embodiment 1, characterized in that the characteristic peaks of the thiophenic sulfur are positioned at 163.9±0.5 ev and 165.1±0.5 ev.

4, The platinum on carbon catalyst according to exemplary embodiment 1, characterized in that the platinum on carbon catalyst has a resistivity of <10.0 Ω·m.

5, The platinum on carbon catalyst according to exemplary embodiment 1, characterized in that the support of the platinum on carbon catalyst is sulfur doped conductive carbon black, sulfur doped graphene, or sulfur doped carbon nanotube.

6, The platinum on carbon catalyst according to exemplary embodiment 5, characterized in that the conductive carbon black is EC-300J, EC-600JD, ECP600JD, VXC72, Black pears 2000, PRINTEX XE2-B, PRINTEX L6, or HIBLAXK 40B 2.

7, A process of producing a platinum on carbon catalyst, comprising:
(1) a step of producing a sulfur doped carbon material: placing the carbon material in an inert gas containing thiophene, heating to 1000-1500° C. at a temperature-rising rate of 8° C./min-15° C./min, followed by a thermostatic treatment for 0.5-10 h, to obtain a sulfur doped carbon material;
(2) a step of supporting platinum using the sulfur doped carbon material obtained in (1) as a support.

8, The process according to exemplary embodiment 7, characterized in that the weight ratio of the carbon material to thiophene, calculated as the sulfur element comprised in thiophene, is 20:1 to 2:1.

9, The process according to exemplary embodiment 7, characterized in that the thermostatic treatment is carried out at a temperature of 1150° C. to 1450° C.

10, The process according to exemplary embodiment 7, characterized in that the carbon material is conductive carbon black, graphene, or carbon nanotubes.

11, The process according to exemplary embodiment 10, characterized in that the conductive carbon black is EC-300J, EC-600JD, ECP-600JD, VXC72, Black pearls 2000, PRINTEX XE2-B, PRINTEX L6 or HIBLAXAXK 40B2.

12, The process according to exemplary embodiment 7, characterized in that the carbon material has an oxygen content by weight of more than 4% in XPS analysis.

13, The process according to exemplary embodiment 7, characterized in that the carbon material has a resistivity of less than 10 Ω·m.

14, The process according to exemplary embodiment 7, characterized in that the carbon material has a specific surface area of 10 $m^2$/g to 2000 $m^2$/g.

15, The process according to exemplary embodiment 7, characterized in that the step of supporting platinum comprises:
(a) dispersing the sulfur doped carbon material obtained in the (1) and a platinum group metal precursor in an aqueous phase, and adjusting the pH value to 8-12;
(b) adding a reducing agent for reduction; and (c) separating out the solid, and subjecting to post-treatment to obtain the platinum on carbon catalyst.

16, The process according to exemplary embodiment 15, characterized in that the platinum group metal precursor is chloroplatinic acid, potassium chloroplatinate, or sodium chloroplatinate; and the concentration of the platinum group metal precursor is 0.5 mol/L-5 mol/L.

17, The process according to the exemplary embodiment 15, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; or the reduction is carried out at a temperature of 60° C.-90° C. for 4 h-15 h.

18, A platinum on carbon catalyst, characterized in that the catalyst is produced by the process according to any one of exemplary embodiments 7 to 17.

19, A hydrogen fuel cell, characterized in that the platinum on carbon catalyst according to any one of exemplary embodiments 1 to 6 and 18 is used in the anode and/or the cathode of the hydrogen fuel cell.

A second series of exemplary embodiments of the present invention comprise:

1. A sulfur-boron doped carbon material, characterized in that between 160 ev and 170 ev in the $S_{2P}$ spectrum peaks as analyzed by XPS, there is only characteristic peak located between 162 ev and 166 ev being present (preferably a characteristic peak of thiophenic sulfur).

2. The sulfur-boron doped carbon material according to exemplary embodiment 1, characterized in that in the $B_{1s}$ spectrum peaks analyzed by XPS, there are two characteristic peaks present between 191 ev and 193 ev and there is not other characteristic peak present between 185 ev and 200 ev.

3. The sulfur-boron doped carbon material according to exemplary embodiment 1, characterized in having a sulfur content by weight of 0.1% to 5%, and a boron content by weight of 0.1% to 5%, in XPS analysis.

4. The sulfur-boron doped carbon material according to exemplary embodiment 1, characterized in that the sulfur-boron doped carbon material is sulfur-boron doped graphene, sulfur-boron doped carbon nanotubes, or sulfur-boron doped conductive carbon black, 5. The sulfur-boron doped carbon material according to exemplary embodiment 4, characterized in that the conductive carbon black is EC-300J, EC-600JD, ECP-600JD, VXC72, Black pears 2000, PRINTEX XE2-B, PRINTEX L6, or HIBLAXK 40B2.

6. A process for producing a sulfur-boron doped carbon material, comprising: contacting a sulfur doped carbon material with a boron source, and treating in an inert gas at 300° C.-800° C. for 0.5 h-10 h, to obtain the sulfur-boron doped carbon material.

7. The process for producing the sulfur-boron doped carbon material according to exemplary embodiment 6, characterized in that the sulfur doped carbon material is produced by: contacting a carbon material with a sulfur source, and treating in an inert gas at 400° C.-1500° C. for 0.5 h-10 h, to obtain the sulfur doped carbon material.

8. The process for producing the sulfur-boron doped carbon material according to exemplary embodiment 7, characterized in that during producing the sulfur doped carbon material, the weight ratio of the carbon material to the sulfur source, calculated as the sulfur element comprised in the sulfur source, is 20:1 to 2:1.

9. The process for producing the sulfur-boron doped carbon material according to exemplary embodiment 7, characterized in that the weight ratio of the carbon material to the boron source, calculated as the boron element comprised in the boron source, is 100:1 to 5:1.

10. The process for producing the sulfur-boron doped carbon material according to exemplary embodiment 6, characterized in that the boron source is one or more of boric acid and borate.

11. The process for producing the sulfur-boron doped carbon material according to exemplary embodiment 7, characterized in that the sulfur source is one or more of elemental sulfur, hydrogen sulfide, carbon disulfide, sodium thiosulfate, thiophene, sulfate, and sulfonate.

12. The process for producing the sulfur-boron doped carbon material according to exemplary embodiment 7, characterized in that the carbon material has a resistivity of less than 10 $\Omega \cdot m$, a specific surface area of 10 $m^2/g$ to 2000 $m^2/g$, and an oxygen content by weight of greater than 4%.

13. A sulfur-boron doped carbon material, characterized in that the material is produced by the process according to any one of exemplary embodiments 6 to 12.

14. Use of the sulfur-boron doped carbon material described in any one of embodiments 1 to 5 and 13 as an electrode material in electrochemistry.

15. A platinum on carbon catalyst, characterized in comprising a carbon support and a platinum metal supported on the carbon support, wherein the carbon support is a sulfur-nitrogen doped carbon material; and between 160 ev and 170 ev in the $S_{2P}$ spectrum peaks of the platinum on carbon catalyst as analyzed by XPS, there is only a characteristic peak positioned between 162 ev and 166 ev (preferably a characteristic peak of thiophenic sulfur).

16. The platinum on carbon catalyst according to exemplary embodiment 15, characterized in that in the $B_{1s}$ spectrum peaks as analyzed by XPS, there is not characteristic peak present between 185 ev and 200 ev.

17. A process for producing a platinum on carbon catalyst, comprising:

(1) A step of producing a sulfur-boron doped carbon material: contacting a sulfur doped carbon material with a boron source, and treating in an inert gas at 300° C.-800° C. for 0.5 h-10 h, to obtain the sulfur-boron doped carbon material;

(2) a step of supporting platinum using the sulfur-boron doped carbon material obtained in (1) as a support.

18. The process for producing a platinum on carbon catalyst according to exemplary embodiment 17, characterized in that the sulfur doped carbon material is produced by: contacting a carbon material with a sulfur source, and treating in an inert gas at 400° C.-1500° C. for 0.5 h-10 h, to obtain the sulfur doped carbon material.

19. The process for producing a platinum on carbon catalyst according to exemplary embodiment 17, characterized in that the step of supporting platinum comprises:

(a) dispersing the sulfur-boron doped carbon material obtained in the (1) and a platinum group metal precursor in an aqueous phase, and adjusting the pH value to 8-12;

(b) adding a reducing agent for reduction; and (c) separating out the solid, and subjecting to post-treatment to obtain the platinum on carbon catalyst.

20. The process for producing a platinum on carbon catalyst according to exemplary embodiment 19, characterized in that, in (a), the platinum precursor is chloroplatinic acid, potassium chloroplatinate, or sodium chloroplatinate; and the concentration of the platinum precursor is 0.5 mol/L-5 mol/L 21. The process for producing a platinum on carbon catalyst according to exemplary embodiment 19, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; and the reduction is carried out at a temperature of 60° C.-90° C. for 4 h-15 h.

22. A platinum on carbon catalyst, characterized in being produced by the process according to any one of exemplary embodiments 17 to 21.

23. A hydrogen fuel cell, characterized in that the platinum on carbon catalyst according to any one of exemplary embodiments 15 or 22 is used in the anode and/or the cathode of the hydrogen fuel cell.

A third series of exemplary embodiments of the present invention comprise:

1. A sulfur-phosphorus doped carbon material, characterized in that between 160 ev and 170 ev in the $S_{2P}$ spectrum peaks as analyzed by XPS, there is only characteristic peak located between 162 ev and 166 ev being present (preferably a characteristic peak of thiophenic sulfur).

2. The sulfur-phosphorus doped carbon material according to exemplary embodiment 1, characterized in that in the $P_{2p}$ spectrum peaks as analyzed by XPS, there is one characteristic peak present between 125 ev and 145 ev.

3. The sulfur-phosphorus doped carbon material according to exemplary embodiment 1, characterized in having a sulfur content by weight of 0.01% to 5%, and a phosphorus content by weight of 0.01% to 5%, in XPS analysis.

4. The sulfur-phosphorus doped carbon material according to exemplary embodiment 1, characterized in that the sulfur-phosphorus doped carbon material is sulfur-phosphorus doped graphene, sulfur-phosphorus doped carbon nanotubes, or sulfur-phosphorus doped conductive carbon black, 5. The sulfur-phosphorus doped carbon material according to exemplary embodiment 4, characterized in that the conductive carbon black is EC-300J, EC-600JD, ECP-600JD, VXC72, Black pears 2000, PRINTEX XE2-B, PRINTEX L6, or HIBLAXK 40B2.

6. A process of producing a sulfur-phosphorus doped carbon material, comprising:

(1) A step of doping phosphorus: contacting a carbon material with a phosphorus source, and treating in an inert gas at 300° C.-800° C. for 0.5 h-10 h, to obtain a phosphorus doped carbon material;

(2) a step of doping sulfur: contacting the phosphorus doped carbon material in (1) with a sulfur source, and treating in an inert gas at 400° C.-1500° C. for 0.5 h-10 h, to obtain the sulfur-phosphorus doped carbon material;

7. The process according to exemplary embodiment 6, characterized in that the phosphorus source is one or more selected from phosphoric acid, phosphate, pyrophosphate, polyphosphate, hydrophosphate, dihydric phosphate, phosphite, and hypophosphite.

8. The process according to exemplary embodiment 6, characterized in that the weight ratio of the carbon material to the phosphorus source, calculated as the phosphorus element comprised in the phosphorus source, is 10000:1 to 20:1.

9. The process according to the exemplary embodiment 6, characterized in that the sulfur source is elemental sulfur.

10. The process according to exemplary embodiment 6, characterized in that the weight ratio of the carbon material to the sulfur source, calculated as the sulfur element comprised in the sulfur source, is 20:1 to 2:1.

11. The process according to exemplary embodiment 6, characterized in that, in (2), the temperature is 1000° C. to 1500° C.

12. The process according to exemplary embodiment 6, characterized in that in (1), the carbon material has a resistivity of less than 10 Ω·m, a specific surface area of 10 $m^2/g$ to 2000 $m^2/g$, and an oxygen content by weight of greater than 4% as analyzed by XPS.

13. The process according to exemplary embodiment 6, characterized in that in (1), the carbon material is contacted with the phosphorus source in a manner that: the carbon material is immersed in an aqueous solution of a phosphorus source and then dried.

14. A sulfur-phosphorus doped carbon material, characterized in being produced by the process according to any one of exemplary embodiments 6 to 13.

15. Use of sulfur-phosphorus doped carbon material described in any one of embodiments 1 to 5 and 14 as an electrode material in electrochemistry.

16. A platinum on carbon catalyst, characterized in comprising a carbon support and a platinum metal supported on the carbon support, characterized in that the carbon support is a sulfur-phosphorus doped carbon material; and between 160 ev and 170 ev in the $S_{2P}$ spectrum peaks of the platinum on carbon catalyst as analyzed by XPS, there is only a characteristic peak positioned between 162 ev and 166 ev (preferably a characteristic peak of thiophenic sulfur).

17. The platinum on carbon catalyst according to exemplary embodiment 16, characterized in that in the $P_{2p}$ spectrum peaks as analyzed by XPS, there is not characteristic peak present between 125 ev and 145 ev.

18. A process for producing a platinum on carbon catalyst, comprising:

(1) A step of producing a phosphorus doped carbon material: contacting a carbon material with a phosphorus source, and treating in an inert gas at 300° C.-800° C. for 0.5 h-10 h, to obtain a phosphorus doped carbon material;

(2) a step of producing a sulfur-phosphorus doped carbon material: contacting the phosphorus doped carbon material in (1) with a sulfur source, and treating in an inert gas at 400° C.-1500° C. for 0.5 h-10 h, to obtain the sulfur-phosphorus doped carbon material;

(3) a step of supporting platinum using the sulfur-phosphorus doped carbon material obtained in (2) as a support.

19. The process for producing a platinum on carbon catalyst according to exemplary embodiment 18, characterized in that the step of supporting platinum comprises:

(a) dispersing the sulfur-phosphorus doped carbon material obtained in the (2) and a platinum group metal precursor in an aqueous phase, and adjusting the pH value to 8-12;

(b) adding a reducing agent for reduction; and (c) separating out the solid, and subjecting to post-treatment to obtain the platinum on carbon catalyst.

20. The process for producing a platinum on carbon catalyst according to exemplary embodiment 19, characterized in that, in (a), the platinum precursor is chloroplatinic acid, potassium chloroplatinate, or sodium chloroplatinate; and the concentration of the platinum precursor is 0.5 mol/L-5 mol/L 21. The process for producing a platinum on carbon catalyst according to the exemplary embodiment 19, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; or the reduction is carried out at a temperature of 60° C.-90° C. for 4 h-15 h.

22. A platinum on carbon catalyst, characterized in being produced by the process according to any one of exemplary embodiments 18 to 21.

23. A hydrogen fuel cell, characterized in that the platinum on carbon catalyst according to any one of exemplary embodiments 16 or 22 is used in the anode and/or the cathode of the hydrogen fuel cell.

A fourth series of exemplary embodiments of the present invention comprise:

1. A sulfur-phosphorus-boron doped carbon material, characterized in that between 160 ev and 170 ev in the $S_{2P}$ spectrum peaks as analyzed by XPS, there is only characteristic peak located between 162 ev and 166 ev being present (preferably a characteristic peak of thiophenic sulfur).

2. The sulfur-phosphorus-boron doped carbon material according to exemplary embodiment 1, characterized in that in the $B_{1s}$ spectrum peaks as analyzed by XPS, there is a characteristic peak present between 190.2 ev and 191.2 ev.

3. The sulfur-phosphorus-boron doped carbon material according to exemplary embodiment 1, characterized in that the sulfur-phosphorus-boron doped carbon material is sulfur-phosphorus-boron doped graphene, sulfur-phosphorus-boron doped carbon nanotubes, or sulfur-phosphorus-boron doped conductive carbon black, 4. The sulfur-phosphorus-boron doped carbon material according to exemplary embodiment 3, characterized in that the conductive carbon black is EC-300J, EC-600JD, ECP-600JD, VXC72, Black pears 2000, PRINTEX XE2-B, PRINTEX L6, or HIBLAXK 40B2.

5. The sulfur-phosphorus-boron doped carbon material according to exemplary embodiment 1, characterized in having a sulfur content by weight of 0.01% to 4%, a phosphorus content by weight of 0.01% to 4%, and a boron content by weight of 0.01%-4% in XPS analysis.

6. A process for doping a carbon material, comprising: (1) contacting firstly a carbon material with a phosphorus source and a boron source, and treating in an inert gas at 300° C.-800° C. for 0.5 h-10 h; (2) then contacting with a sulfur source, and treating in an inert gas at 1000° C.-1500° C. for 0.5 h-10 h.

7. The process for doping the carbon material according to the exemplary embodiment 7, characterized in that the sulfur source is elemental sulfur.

11

8. The process for doping the carbon material according to exemplary embodiment 7, characterized in that the weight ratio of the carbon material to the sulfur source, calculated as the sulfur element comprised in the sulfur source, is 20:1 to 2:1.

9. The process for doping the carbon material according to exemplary embodiment 7, characterized in that the phosphorus source is one or more selected from phosphoric acid, phosphate, pyrophosphate, polyphosphate, hydrophosphate, dihydric phosphate, phosphite, and hypophosphite.

10. The process for doping the carbon material according to exemplary embodiment 7, characterized in that the weight ratio of the carbon material to the phosphorus source, calculated as the phosphorus element comprised in the phosphorus source, is 10000:1 to 10:1.

11. The process for doping the carbon material according to exemplary embodiment 7, characterized in that the boron source is one or more of boric acid and borate.

12. The process according to exemplary embodiment 7, characterized in that the weight ratio of the carbon material to the boron source, calculated as the boron element comprised in the boron source, is 10000:1 to 10:1.

13. A sulfur-phosphorus-boron doped carbon material, characterized in being produced by the process according to any one of exemplary embodiments 6 to 12.

14. Use of the sulfur-phosphorus-boron doped carbon material described in any one of embodiments 1 to 5 and 13 as an electrode material in electrochemistry.

15. A platinum on carbon catalyst, comprising a carbon support and a platinum metal supported on the carbon support, characterized in the carbon support is a sulfur-phosphorus-boron doped carbon material; and between 160 ev and 170 ev in the $S_{2P}$ spectrum peaks of the platinum on carbon catalyst as analyzed by XPS, there is only a characteristic peak positioned between 162 ev and 166 ev (preferably a characteristic peak of thiophenic sulfur).

16. The platinum on carbon catalyst according to exemplary embodiment 15, characterized in that in XPS analysis, there is not $B_{1s}$ characteristic peak between 185 ev and 200 ev and there is not $P_{2p}$ characteristic peak between 125 ev and 145 ev.

17. The platinum on carbon catalyst according to exemplary embodiment 15, characterized in that the carbon support is a boron-phosphorous-boron doped carbon material according to any one of exemplary embodiments 1 to 6 and 16.

18. A process for producing a platinum on carbon catalyst, comprising:

A step of producing carbon support, comprising: (1) contacting firstly a carbon material with a phosphorus source and a boron source, and treating in an inert gas at 300° C.-800° C. for 0.5 h-10 h; then contacting with a sulfur source, and treating in an inert gas at 1000° C.-1500° C. for 0.5 h-10 h, to obtain the carbon support;

(2) a step of supporting platinum using the carbon support obtained in (1).

19. The process according to exemplary embodiment 18, characterized in that the step (2) of supporting the platinum group metal comprises:

(a) dispersing the carbon support obtained in the (1) and a platinum group metal precursor in an aqueous phase, and adjusting the pH value to 8-12;

(b) adding a reducing agent for reduction; and

(c) separating out the solid, and subjecting to post-treatment to obtain the platinum on carbon catalyst.

20. The process for producing a platinum on carbon catalyst according to exemplary embodiment 22, characterized in that, in (a), the platinum precursor is chloroplatinic acid, potassium chloroplatinate, or sodium chloroplatinate; and the concentration of the platinum precursor is 0.5 mol/L-5 mol/L 21. The process for producing a platinum on carbon catalyst according to the exemplary embodiment 22, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; or the reduction is carried out at a temperature of 60° C.-90° C. for 4 h-15 h.

22. A platinum on carbon catalyst, characterized in that the catalyst is produced by the process according to any one of exemplary embodiments 18 to 21.

23. A hydrogen fuel cell, characterized in that the platinum on carbon catalyst according to any one of exemplary embodiments 15 to 17 and 22 is used in the anode and/or the cathode of the hydrogen fuel cell.

A fifth series of exemplary embodiments of the present invention comprise:

1. A sulfur doped carbon material, characterized in that, between 160 ev and 170 ev in the $S_{2P}$ spectrum peaks thereof as analyzed by XPS, there is only a characteristic peak positioned between 162 ev and 166 ev (preferably a characteristic peak of thiophenic sulfur).

2. The sulfur doped carbon material according to exemplary embodiment 1, characterized in that the sulfur doped carbon material has a resistivity of <10.0 Ω·m.

3. The sulfur doped carbon material according to exemplary embodiment 1, characterized in that the sulfur doped carbon material has a sulfur content by weight of 0.1% to 10% in XPS analysis.

4. The sulfur doped carbon material according to exemplary embodiment 1, characterized in that the sulfur doped carbon material has an oxygen content by weight of greater than 4% in XPS analysis.

5. The sulfur doped carbon material according to exemplary embodiment 1, characterized in that the sulfur doped carbon material has a specific surface area of 10 $m^2$/g to 2000 $m^2$/g.

6. The sulfur doped carbon material according to exemplary embodiment 1, characterized in that the sulfur doped carbon material is sulfur doped conductive carbon black, sulfur doped graphene, or sulfur doped carbon nanotubes.

7. A carbon support for a platinum on carbon catalyst, characterized in that the carbon support is a sulfur doped conductive carbon black, wherein between 160 ev and 170 ev in the $S_{2P}$ spectrum peaks thereof as analyzed by XPS, there is only a characteristic peak positioned between 162 ev and 166 ev (preferably a characteristic peak of thiophenic sulfur);

having an oxygen content by weight of 4% to 15%, a sulfur content by weight of 0.2%-3% in XPS analysis; and having a specific surface area of 200 $m^2$/g-2000 $m^2$/g.

8. The carbon support according to exemplary embodiment 7, characterized in that the conductive carbon black is EC-300J, EC-600JD, ECP-600JD, VXC72, Black pears 2000, PRINTEX XE2-B, PRINTEX L6, or HIBLAXK 40B2.

9. A process for producing a sulfur doped carbon material, comprising: placing the carbon material in an inert gas containing thiophene, heating to 1000° C.-1500° C. at a temperature-rising rate of 8° C./min-15° C./min, followed by a thermostatic treatment for 0.5-10 h, to obtain the sulfur doped carbon material;

10. The process according to exemplary embodiment 9, characterized in that the weight ratio of the carbon material to thiophene, calculated as the sulfur element comprised in thiophene, is 20:1 to 2:1.

11. The process according to exemplary embodiment 9, characterized in that the thermostatic treatment is carried out at a temperature of 1150° C. to 1450° C.

12. Use of the sulfur doped carbon material or the carbon support described in any one of embodiments 1 to 8 as an electrode material in electrochemistry.

13. A fuel cell, characterized in using the sulfur doped carbon material or the carbon support according to any one of exemplary embodiments 1 to 8.

14. The fuel cell according to exemplary embodiment 13, characterized in that the fuel cell is a hydrogen fuel cell.

15. A metal-air cell, characterized in using the sulfur doped carbon material or the carbon support according to any one of exemplary embodiments 1 to 8.

16. The metal-air cell according to exemplary embodiment 15, characterized in that the metal-air cell is a lithium-air cell.

A sixth series of exemplary embodiments of the present invention comprise:

1. A doped carbon material, characterized in that, between 160 ev and 170 ev in the $S_{2P}$ spectrum peaks thereof as analyzed by XPS, there is only a characteristic peak positioned between 162 ev and 166 ev (preferably a characteristic peak of thiophenic sulfur).

2. The doped carbon material according to exemplary embodiment 1, characterized in that there are three characteristic peaks between 189 ev and 194 ev in the $B_{1s}$ spectrum peaks as analyzed by XPS.

3. The doped carbon material according to exemplary embodiment 1, characterized in that the carbon material is a sulfur-nitrogen-boron doped conductive carbon black.

4. The doped carbon material according to exemplary embodiment 5, characterized in that the conductive carbon black is EC-300J, EC-600JD, ECP-600JD, VXC72, Black pears 2000, PRINTEX XE2-B, PRINTEX L6, or HIBLAXK 40B2.

5. The doped carbon material according to exemplary embodiment 1, characterized in having a sulfur content by weight of 0.1%-6%, a nitrogen content by weight of 0.01%-6%, and a boron content by weight of 0.01%-6% in XPS analysis.

6. A process of doping a carbon material, comprising: contacting a carbon material with a sulfur source, a nitrogen source and a boron source, and treating in an inert gas at 1000° C.-1500° C. for 0.5 h-10 h, to obtain the doped carbon material.

7. The process according to exemplary embodiment 7, characterized in that the weight ratio of the carbon material to the sulfur source, calculated as the sulfur element comprised in the sulfur source, is 20:1 to 2:1.

8. The process according to exemplary embodiment 7, characterized in that the weight ratio of the carbon material to the nitrogen source, calculated as the nitrogen element comprised in the nitrogen source, is 500:1 to 5:1.

9. The process according to exemplary embodiment 7, characterized in that the weight ratio of the carbon material to the boron source, calculated as the boron element comprised in the boron source, is 10000:1 to 10:1.

10. The process according to exemplary embodiment 7, characterized in that the sulfur source is elemental sulfur.

11. The process according to the exemplary embodiment 7, characterized in that the nitrogen source is aqueous ammonia or urea.

12. The process for doping the carbon material according to exemplary embodiment 7, characterized in that the boron source is one or more of boric acid and borate.

13. A doped carbon material, characterized in that the material is produced by the process according to any one of exemplary embodiments 7 to 13.

14. Use of the doped carbon material described in any one of embodiments 1 to 6 and 14 as an electrode material in electrochemistry.

15. A platinum on carbon catalyst, characterized in that, between 395 ev and 405 ev in the Nis spectrum peaks as analyzed by XPS, the peak area of those between 397.5 ev and 398.5 ev accounts for 60% or more of the total area of the all characteristic peaks.

16. The platinum on carbon catalyst according to exemplary embodiment 16, characterized in that, between 160 ev and 170 ev in the $S_{2P}$ spectrum peaks thereof as analyzed by XPS, there is only a characteristic peak positioned between 162 ev and 166 ev (preferably a characteristic peak of thiophenic sulfur).

17. The platinum on carbon catalyst according to exemplary embodiment 16, characterized in that the carbon support is a sulfur-nitrogen-boron doped carbon material.

18. The platinum on carbon catalyst according to exemplary embodiment 16, characterized in that the carbon support is a doped carbon material according to any one of exemplary embodiments 1 to 6 and 14.

19. A process of producing a platinum on carbon catalyst, comprising:

(1) a step of doping a carbon material: contacting a carbon material with a sulfur source, a nitrogen source and a boron source, and treating in an inert gas at 1000° C.-1500° C. (preferably thermostatic treatment) for 0.5 h-10 h, to obtain the doped carbon material;

(2) a step of supporting platinum using the doped carbon material obtained in the (1) as a support.

20. The process for producing a platinum on carbon catalyst according to exemplary embodiment 21, characterized in that the step of supporting platinum comprises:

(a) dispersing the doped carbon material obtained in the (1) and a platinum precursor in an aqueous phase, and adjusting the pH value to 8-12;

(b) adding a reducing agent for reduction; and (c) separating out the solid, and subjecting to post-treatment to obtain the platinum on carbon catalyst.

21. The process for producing a platinum on carbon catalyst according to exemplary embodiment 21, characterized in that, in (a), the platinum precursor is chloroplatinic acid, potassium chloroplatinate, or sodium chloroplatinate; and the concentration of the platinum precursor is 0.5 mol/L-5 mol/L 22. The process for producing a platinum on carbon catalyst according to the exemplary embodiment 21, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; or the reduction is carried out at a temperature of 60° C.-90° C. for 4 h-15 h.

23. A platinum on carbon catalyst, characterized in that the catalyst is produced by the process according to any one of exemplary embodiments 20 to 23.

24. A hydrogen fuel cell, characterized in that the platinum on carbon catalyst according to any one of exemplary embodiments 16 to 19 and 24 is used in the anode and/or the cathode of the hydrogen fuel cell.

Additional features and advantages of the invention will be illustrated in the embodiments which follows.

DESCRIPTION OF DRAWINGS

Implementing Solution I

Implementing Solution VI

Figure 2A:
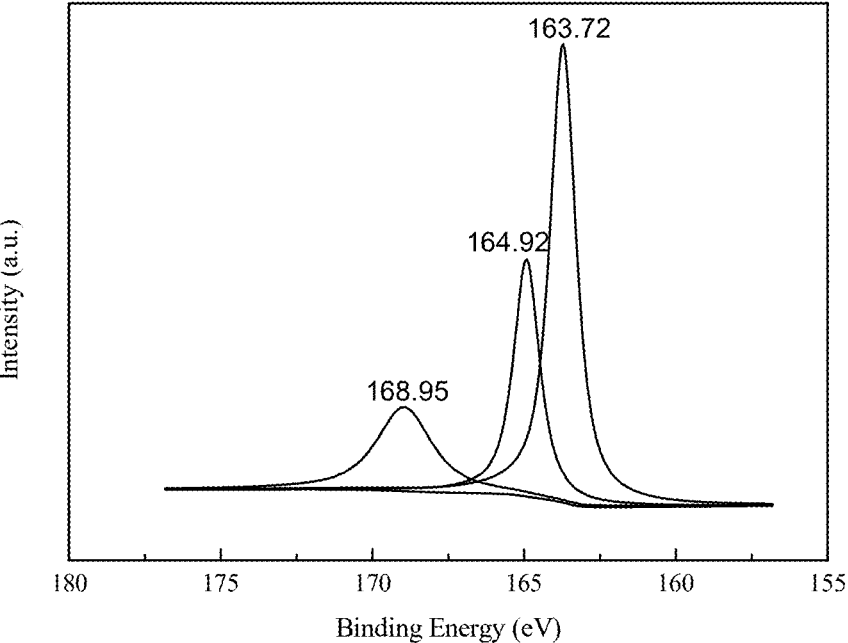

FIG. 2A shows an XPS spectrum of sulfur of the sulfur doped carbon material of Example VI-1.

Figure 2B:
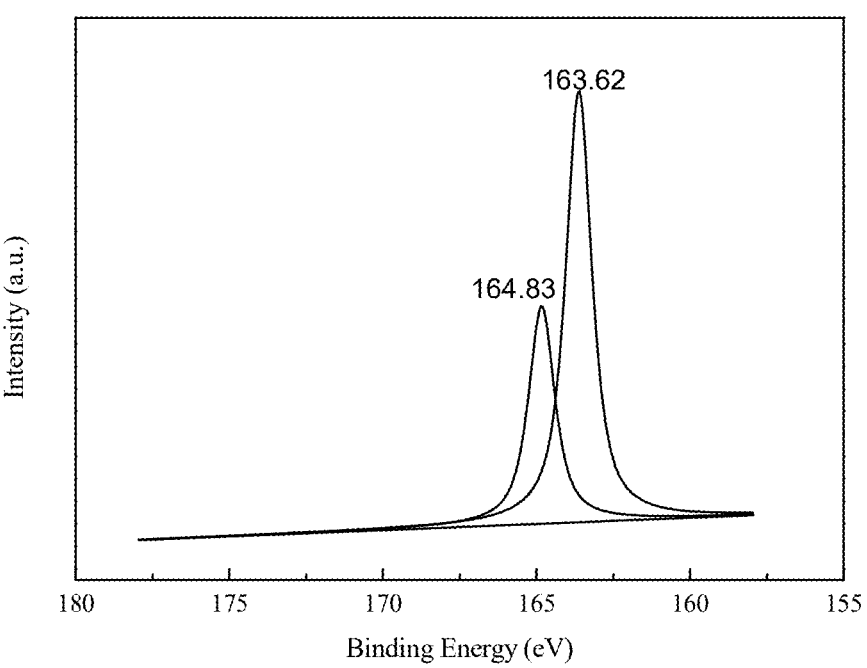

FIG. 2B shows an XPS spectrum of sulfur of the sulfur-boron doped carbon material of Example VI-1.

Figure 2C:
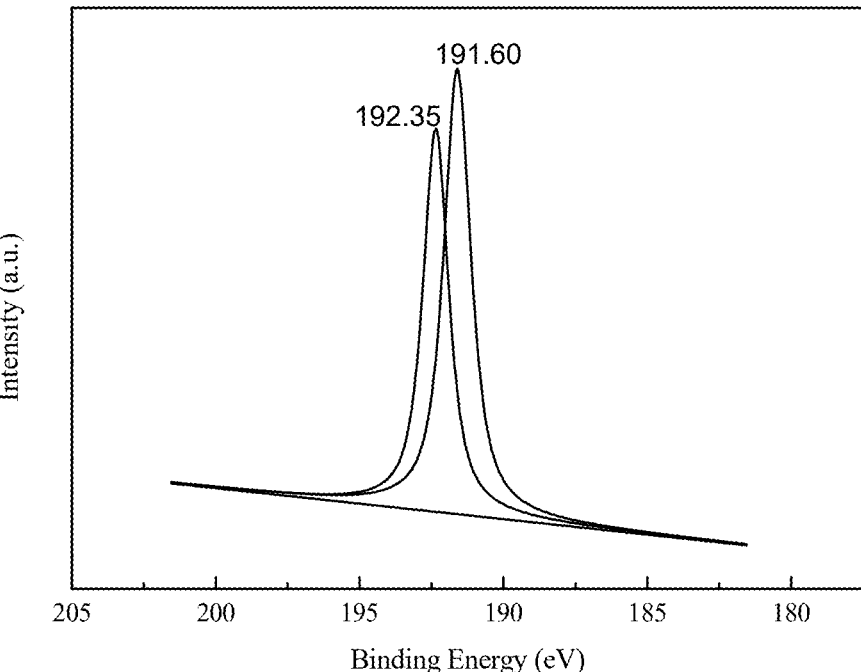

FIG. 2C shows an XPS spectrum of boron of the sulfur-boron doped carbon material of Example VI-1.

Figure 2D:
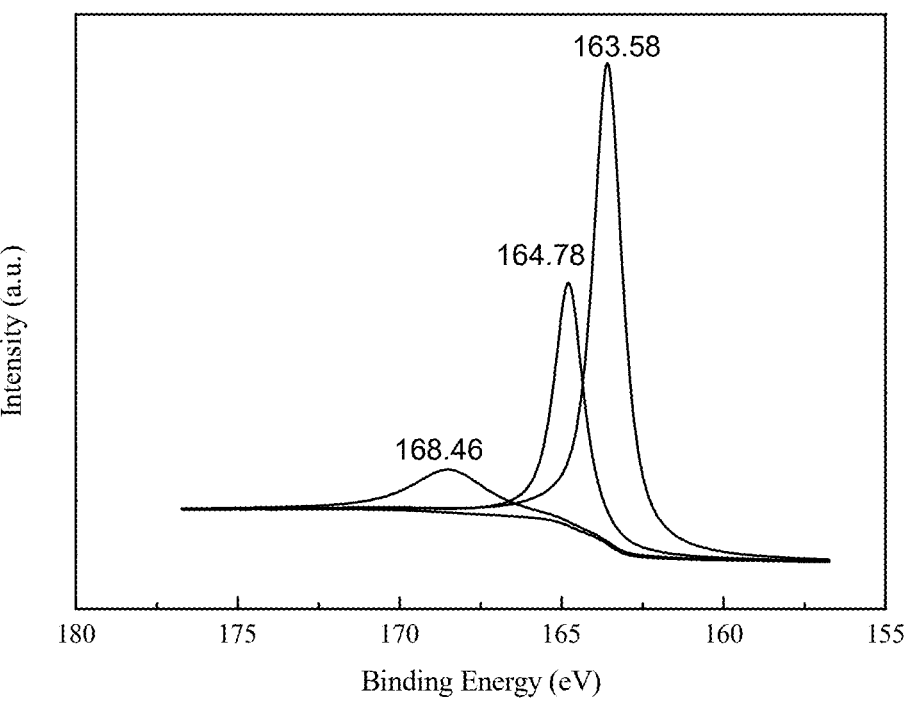

FIG. 2D shows an XPS spectrum of sulfur of the sulfur-boron doped carbon material of Example VI-2.

Figure 2E:
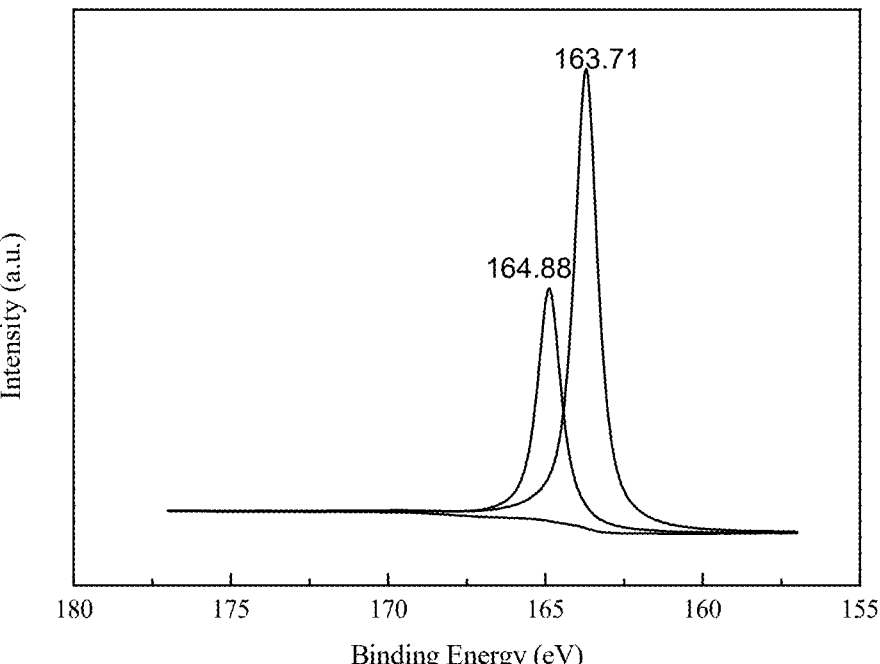

FIG. 2E shows an XPS spectrum of sulfur of the sulfur-boron doped carbon material of Example VI-2.

Figure 2F:
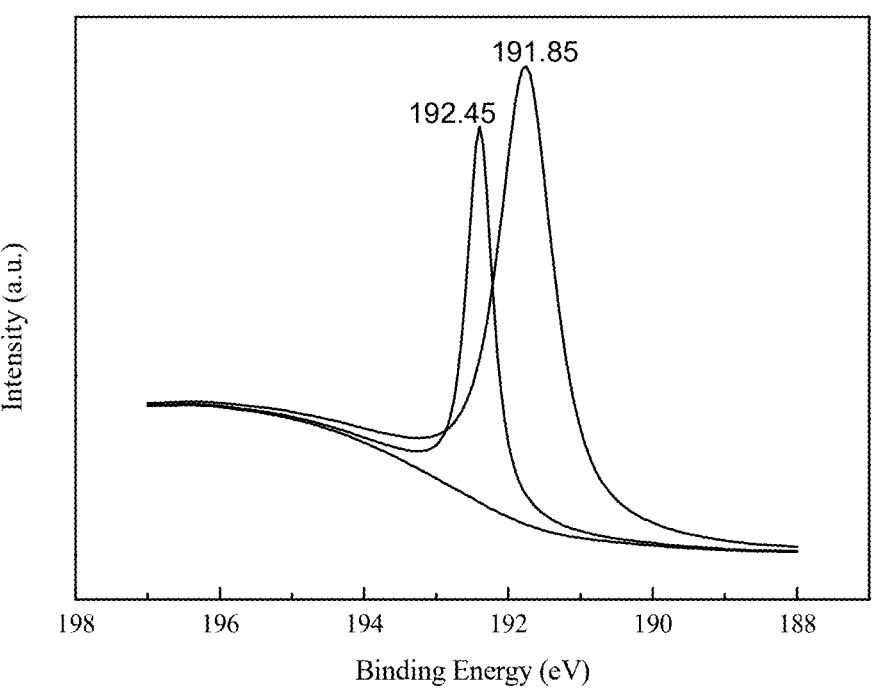

FIG. 2F shows an XPS spectrum of boron of the sulfur-boron doped carbon material of Example VI-2.

Figure 2G:
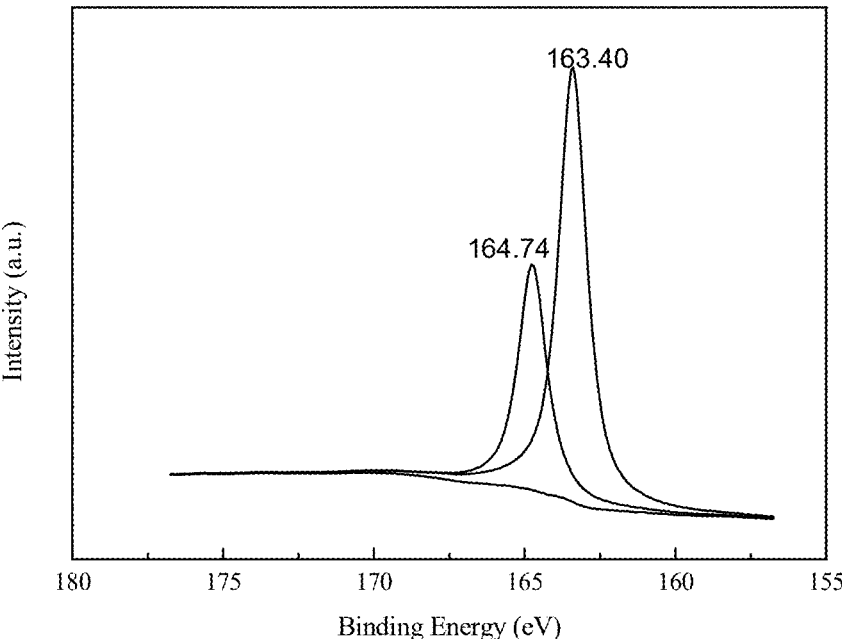

FIG. 2G shows an XPS spectrum of sulfur of the platinum on carbon catalyst of Example VI-4.

Figure 2H:
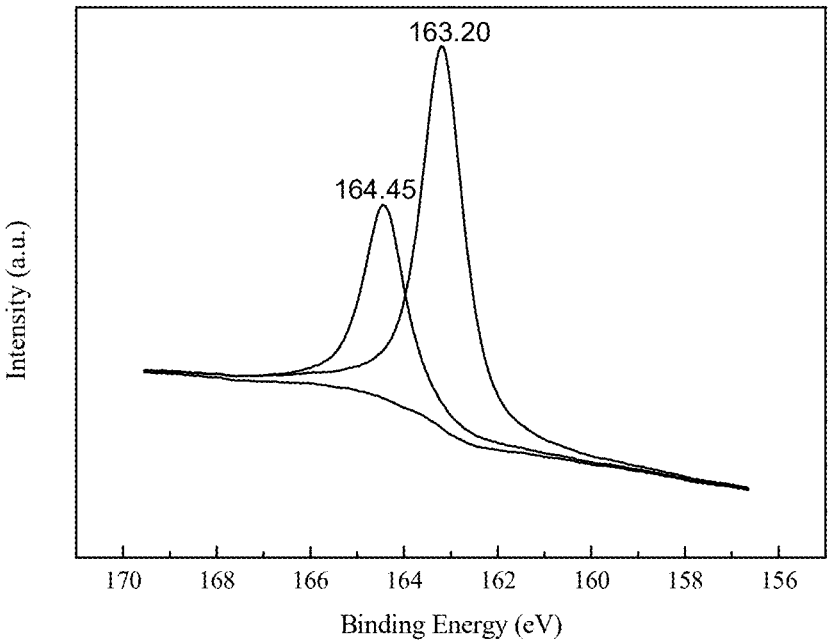

FIG. 2H shows an XPS spectrum of sulfur of the platinum on carbon catalyst of Example VI-6.

Implementing Solution VII

Figure 3A:
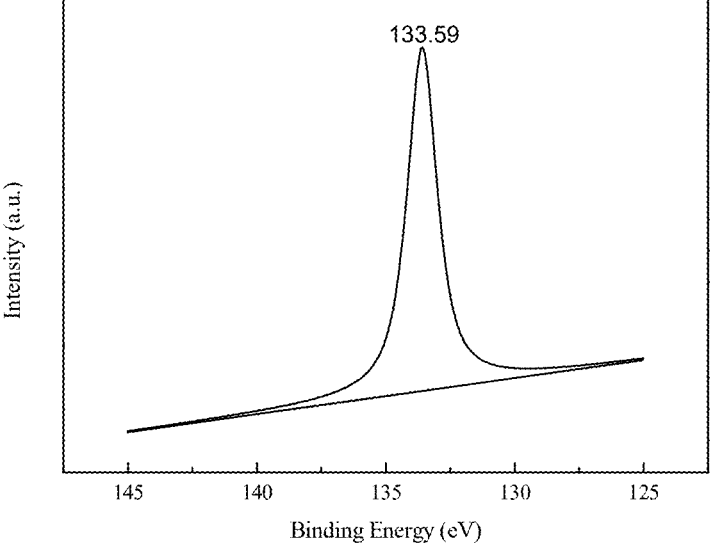

FIG. 3A shows an XPS spectrum of phosphorus of the sulfur-phosphorus doped carbon material of Example VII-1.

Figure 3B:
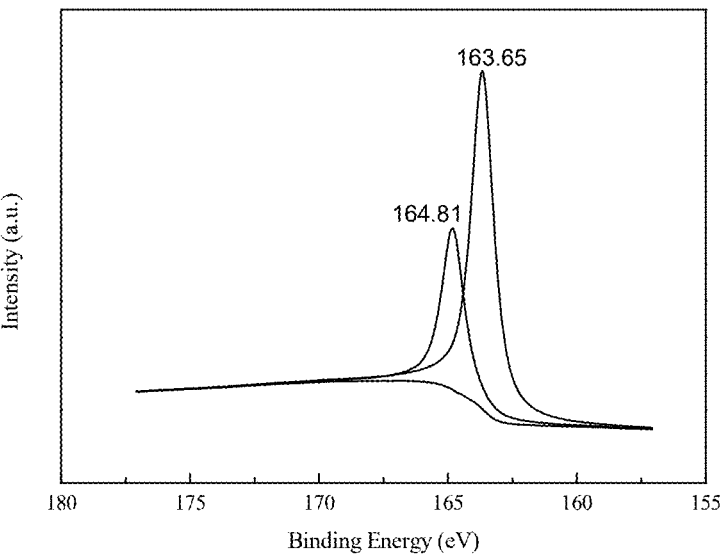

FIG. 3B shows an XPS spectrum of sulfur of the sulfur-phosphorus doped carbon material of Example VII-1.

Figure 3C:
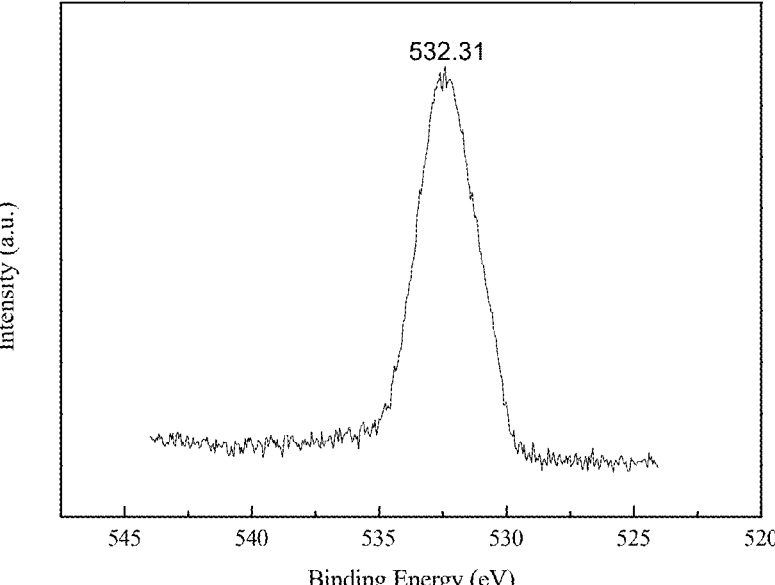

FIG. 3C shows an XPS spectrum of oxygen of the sulfur-phosphorus doped carbon material of Example VII-1.

Figure 3D:
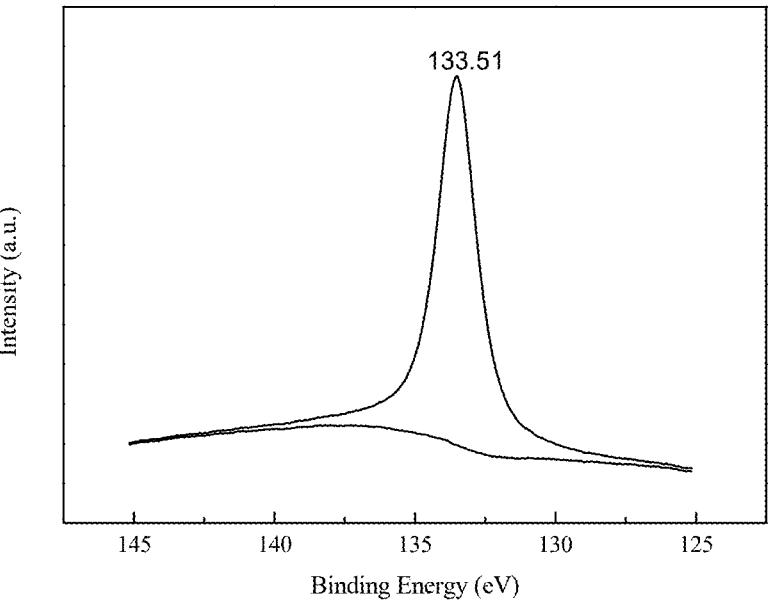

FIG. 3D shows an XPS spectrum of phosphorus of the sulfur-phosphorus doped carbon material of Example VII-2.

Figure 3E:
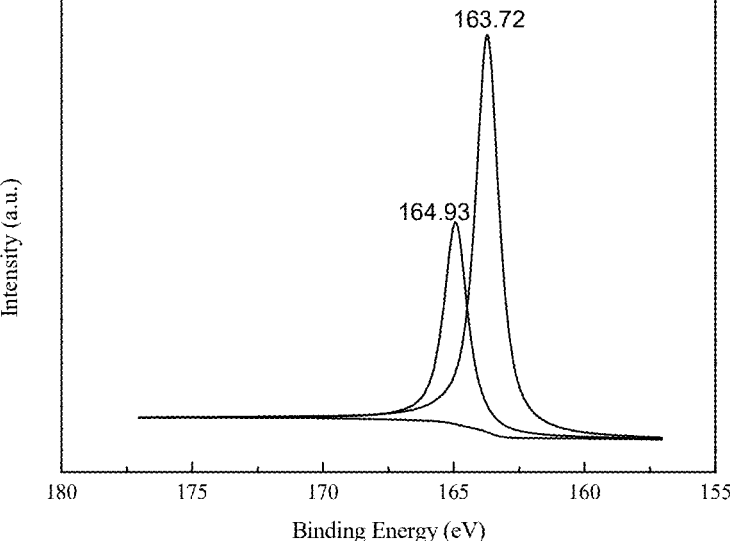

FIG. 3E shows an XPS spectrum of sulfur of the sulfur-phosphorus doped carbon material of Example VII-2.

Figure 3F:
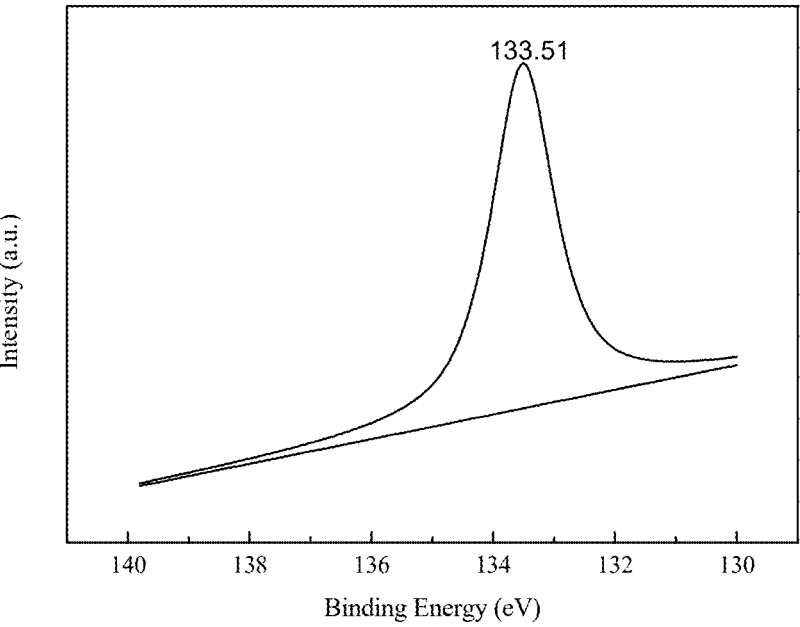

FIG. 3F shows an XPS spectrum of phosphorus of the sulfur-phosphorus doped carbon material of Example VII-3.

Figure 3G:
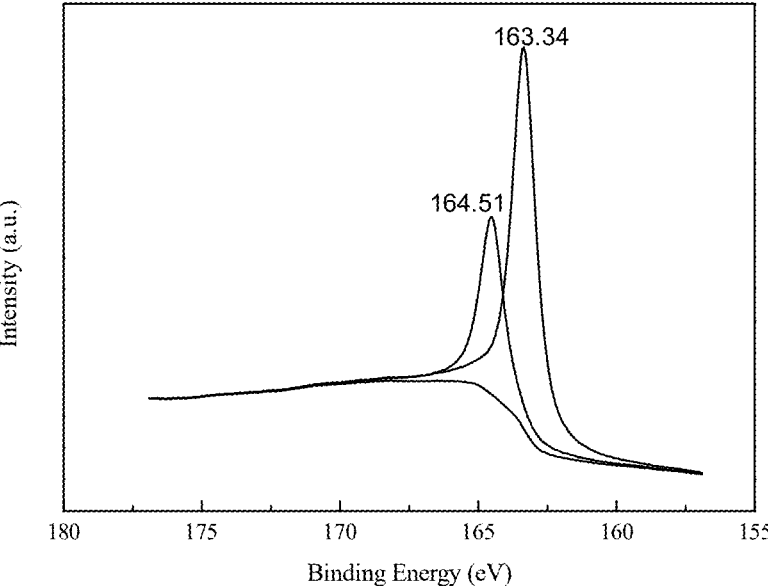

FIG. 3G shows an XPS spectrum of sulfur of the sulfur-sulfur doped carbon material of Example VII-3.

Figure 3H:
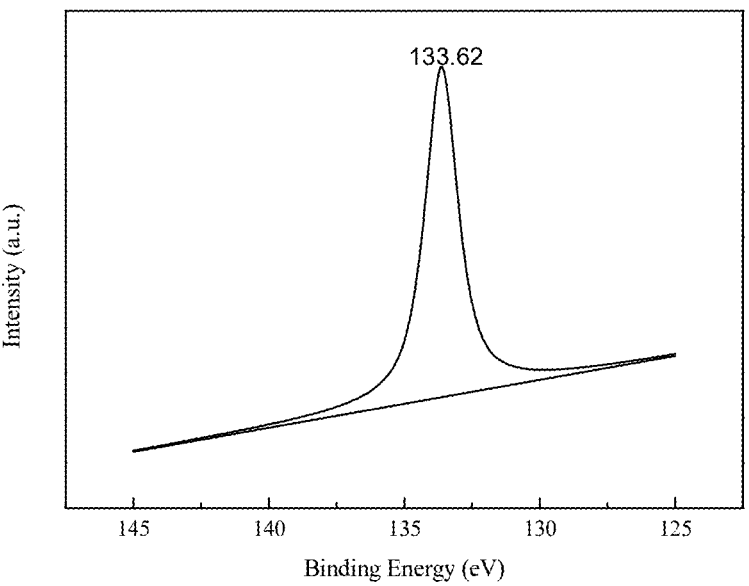

FIG. 3H shows an XPS spectrum of phosphorus of the sulfur-phosphorus doped carbon material of Example VII-4.

Figure 3I:
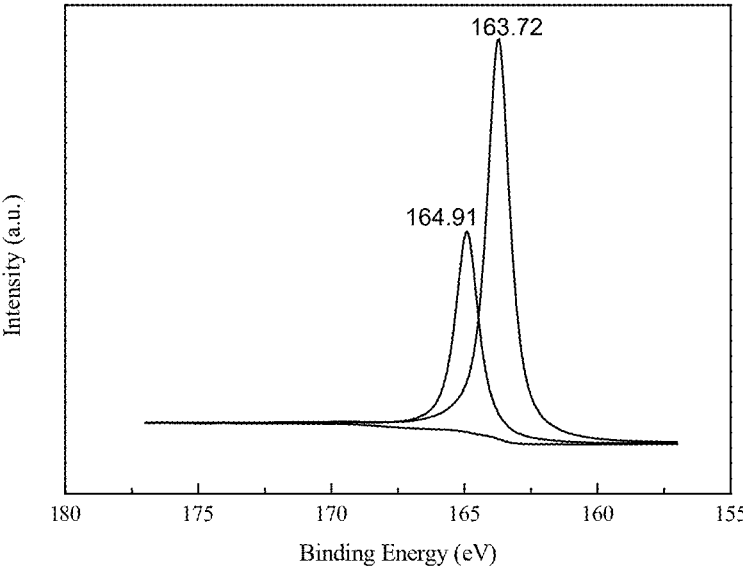

FIG. 3I shows an XPS spectrum of sulfur of the sulfur-phosphorus doped carbon material of Example VII-4.

Figure 3J:
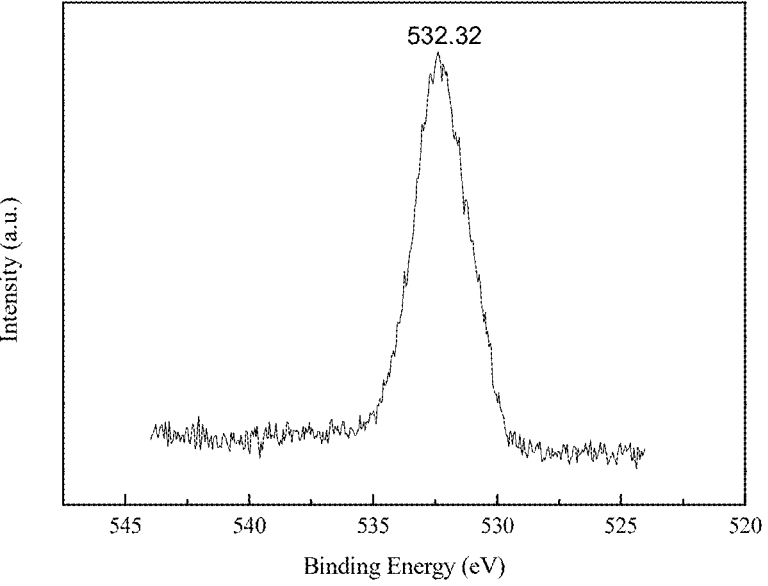

FIG. 3J shows an XPS spectrum of oxygen of the sulfur-phosphorus doped carbon material of Example VII-4.

Figure 3K:
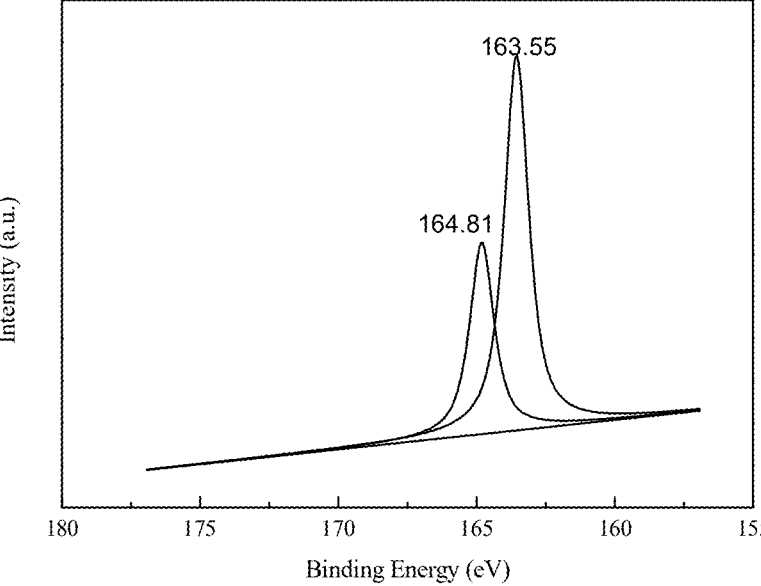

FIG. 3K shows an XPS spectrum of sulfur of the platinum on carbon catalyst of Example VII-5.

Figure 3L:
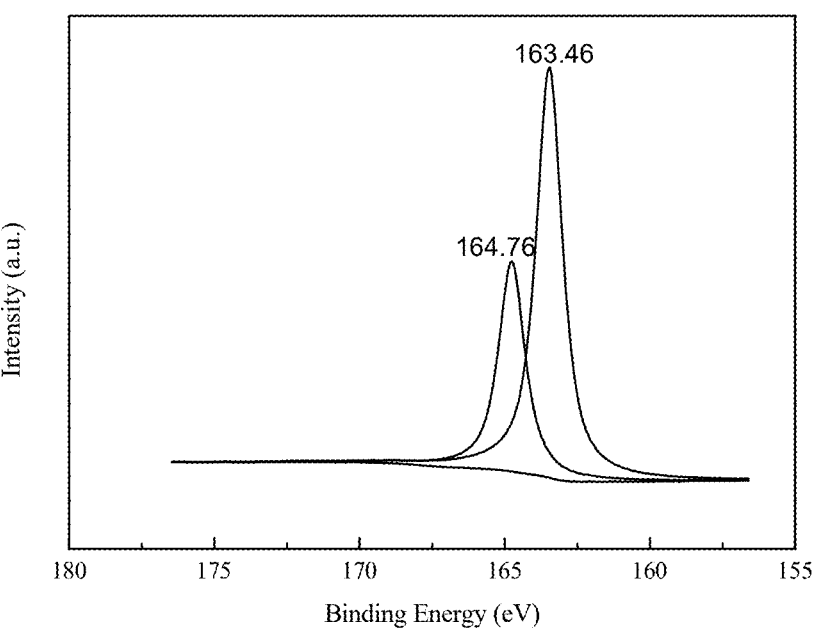

FIG. 3L shows an XPS spectrum of sulfur of the platinum on carbon catalyst of Example VII-6.

Figure 3M:
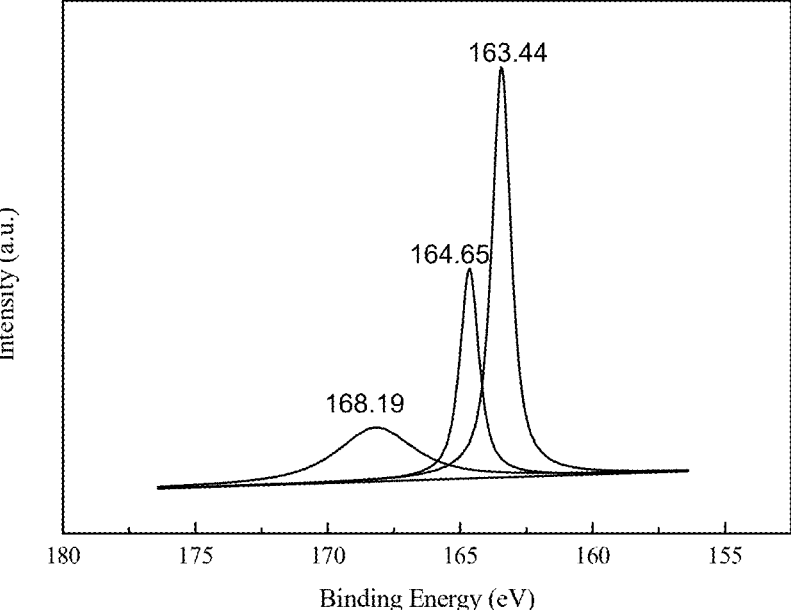

FIG. 3M shows an XPS spectrum of sulfur of the sulfur-phosphorus doped carbon material of comparative example VII-4.

Implementing Solution VIII

Figure 4A:
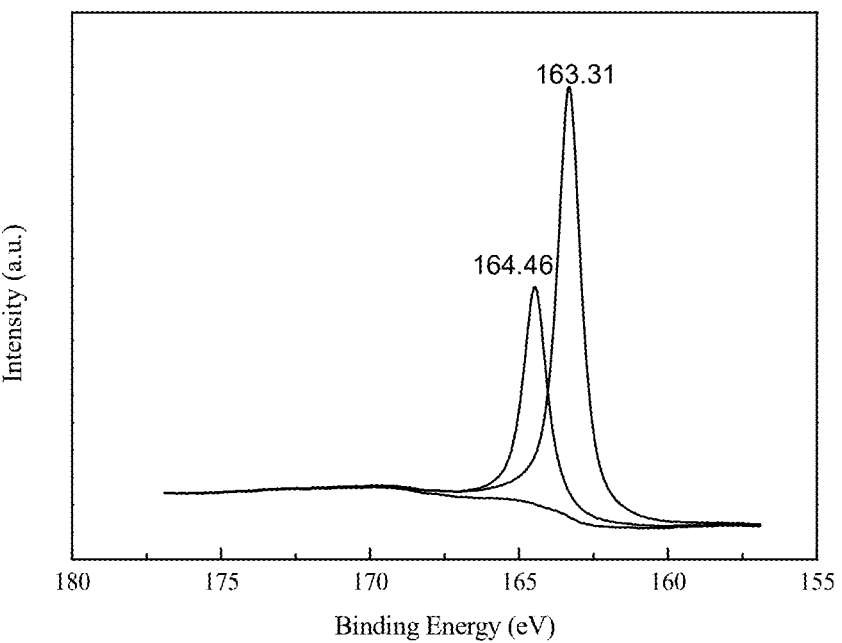

FIG. 4A shows an XPS spectrum of sulfur of the sulfur-phosphorus-boron doped carbon material of Example VIII-1.

Figure 4B:
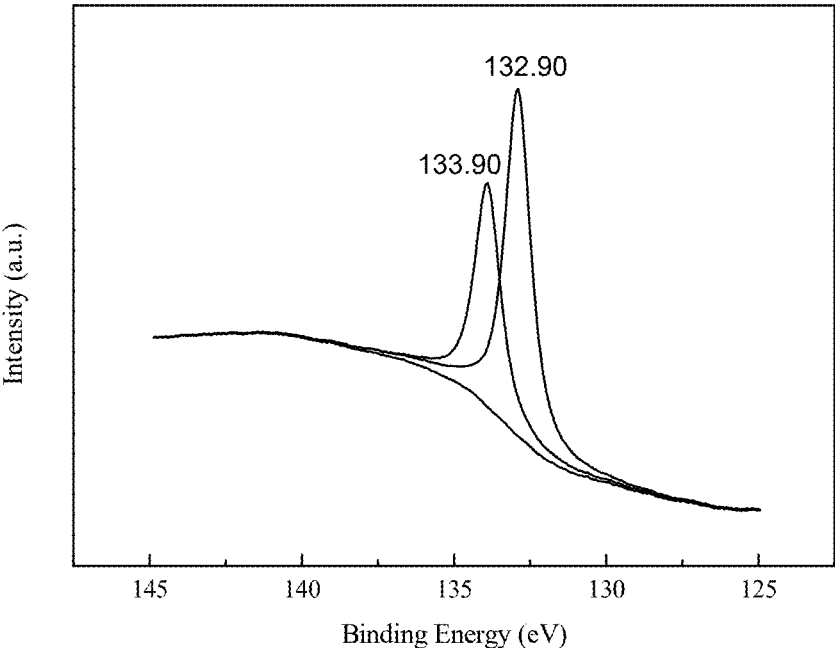

FIG. 4B shows an XPS spectrum of phosphorus of the sulfur-phosphorus-boron doped carbon material of Example VIII-1.

Figure 4C:
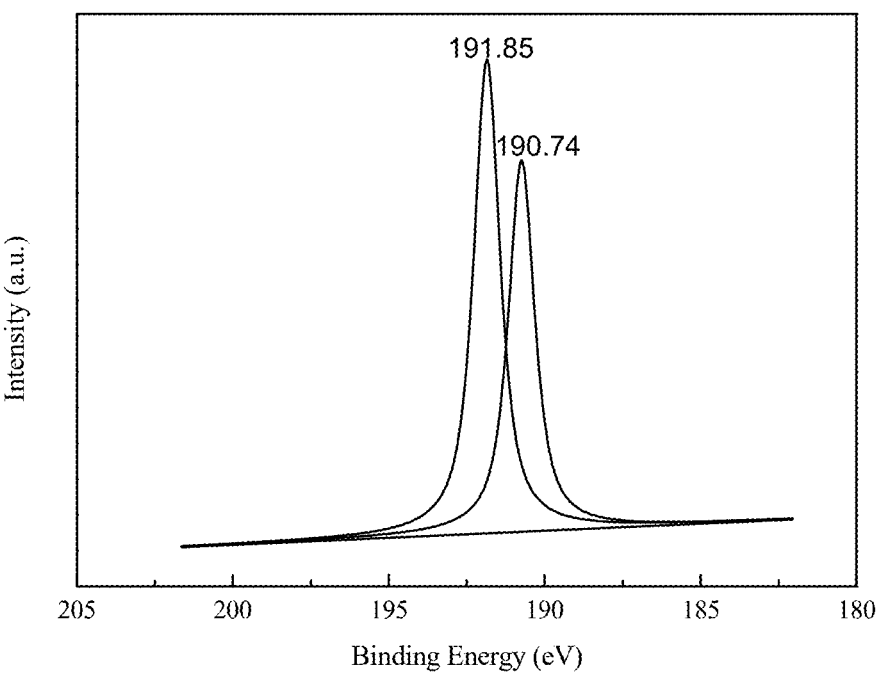

FIG. 4C shows an XPS spectrum of boron of the sulfur-phosphorus-boron doped carbon material of Example VIII-1.

Figure 4D:
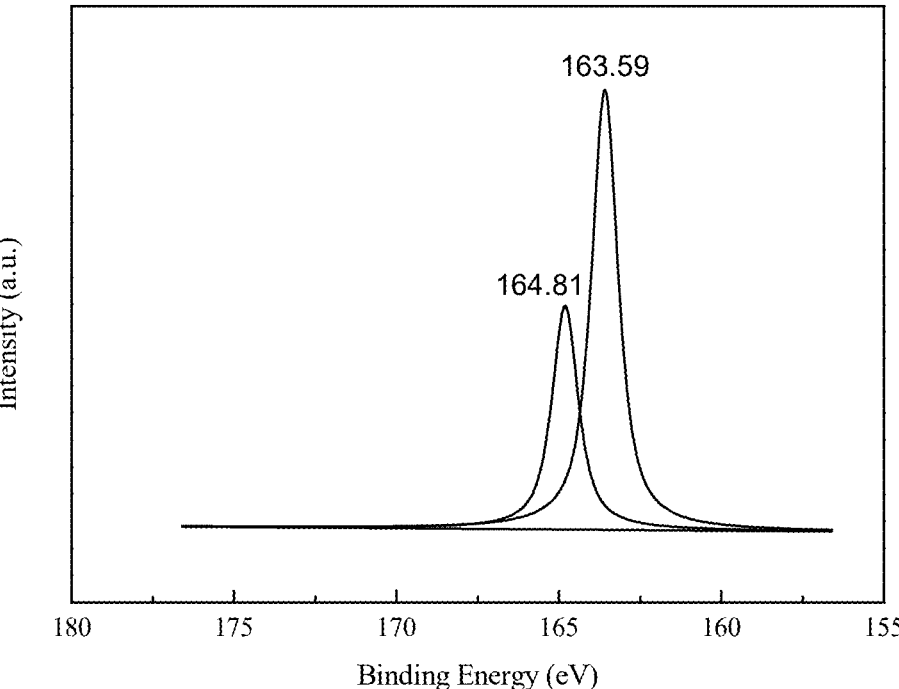

FIG. 4D shows an XPS spectrum of sulfur of the sulfur-phosphorus-boron doped carbon material of Example VIII-2.

Figure 4E:
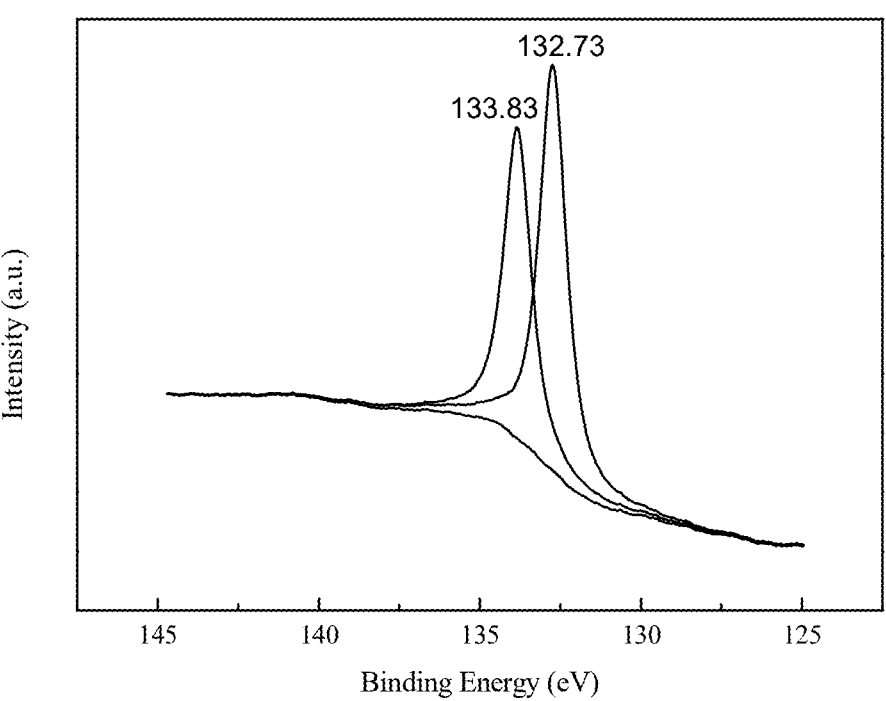

FIG. 4E shows an XPS spectrum of phosphorus of the sulfur-phosphorus-boron doped carbon material of Example VIII-2.

Figure 4F:
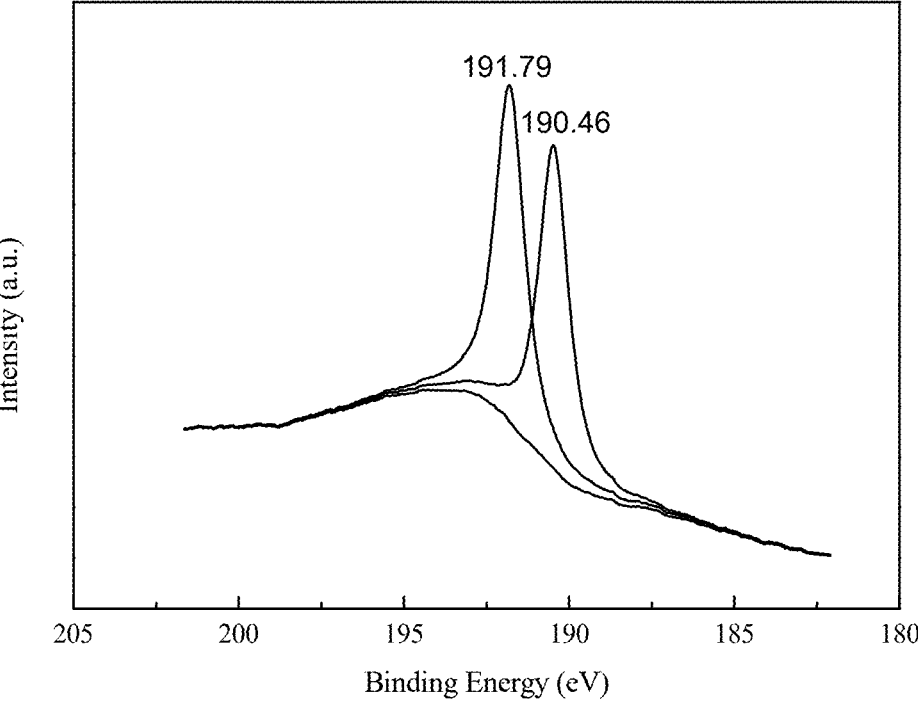

FIG. 4F shows an XPS spectrum of boron of the sulfur-phosphorus-boron doped carbon material of Example VIII-2.

Figure 4G:
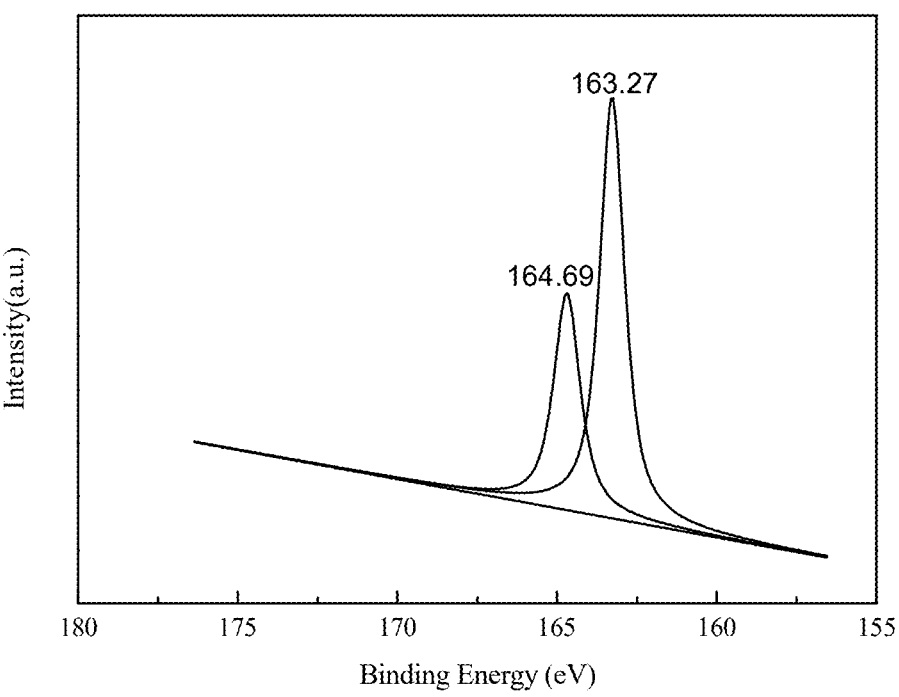

FIG. 4G shows an XPS spectrum of sulfur of the platinum on carbon catalyst of Example VIII-3.

Figure 4H:
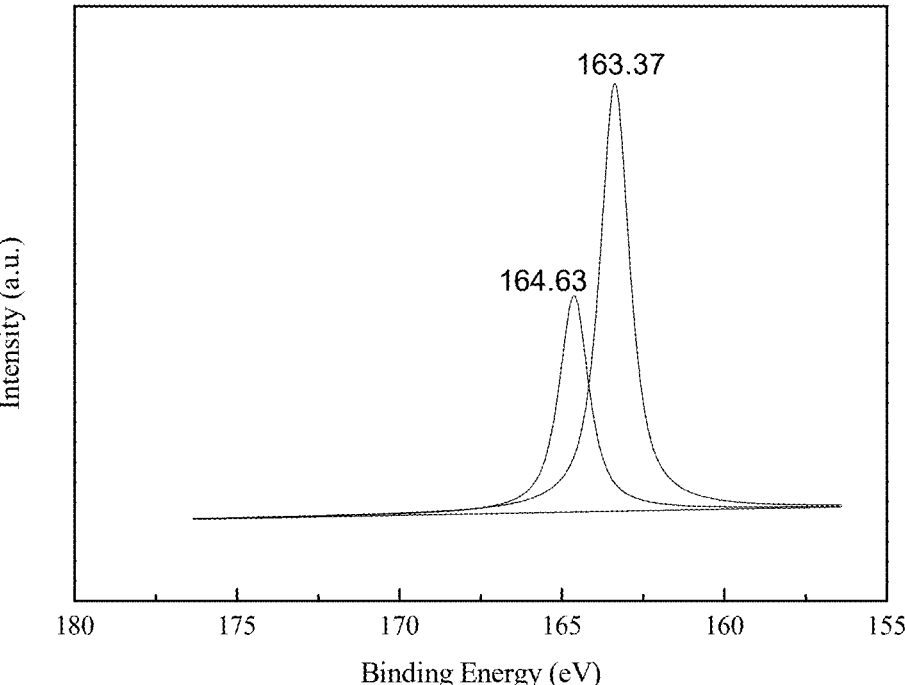

FIG. 4H shows an XPS spectrum of sulfur of the platinum on carbon catalyst of Example VIII-5.

Figure 4I:
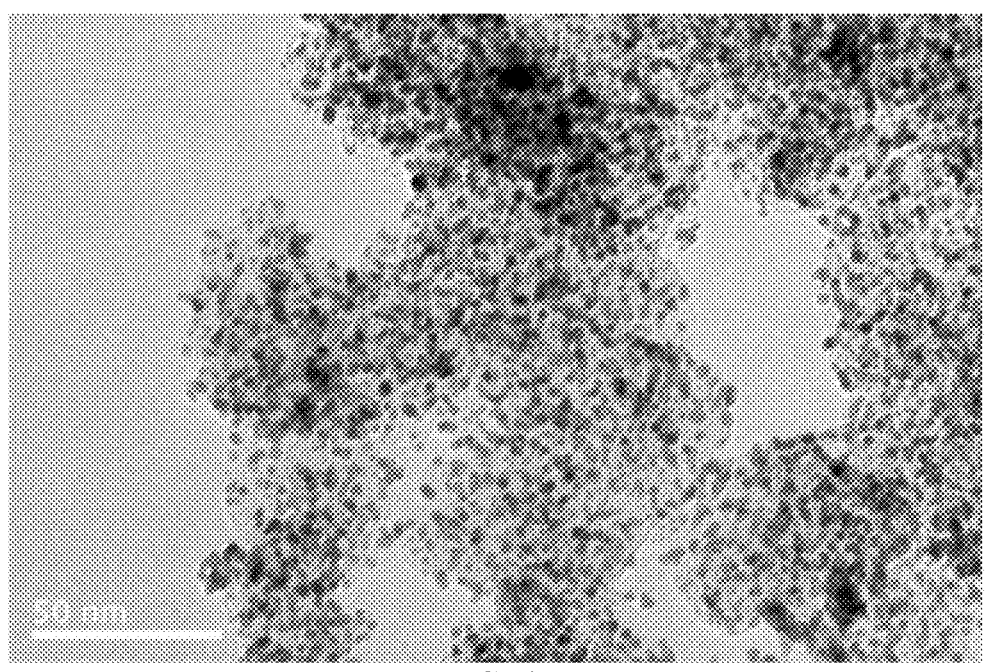

FIG. 4I shows a TEM pattern of the platinum on carbon catalyst of Example VIII-5.

Figure 4J:
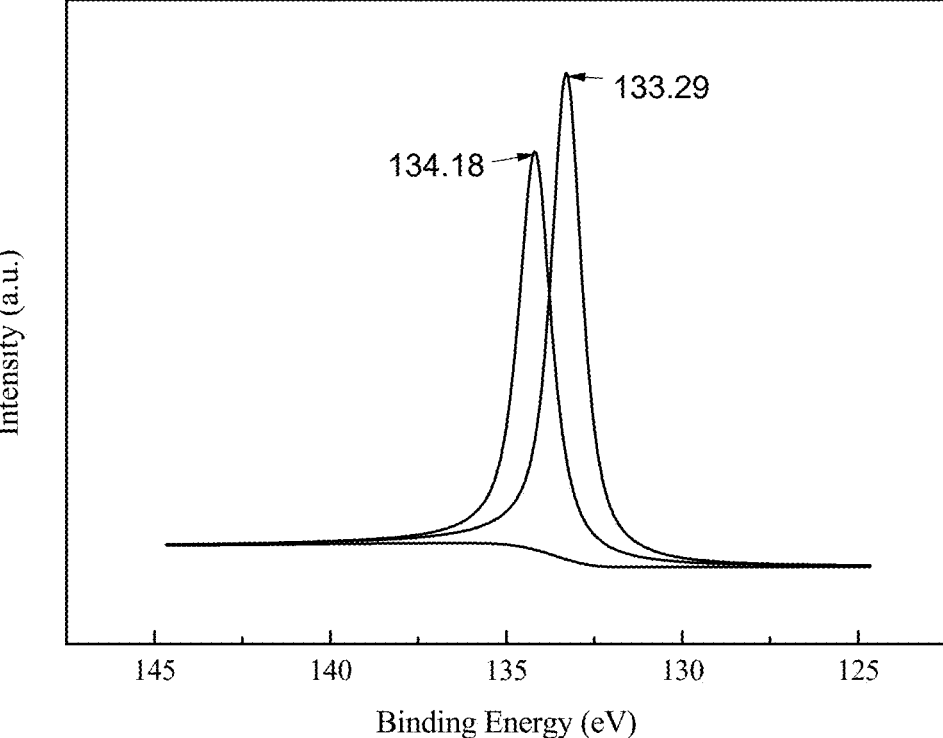

FIG. 4J shows an XPS spectrum of phosphorus of the sulfur-phosphorus-boron doped carbon material of comparative example VIII-4.

Figure 4K:
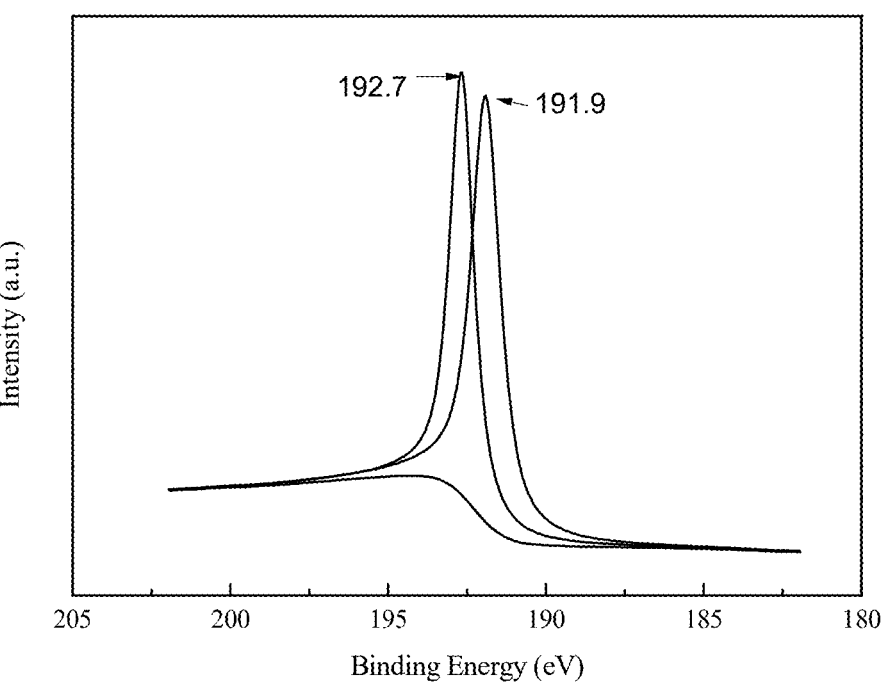

FIG. 4K shows an XPS spectrum of boron of the sulfur-phosphorus-boron doped carbon material of comparative example VIII-5.

Figure 4L:
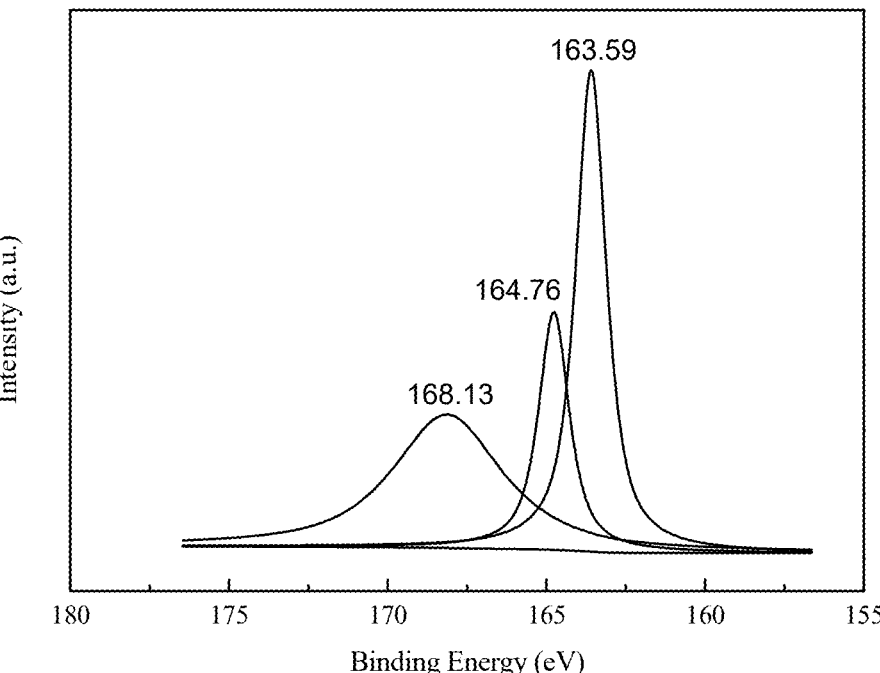

FIG. 4L shows an XPS spectrum of sulfur of the sulfur-phosphorus-boron doped carbon material of comparative example VIII-6.

EMBODIMENTS

The embodiments of the present invention are illustrated below, whilst it should be understood that the protection scopes of the present invention are not restricted to the embodiments or to the principle explanation thereof; instead, the protection scopes are defined by the claims.

In the context of the specification, any features or technical means not discussed specifically will be understood with the meanings known in the art without any substantive modification, unless otherwise designated.

Moreover, any embodiment described in the specification can be combined freely with one or more other embodiments described in the specification, and the technical solution or idea formed therefrom is deemed as a part of the original disclosure or original record, but cannot be considered as a new content not disclosed or expected by the specification, unless those skilled in the art believe that the combination is obviously unreasonable.

All features disclosed by the specification can be combined arbitrarily, and the combination should be understood as the disclosure of the present invention, unless those skilled in the art believe that the combination is obviously unreasonable. The numerical points disclosed by the specification comprise not only the specifically mentioned individual numbers in the Examples, but also the terminals of each numerical ranges, while any of the ranges formed by the combination of the numerical points should be deemed as being disclosed or recorded by the specification.

Technical and scientific terms used herein are defined by the definitions given specifically here, while the others without given definitions are understood according to their ordinary meanings in the art.

The "doping element" in the present invention includes nitrogen, phosphorus, boron, sulfur, fluorine, chlorine, bromine, and iodine, or is selected from these elements.

In the present invention, a material "doped with" an element means that the element or elements specifically mentioned are doped into the material, but the material may also be doped with other elements than the element or elements specifically mentioned, especially those commonly used in the art.

In the present invention, an element "doped" material means that the element or elements specifically mentioned are doped into the material; wherein in one embodiment the material may also be doped with other elements than the one or more elements specifically mentioned; and preferably, the material is free of other doping elements than the element or elements specifically mentioned.

In the present invention, unless capable of being uniquely identified as "carbon material containing a doping element" according to the context or self-limitation, the other references to "carbon material" refer to carbon material containing no doping element. The same applies to the specific conceptions of carbon materials.

In the present invention, "carbon black" and "carbon-black" are exchangeable terms to substitute the other. In the present invention, graphene, carbon nanotubes and conductive carbon black, which may be used in the carbon material of the present invention, have concepts well known in the art, respectively, and belong to different concepts from each other.

However, according to the present invention, one carbon material may comprise a lower content of one or more other carbon materials, as long as it remains within the scope of the carbon materials well recognized by one skilled in the art. For example, "graphene" may contain trace amount (e.g., less than 1%, or less than 0.1% by weight) of conductive carbon black and/or carbon nanotubes due to various reasons. Preferably, for example, for the purposes of the present invention, the conductive carbon black comprises less than 5% by weight, preferably less than 2% by weight, of graphene and/or carbon nanotubes.

By "inert gas" in the present invention is meant a gas that does not have any appreciable effect on the properties of the doped carbon material during the preparation process of the present invention. The same applies to the specific conceptions of carbon materials.

The numerical ranges defined in the present invention include the endpoints of the numerical ranges. "ranges" as disclosed herein are given as lower and upper limits, e.g., one or more lower limits with one or more upper limits. A given range may be defined by selecting a lower limit and an upper limit that define the boundaries of the given range. All ranges defined in this manner are inclusive and combinable, i.e., any lower limit may be combined with any upper limit to form a range. For example, when ranges of 60-110 and 80-120 are listed for particular parameters, it is understood that ranges of 60-120 and 80-110 are also contemplated. Furthermore, if the lower limits listed are 1 and 2 and the upper limits listed are 3, 4 and 5, then the following ranges are all contemplated: 1-3, 1-4, 1-5, 2-3, 2-4, and 2-5.

In the present invention, unless otherwise indicated, the terms "comprising," "including," "containing," "having," and similar words are to be construed as open definition mode, but should also be interpreted to cover the closed definition mode. For example, "comprising" means a case that other elements not listed may also be included, but also means the disclosure of the case comprising only the elements listed. Furthermore, as used herein, "comprising/including" is interpreted as specifying the presence of the stated features, integers, steps or components as referred to, but does not exclude the presence or addition of one or more other features, integers, steps, components or groups thereof. Additionally, the term "comprising" is intended to include embodiments encompassed by the terms "consisting essentially of . . . " and "consisting of . . . ". Similarly, the term "consisting essentially of . . . " is intended to include embodiments encompassed by the term "consisting of . . . ".

In the present invention, all embodiments and preferred embodiments mentioned herein can be combined with each other to form new technical solutions, unless otherwise indicated.

In particular, for example, for embodiments I, VI, VII and VIII encompassed by the invention, the technical features and solutions mentioned therein can be combined internally and with one another, unless such a combination is contrary to the purposes of the invention.

Further, for example, for the exemplary embodiments of the first to sixth series encompassed by the invention, the technical features and solutions mentioned therein can be combined internally and with one another, or further be combined with implementing solution I, VI, VII and VIII, unless such a combination is contrary to the purposes of the invention.

Further, for example, for the exemplary embodiments of the first to sixth series encompassed by the invention, the technical features and solutions mentioned therein can be combined internally and with one another, or further be combined with implementing solution I, VI, VII and VIII, unless such a combination is contrary to the purposes of the invention.

In the present invention, all technical features and preferred technical features mentioned herein can be combined with each other to form new technical solutions, unless otherwise indicated.

In the present invention, unless otherwise clear from the context or self-definition, all references to "pore volume" refer to the total pore volume of single-site adsorption at the maximum of P/P>0<.

Implementing Solution I

Implementing solution I of the present invention provides a carbon-supported platinum group metal catalyst, characterized in that between 160 ev and 170 ev in the $S_{2P}$ spectrum peaks thereof as analyzed by XPS, there is only a characteristic peak positioned between 162 ev and 166 ev (preferably a characteristic peak of thiophenic sulfur); wherein the support of the carbon-supported platinum group metal catalyst is a sulfur doped conductive carbon black.

In one embodiment of implementing solution I, the carbon-supported platinum group metal catalyst is a sulfur doped catalyst, preferably being free of doping elements other than sulfur.

In one embodiment of implementing solution I, the platinum group metal is platinum.

In one embodiment of implementing solution I, the carbon-supported platinum group metal group metal catalyst according to the present invention does not contain other metallic elements than platinum group metal.

In one embodiment of implementing solution I, in the $S_{2P}$ spectrum peaks as analyzed by XPS for the carbon-supported platinum group metal catalyst according to the present invention, the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur)

In one embodiment of implementing solution I, the XPS analysis of the carbon-supported platinum group metal catalyst according to the present invention (e.g., platinum on carbon catalyst) is free of characteristic peak between 166 ev and 170 ev.

In one embodiment of implementing solution I, the carbon-supported platinum group metal catalyst according to the present invention comprises platinum in an content by weight of 0.1%-80%, preferably 20% to 70%, more preferably 40% to 70%, based on the weight of the catalyst.

In one embodiment of implementing solution I, the carbon-supported platinum group metal catalyst according to the present invention has a resistivity of <10.0 Ω·m, preferably <2.0 Ω·m.

In one embodiment of implementing solution I, the carbon-supported platinum group metal catalyst according to the present invention has a specific surface of 80 m$^2$/g-1500 m$^2$/g, preferably 100 m$^2$/g-200 m$^2$/g.

In one embodiment of implementing solution I, for the carbon-supported platinum group metal catalyst according to the present invention, the conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution I, the characteristic peak between 162 ev and 166 ev (preferably a characteristic peak of thiophenic sulfur) for the carbon-supported platinum group metal catalyst according to the present invention is bimodal, positioned at 163.9±0.5 ev and 165.1±0.5 ev, respectively. In some Examples of the present invention, the characteristic peak between 162 ev and 166 ev (preferably a characteristic peak of thiophenic sulfur) is bimodal, positioned at 163.5±0.1 ev and 164.7±0.1 ev, respectively.

Implementing solution I of the present invention also provides a process for producing a carbon-supported platinum group metal catalyst, comprising:

(1) a step of producing a sulfur doped carbon material: placing a carbon material in an inert gas containing thiophene, heating to 1000° C.-1500° C. at a temperature-rising rate of 8° C./min-15° C./min, followed by a thermostatic treatment for 0.5 h-10 h, to obtain the sulfur doped carbon material;

(2) a step of supporting platinum group metal (e.g. platinum) using the sulfur doped carbon material obtained in the (1) as a support.

According to the process for producing a carbon-supported platinum group metal catalyst of implementing solution I of the present invention, the weight ratio of the carbon material to thiophene, calculated as the sulfur element comprised in thiophene, is 20:1-2:1; preferably, the ratio of 10:1-4:1, more preferably 8:1-4:1.

According to the process for producing a carbon-supported platinum group metal catalyst of implementing solution I of the present invention, between 160 ev and 170 ev in the $S_{2P}$ spectrum peaks as analyzed by XPS for the sulfur doped carbon material in step (1), the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur).

According to the process for producing a carbon-supported platinum group metal catalyst of implementing solution I of the present invention, the characteristic peak between 162 ev and 166 ev (preferably a characteristic peak of thiophenic sulfur) is bimodal, positioned at 163.9±0.5 ev and 165.1±0.5 ev, respectively. In some Examples of the present invention, the characteristic peak between 162 ev and 166 ev (preferably a characteristic peak of thiophenic sulfur) is bimodal, positioned at 163.5±0.1 ev and 164.7±0.1 ev, respectively.

According to the process for producing a carbon-supported platinum group metal catalyst of implementing solution I of the present invention, the thermostatic treatment may be carried out at a temperature of 1150° C. to 1450° C., preferably 1200° C. to 1400° C.; for 1 h to 5 h, preferably 2 h-4 h.

According to the process for producing a carbon-supported platinum group metal catalyst of implementing solution I of the present invention, the carbon material is conductive carbon black. The conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

According to the process for producing a carbon-supported platinum group metal catalyst of implementing solution I of the present invention, the preparation method and the source of the conductive carbon black are not limited. The conductive carbon black can be acetylene black, furnace carbon black or the like.

According to the process for producing a carbon-supported platinum group metal catalyst of implementing solution I of the present invention, the carbon material may have a resistivity of <10.0 Ω·m, preferably <5.0 Ω·m, more preferably <2.0 Ω·m.

According to the process for producing a carbon-supported platinum group metal catalyst of implementing solution I of the present invention, when the carbon material in (1) is conductive carbon black, in Raman spectrum, the sulfur doped conductive carbon black obtained in (1) has an $ID/I_G$ value less than the $ID/I_G$ of the conductive carbon black before doping. In the Raman spectrum, a peak at around 1320 cm$^{-1}$ is a D peak, and a peak at around 1580 cm$^{-1}$ is a G peak, $I_D$ representing the intensity of the D peak, and $I_G$ representing the intensity of the G peak.

According to the process for producing a carbon-supported platinum group metal catalyst of the implementing solution I, the conductive carbon black generally has a $I_D/I_G$ value of 0.8 to 5, preferably 1 to 4.

According to the process for producing a carbon-supported platinum group metal catalyst according to implementing solution I of the present invention, the specific surface area and pore volume of the carbon material may vary over a wide range. Generally, the specific surface area is 10 m$^2$/g to 2000 m$^2$/g, and the pore volume is 0.02 mL/g to 6 mL/g.

According to the process for producing a carbon-supported platinum group metal catalyst of implementing solution I of the present invention, the conductive carbon black has a specific surface area of 200 m$^2$/g-2000 m$^2$/g.

According to the process for producing a carbon-supported platinum group metal catalyst of implementing solution I of the present invention, the inert gas may be nitrogen gas or argon gas.

According to the process for producing a carbon-supported platinum group metal catalyst of implementing solution I of the present invention, in one embodiment, a carbon material is placed in a tube furnace, a carrier gas containing thiophene is introduced, the tube furnace is heated to 1000° C. to 1500° C. at a rate of 8° C./min to 15° C./min, followed by a thermostatic treatment for 0.5 h to 10 h, to obtain the sulfur doped carbon material.

The carrier gas may be nitrogen gas or argon gas.

The carrier gas may comprise thiophene in an amount of 0.1%-5.0% by volume.

According to the process for producing a carbon-supported platinum group metal catalyst according to implementing solution I of the present invention, the carbon material has an oxygen content by weight of more than 4%, preferably 4% to 15%, in XPS analysis.

According to the process for producing a carbon-supported platinum group metal catalyst of implementing solution I of the present invention, the step of supporting the platinum group metal (e.g., platinum) comprises:

(a) dispersing the sulfur doped carbon material obtained in the step (1) and a platinum group metal precursor (such as a platinum precursor) in an aqueous phase, and adjusting the pH value to 8-12 (preferably, adjusting the pH value to 10±0.5);

(b) adding a reducing agent for reduction; and (c) separating out the solid, and subjecting to post-treatment to obtain the carbon-supported platinum group metal (e.g., carbon-supported platinum) catalyst.

According to the process for producing a carbon-supported platinum group metal catalyst according to implementing solution I of the present invention, the platinum precursor is chloroplatinic acid, potassium chloroplatinate, or sodium chloroplatinate; and the concentration of the platinum precursor is 0.5 mol/L-5 mol/L.

According to the process for producing a carbon-supported platinum group metal catalyst of implementing solution I of the present invention, in the step (a), the pH of the aqueous phase is adjusted with an aqueous solution of sodium carbonate, an aqueous solution of potassium hydroxide, an aqueous solution of sodium hydroxide, or aqueous ammonia.

According to the process for producing a carbon-supported platinum group metal catalyst of implementing solution I of the present invention, in the step (b), the reducing agent is one or more selected from citric acid, ascorbic acid, formaldehyde, formic acid, ethylene glycol, sodium citrate, hydrazine hydrate, sodium borohydride, and glycerol.

According to the process for producing a carbon-supported platinum group metal catalyst of implementing solution I of the present invention, in the step (b), the molar ratio of the reducing agent to platinum is 2 to 100.

According to the process for producing a carbon-supported platinum group metal catalyst of implementing solution I of the present invention, in the step (b), the reduction is carried out at a temperature of 50 to 150° C., preferably 60 to 90° C.; for 4 to 15 hours, preferably 8 to 12 hours.

According to the process for producing a carbon-supported platinum group metal catalyst according to implementing solution I of the present invention, the sulfur doped carbon material produced in step (1) can be easily dispersed in an aqueous phase. However, it is difficult to disperse some carbon materials, such as Ketjen black, directly in the aqueous phase.

According to the process for producing a carbon-supported platinum group metal catalyst of implementing solution I of the present invention, the post-treatment includes: washing, filtering and drying.

Implementing solution I of the present invention also provides a carbon-supported platinum group metal catalyst (e.g. a platinum on carbon catalyst), which catalyst is produced by the process of any embodiment of implementing solution I of the present invention described above.

Implementing solution I of the present invention also provides a hydrogen fuel cell, which uses the carbon-supported platinum group metal catalyst according to any embodiment of implementing solution I of the present invention described above in an anode and/or a cathode of the hydrogen fuel cell.

In one embodiment of implementing solution I, the carbon-supported platinum group metal catalyst (e.g., a platinum on carbon catalyst) according to the present invention, when used in an oxygen reduction reaction, in some Examples, has a ECSA>95 m$^2$ g$^{-1}$-Pt, such as 95 m$^2$ g$^{-1}$-Pt to 260 m$^2$ g$^{-1}$-Pt.

In one embodiment of implementing solution I, the carbon-supported platinum group metal catalyst (e.g., a platinum on carbon catalyst) according to the present invention, when used in an oxygen reduction reaction, has a specific activity reduction by weight of <10% after 5000 cycles in some Examples.

In one embodiment of implementing solution I, the carbon-supported platinum group metal catalyst (e.g., a platinum on carbon catalyst) according to the present invention, when used in an oxygen reduction reaction, has a half-wave potential >0.89V, such as 0.89V to 0.93V in some Examples.

In one embodiment of implementing solution I, the carbon-supported platinum group metal catalyst (e.g., a platinum on carbon catalyst) according to the present invention, when used in an oxygen reduction reaction, in some Examples, has a specific activity by weight of >0.18 A mg$^{-1}$-Pt, such as 0.18 A mg$^{-1}$-Pt to 0.39 A mg$^{-1}$-Pt.

The invention obviously improves the specific activity by weight and the stability of the platinum on carbon catalyst by doping sulfur on surface of the conductive carbon black in the form of thiophenic sulfur, compared with relatively low specific activity by weight and poor stability of the conventional platinum on carbon catalyst for hydrogen fuel cell.

In one embodiment of implementing solution I, the carbon-supported platinum group metal catalyst according to the present invention is a platinum on carbon catalyst.

Implementing Solution VI

Implementing solution VI of the present invention provides a sulfur-boron doped carbon material, wherein between 160 ev and 170 ev in the S$_{2P}$ spectrum peaks as analyzed by XPS, the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur)

In one embodiment of implementing solution VI, the sulfur-boron doped carbon material is free of doping elements other than sulfur and boron.

In one embodiment of implementing solution VI, the sulfur-boron doped carbon material is free of metallic element.

In one embodiment of implementing solution VI, in the S$_{2P}$ spectrum peaks as analyzed by XPS for the sulfur-boron doped carbon material according to the present invention, the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur).

In one embodiment of implementing solution VI, the XPS analysis of the sulfur-boron doped carbon material according to the present invention is free of characteristic peak between 166 ev and 170 ev.

In one embodiment of implementing solution VI, the characteristic peak between 162 ev and 166 ev (preferably a characteristic peak of thiophenic sulfur) for the sulfur-boron doped carbon material according to the present invention is bimodal, positioned at 163.6±0.5 ev and 164.8±0.5 ev, respectively.

In one embodiment of implementing solution VI, the XPS analysis of the sulfur-boron doped carbon material according to the present invention has a characteristic peak of B$_{1s}$ between 190 ev and 195 ev, without other characteristic peak between 185 ev and 200 ev.

In one embodiment of implementing solution VI, in the B$_{1s}$ spectrum peaks by the XPS analysis of the sulfur-boron doped carbon material according to the present invention, there are two characteristic peaks between 191 ev and 193 ev, without other characteristic peak between 185 ev and 200 ev.

In one embodiment of implementing solution VI, the sulfur-boron doped carbon material according to the present invention has a resistivity of <10.0 Ω·m, preferably <5.0 Ω·m, more preferably <3.0 Ω·m.

In one embodiment of implementing solution VI, the XPS analysis on the sulfur-boron doped carbon material of the present invention shows comprising sulfur in a content by weight of 0.1%-5%, boron in a content by weight of 0.1%-5%; preferably, sulfur in a content by weight of 0.2%-3%, boron in a content by weight of 0.2%-3%; more preferably, sulfur in a content by weight of 0.4%-2%, boron in a content by weight of 0.4%-2%.

In one embodiment of implementing solution VI, the oxygen content of the sulfur-boron doped carbon material is not particularly limited. In one embodiment, the oxygen content by weight by the XPS analysis is >4%, and may be 4%-15%.

In one embodiment of implementing solution VI, the specific surface area and pore volume of the sulfur-boron doped carbon material may vary over a wide range; for example, the specific surface area may be 10 m$^2$/g to 2000 m$^2$/g, and the pore volume may be 0.02 mL/g to 6.0 mL/g. In one embodiment, the carbon material has a specific surface area of 200 m$^2$/g-2000 m$^2$/g and a pore volume of 0.2 mL/g-3.0 mL/g, which is suitable for use as a support for a platinum on carbon catalyst loaded with high amount of platinum.

In one embodiment of implementing solution VI, the sulfur-boron doped carbon material according to the present invention may be sulfur-boron doped graphene, sulfur-boron doped carbon nanotubes or sulfur-boron doped conductive carbon black. The conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2. The graphene or the carbon nanotube can be graphene or a carbon nanotube that has been subjected to oxidation treatment, or may be graphene or a carbon nanotube that is not subjected to oxidation treatment.

In one embodiment of implementing solution VI, the preparation and source of the conductive carbon black are not particularly limited, for the sulfur-boron doped carbon material of the present invention. The conductive carbon black can be acetylene black, furnace carbon black or the like.

In one embodiment of implementing solution VI, in the sulfur-boron doped carbon material according to the present invention, sulfur and boron are chemically bonded to the carbon material.

Implementing solution VI of the present invention also provides a process for producing a sulfur-boron doped carbon material, comprising: contacting a sulfur doped carbon material with a boron source, and treating in an inert gas at 300° C.-800° C. for 0.5 h-10 h, to obtain the sulfur-boron doped carbon material.

In one embodiment of implementing solution VI, as to the process for producing the sulfur-boron doped carbon material, the manner by which the sulfur doped carbon material is contacted with the boron source is not limited. It is preferable to use a manner of "mixing the sulfur doped carbon material with a boron source solution (e.g., an aqueous solution of the boron source), impregnating, and drying".

In one embodiment of implementing solution VI, according to the process for producing a sulfur-boron doped carbon material, the sulfur doped carbon material is produced by: contacting a sulfur doped carbon material with a boron source, and treating in an inert gas at 400° C.-1500° C. for 0.5 h-10 h, to obtain the sulfur doped carbon material.

In one embodiment of implementing solution VI, as to the process for producing the sulfur-sulfur doped carbon material, the manner by which the carbon material is contacted with the sulfur source is not limited. Different contacting manner may be used for different sulfur sources, for example, the carbon material may be premixed with the sulfur source (solid sulfur source or liquid containing the sulfur source), or the carbon material may be contacted with an inert gas containing the sulfur source.

In one embodiment of implementing solution VI, according to the process for producing the sulfur-boron doped carbon material of the present invention, the carbon material may be graphene, carbon nanotubes or conductive carbon black. The conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2. The carbon material generally has $I_D/I_G$ a value of 0.8-5, preferably 1-4. In the Raman spectrum, a peak at around 1320 $cm^{-1}$ is a D peak, and a peak at around 1580 $cm^{-1}$ is a G peak, $I_D$ representing the intensity of the D peak, and $I_G$ representing the intensity of the G peak.

In an embodiment of implementing solution VI, according to the process for producing a sulfur-boron doped carbon material, the sulfur source is one or more of elemental sulfur, hydrogen sulfide, carbon disulfide, sodium thiosulfate, thiophene, sulfate and sulfonate.

In one embodiment of implementing solution VI, according to the process for producing a sulfur-boron doped carbon material, the weight ratio of the carbon material to the sulfur source, calculated as the sulfur element comprised in the sulfur source, is 20:1-2:1; preferably 10:1-4:1, more preferably 8:1-4:1.

In one embodiment of implementing solution VI, according to the process for producing a sulfur-boron doped carbon material of the present invention, the boron source is one or more of boric acid and borate.

In one embodiment of implementing solution VI, according to the process for producing a boron-boron doped carbon material, the weight ratio of the carbon material to the boron source, calculated as the boron element comprised in the boron source, is 100:1-5:1; preferably 60:1-15:1.

In one embodiment of implementing solution VI, according to the process for producing a sulfur-boron doped carbon material of the present invention, the inert gas is nitrogen gas or argon gas.

In one embodiment of implementing solution VI, according to the process for producing a sulfur-boron doped carbon material of the present invention, if temperature is required to be raised, the temperature-rising rate in the operations of doping sulfur and doping sulfur is each independently 1° C./min to 20° C./min, preferably 3° C./min to 15° C./min, and more preferably 8° C./min to 15° C./min.

In one embodiment of implementing solution VI, according to the process for producing a sulfur-boron doped carbon material of the present invention, the operation of doping sulfur may be carried out at a temperature of 400° C.-1500° C., preferably 1000° C.-1500° C., more preferably 1100° C.-1300° C.

In one embodiment of implementing solution VI, according to the process for producing a sulfur-boron doped carbon material of the present invention, the operation of doping boron may be carried out at a temperature of 300° C.-800° C., preferably 400° C.-600° C.

In one embodiment of implementing solution VI, according to the process for producing a sulfur-boron doped carbon material of the present invention, the operations of doping sulfur and doping boron may be carried out each independently for 1 h-5 h, preferably 2 h-4 h.

In one embodiment of implementing solution VI, according to the process for producing a sulfur-boron doped carbon material of the present invention, the carbon material has a resistivity of <10.0 Ω·m, preferably <5 Ω·m, more preferably <2 Ω·m.

In one embodiment of implementing solution VI, according to the process for producing a sulfur-boron doped carbon material of the present invention, the XPS analysis of the carbon material shows an oxygen content by weight of generally greater than 4%, preferably 4%-15%.

In one embodiment of implementing solution VI, according to the process for producing a sulfur-boron doped carbon material of the present invention, the specific surface area of the carbon material may vary over a wide range. Generally, the specific surface area is 10 $m^2/g$ to 2000 $m^2/g$; and the pore volume is 0.02 mL/g to 6 mL/g.

In one embodiment of implementing solution VI, according to the process for producing a sulfur-boron doped carbon material of the present invention, the process of producing the sulfur-boron doped carbon material does not involve the use of a metal-containing catalyst.

In one embodiment of implementing solution VI, according to the process for producing a sulfur-boron doped carbon material of the present invention, in the sulfur doped carbon material, sulfur is chemically bonded to the carbon material.

In one embodiment of implementing solution VI, according to the process for producing a sulfur-boron doped carbon material of the present invention, in the sulfur doped carbon material, sulfur is bonded to the carbon material in the form of oxidized sulfur and thiophenic sulfur.

In one embodiment of implementing solution VI, according to the process for producing a sulfur-boron doped carbon material, the carbon material is mixed with a sulfur source, and placed in a tube furnace, and treated in an inert gas at 400° C.-1500° C. for 0.5 h-10 h, to obtain the sulfur doped carbon material.

In one embodiment of implementing solution VI, the sulfur-boron doped carbon material of this implementing solution is prepared by the process for producing a sulfur-boron doped carbon material.

Implementing solution VI of the present invention also provides use of the sulfur-boron doped carbon material according to any embodiment of the aforementioned implementing solution VI of the present invention as an electrode material in electrochemistry.

Implementing solution VI of the present invention also provides a carbon-supported platinum group metal catalyst (e.g., a platinum on carbon catalyst), comprising a carbon support and a platinum group metal (e.g., a platinum metal) supported thereon, the carbon support being a sulfur-boron doped carbon material; wherein between 160 ev and 170 ev in the $S_{2P}$ spectrum peaks as analyzed by XPS for the carbon-supported platinum group metal catalyst (e.g. platinum on carbon catalyst), the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur).

In one embodiment of implementing solution VI, the carbon-supported platinum group metal catalyst (e.g., platinum on carbon catalyst) according to the present invention is free of doping elements other than sulfur and boron.

In one embodiment of implementing solution VI, the platinum group metal is platinum.

In one embodiment of implementing solution VI, the platinum on carbon catalyst according to the present invention does not contain other metallic element than platinum.

In one embodiment of implementing solution VI, in the carbon support of the carbon-supported platinum group metal catalyst (e.g. platinum on carbon catalyst) of the present invention, sulfur and boron are chemically bonded to the carbon material.

In one embodiment of implementing solution VI, the characteristic peak between 162 ev and 166 ev (preferably a characteristic peak of thiophenic sulfur) for the carbon-supported platinum group metal catalyst (e.g. platinum on carbon catalyst) according to the present invention is bimodal, positioned at 163.6±0.5 ev and 164.8±0.5 ev, respectively. (( In one embodiment of implementing solution VI, the $B_{1s}$ spectrum peaks in the XPS analysis of the carbon-supported platinum group metal catalyst (e.g., a platinum carbon catalyst) according to the present invention do not contain any characteristic peak positioned between 185 ev and 200 ev.

In one embodiment of implementing solution VI, for the carbon-supported platinum group metal catalyst (e.g. platinum on carbon catalyst) of the present invention, signals of boron ($B_2O_3$ and B) are detected out in a TG-MS test.

In one embodiment of implementing solution VI, the carbon-supported platinum group metal catalyst according to the present invention (e.g. platinum on carbon catalyst) comprises platinum in an content by weight of 0.1% to 80%, preferably from 20% to 70%, more preferably from 40% to 70%, based on the weight of the catalyst.

In one embodiment of implementing solution VI, the carbon-supported platinum group metal catalyst (e.g. platinum on carbon catalyst) according to the present invention has a resistivity of <10.0 Ω·m, preferably <2.0 Ω·m.

In one embodiment of implementing solution VI, the carbon-supported platinum group metal catalyst (e.g. platinum on carbon catalyst) according to the present invention has a specific surface of 80 m²/g-1500 m²/g, preferably 100 m²/g-200 m²/g.

In one embodiment of implementing solution I, for the carbon-supported platinum group metal catalyst (e.g. platinum on carbon catalyst) according to the present invention, the carbon material may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

Implementing solution VI of the present invention also provides a process for producing a carbon-supported platinum group metal catalyst (e.g. platinum on carbon catalyst), comprising:

(1) a step of producing a sulfur-boron doped carbon material: contacting a sulfur doped carbon material with a boron source (preferably mixing with a solution of the boron source, immersing and drying, more preferably mixing with an aqueous solution of the boron source, immersing and drying), and treating (preferably thermostatic treatment) in an inert gas at 300° C.-800° C. (preferably 400° C.-600° C.) for 0.5 h-10 h, to obtain the sulfur-boron doped carbon material;

(2) a step of supporting platinum group metal (e.g. platinum) using the sulfur-boron doped carbon material obtained in the (1) as a support.

According to the process for producing a carbon-supported platinum group metal catalyst of implementing solution VI of the present invention, the sulfur doped carbon material is produced by: contacting a carbon material with a sulfur source, and treating (preferably thermostatic treatment) in an inert gas at 400° C.-1500° C. (preferably 1000° C.-1500° C.) for 0.5 h-10 h, to obtain the sulfur doped carbon material.

According to the process for producing a carbon-supported platinum group metal catalyst of implementing solution VI of the present invention, during producing the sulfur doped carbon material, the weight ratio of the carbon material to the sulfur source, calculated as the sulfur element comprised in the sulfur source, is 20:1-2:1; preferably 10:1-4:1, more preferably 8:1-4:1.

According to the process for producing a carbon-supported platinum group metal catalyst of implementing solution VI of the present invention, during the step of doping boron, the weight ratio of the carbon material to the boron source, calculated as the boron element comprised in the boron source, is 100:1-5:1; preferably 60:1-15:1.

According to the process for producing a carbon-supported platinum group metal catalyst of implementing solution VI of the present invention, the sulfur source is one or more of elemental sulfur, hydrogen sulfide, carbon disulfide, sodium thiosulfate, thiophene, sulfate and sulfonate.

According to the process for producing a carbon-supported platinum group metal catalyst of implementing solution VI of the present invention, the boron source is one or more of boric acid and borate.

According to the process for producing a carbon-supported platinum group metal catalyst of implementing solution VI of the present invention, if temperature is required to be raised, the temperature-rising rate in the operations of doping sulfur and doping boron may be same or different, being each independently 1° C./min to 20° C./min, preferably 3° C./min to 15° C./min, and more preferably 8° C./min to 15° C./min.

According to the process for producing a carbon-supported platinum group metal catalyst of implementing solution VI of the present invention, the operation of doping boron may be carried out at a temperature of 400° C.-1500° C., e.g. 1000° C.-1500° C.

According to the process for producing a carbon-supported platinum group metal catalyst of implementing solution VI of the present invention, the operation of doping boron may be carried out at a temperature of 300° C.-800° C., preferably 400° C.-600° C.

According to the process for producing a carbon-supported platinum group metal catalyst of implementing solution VI of the present invention, the operations of doping sulfur and doping boron may be carried out for same or different duration, being each independently for 1 h-5 h, preferably 2 h-4 h. sulfur According to the process for producing a carbon-supported platinum group metal catalyst of implementing solution VI of the present invention, the carbon material may be graphene, carbon nanotubes or conductive carbon black. The conductive carbon black is EC-300J, EC-600JD, ECP600JD, VXC72, Black pears 2000, PRINTEX XE2-B, PRINTEX L6, or HIBLAXK 40B2.

According to the process for producing a carbon-supported platinum group metal catalyst according to implementing solution VI of the present invention, the carbon material has an oxygen content by weight of more than 4%, preferably 4% to 15%, in XPS analysis.

According to the process for producing a carbon-supported platinum group metal catalyst of implementing solution VI of the present invention, the carbon material has a resistivity of <10 $\Omega \cdot m$, preferably <5 $\Omega \cdot m$, and more preferably <2 $\Omega \cdot m$.

According to the process for producing a carbon-supported platinum group metal catalyst of implementing solution VI of the present invention, the carbon material has a specific surface area of 10 $m^2$/g to 2000 $m^2$/g, preferably 200 $m^2$/g-2000 $m^2$/g; and a pore volume of 0.02 mL/g-6 mL/g, preferably 0.2 mL/g-3 mL/g.

According to the process for producing a carbon-supported platinum group metal catalyst (e.g. platinum on carbon catalyst) of implementing solution VI of the present invention, the step of supporting the platinum group metal (e.g., platinum) comprises:

(a) dispersing the sulfur-boron doped carbon material obtained in the step (1) and a platinum group metal precursor (such as a platinum precursor) in an aqueous phase, and adjusting the pH value to 8-12 (preferably, adjusting the pH value to 10±0.5);

(b) adding a reducing agent for reduction; and (c) separating out the solid, and subjecting to post-treatment to obtain the carbon-supported platinum group metal (e.g., carbon-supported platinum) catalyst.

According to the process for producing a carbon-supported platinum group metal catalyst according to implementing solution VI of the present invention, in step (a), the platinum precursor is chloroplatinic acid, potassium chloroplatinate, or sodium chloroplatinate; and the concentration of the platinum precursor is 0.5 mol/L-5 mol/L.

According to the process for producing a carbon-supported platinum group metal catalyst of implementing solution VI of the present invention, in the step (b), the reducing agent is one or more selected from citric acid, ascorbic acid, formaldehyde, formic acid, ethylene glycol, sodium citrate, hydrazine hydrate, sodium borohydride, and glycerol.

According to the process for producing a carbon-supported platinum group metal catalyst of implementing solution VI of the present invention, in the step (b), the molar ratio of the reducing agent to platinum is 2 to 100.

According to the process for producing a carbon-supported platinum group metal catalyst of implementing solution VI of the present invention, in the step (b), the reduction is carried out at a temperature of 60° C.-90° C. for 4 h-15 h.

In one embodiment of implementing solution VI, the carbon-supported platinum group metal catalyst (e.g., platinum on carbon catalyst) of the present implementing solution is produced by the process for producing a carbon-supported platinum group metal catalyst (e.g., platinum on carbon catalyst).

Implementing solution VI of the present invention also provides a hydrogen fuel cell, which uses the carbon-supported platinum group metal catalyst according to any embodiment of implementing solution VI of the present invention described above in an anode and/or a cathode of the hydrogen fuel cell.

In one embodiment of implementing solution I, the carbon-supported platinum group metal catalyst (e.g., a platinum on carbon catalyst) according to the present invention, when used in an oxygen reduction reaction, has an ECSA reduction of <10% after 5000 cycles, and a specific activity reduction by weight of <10% after 5000 cycles.

In one embodiment of implementing solution VI, the carbon-supported platinum group metal catalyst (e.g., a platinum on carbon catalyst) according to the present invention, when used in an oxygen reduction reaction, in some Examples, has an ECSA>36 $m^2$ $g^{-1}$-Pt, such as 36 $m^2$ $g^{-1}$-Pt to 82 $m^2$ $g^{-1}$-Pt.

In one embodiment of implementing solution VI, the carbon-supported platinum group metal catalyst according to the present invention, when used in an oxygen reduction reaction, in some Examples, has a specific activity by weight of >0.146 A $mg^{-1}$-Pt, such as 0.146 A$mg^{-1}$-Pt to 0.233 A $mg^{-1}$-Pt.

In one embodiment of implementing solution VI, the carbon-supported platinum group metal catalyst according to the present invention, when used in an oxygen reduction reaction, has a half-wave potential >0.89V, such as 0.89 to 0.91V in some Examples.

In one embodiment of implementing solution VI, the carbon-supported platinum group metal catalyst according to the present invention is a platinum on carbon catalyst.

Implementing Solution VII

Implementing solution VII provides a sulfur-phosphorus doped carbon material, wherein between 160 ev and 170 ev in the $S_{2P}$ spectrum peaks as analyzed by XPS, the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur)

In one embodiment of implementing solution VII, the sulfur-phosphorus doped carbon material is free of doping elements other than sulfur and phosphorus.

In one embodiment of implementing solution VII, the sulfur-phosphorus doped material is free of metallic element.

In one embodiment of implementing solution VII, the characteristic peak between 162 ev and 166 ev (preferably a characteristic peak of thiophenic sulfur) for the sulfur-phosphorus doped carbon material according to the present invention is bimodal, positioned at 163.5±0.5 ev and 164.7±0.5 ev, respectively.

In one embodiment of implementing solution VII, the $P_{2p}$ spectrum peaks in the XPS analysis of the sulfur-phosphorus doped carbon material according to the present invention comprise one characteristic peak positioned at 133.5 ev±0.5 ev.

In one embodiment of implementing solution VI, the sulfur-phosphorus doped carbon material according to the present invention has a resistivity of <10.0 $\Omega \cdot m$, preferably <5.0 $\Omega \cdot m$, more preferably <3.0 $\Omega \cdot m$.

In one embodiment of implementing solution VII, the XPS analysis on the sulfur-phosphorus doped carbon material of the present invention shows comprising sulfur in a content by weight of 0.1%-5%, phosphorus in a content by weight of 0.01%-5%; preferably, sulfur in a content by weight of 0.02%-3%, phosphorus in a content by weight of 0.02%-3%; more preferably, sulfur in a content by weight of 0.3%-2%, and phosphorus in a content by weight of 0.05%-2%.

In one embodiment of implementing solution VII, the specific surface area and pore volume of the sulfur-phosphorus doped carbon material may vary over a wide range; for example, the specific surface area may be 10 m²/g-2000 m²/g, and the pore volume may be 0.02 mL/g-6.0 mL/g. In one embodiment, the specific surface area is 200 m²/g-2000 m²/g and the pore volume is 0.2 mL/g-3.0 mL/g.

In one embodiment of implementing solution VII, the sulfur-phosphorus doped carbon material according to the invention is sulfur-phosphorus doped graphene, sulfur-phosphorus doped carbon nanotubes, or sulfur-phosphorus doped conductive carbon black, preferably sulfur-phosphorus doped conductive carbon black.

In one embodiment of implementing solution VII, for the sulfur-phosphorus doped carbon material according to the present invention, the conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VII, the preparation method and source of the conductive carbon black are not particularly limited, for the sulfur-phosphorus doped carbon material of the present invention. The conductive carbon black can be acetylene black, furnace carbon black or the like.

In one embodiment of implementing solution VII, in the sulfur-phosphorus doped carbon material according to the present invention, sulfur and phosphorus are chemically bonded to the carbon material.

In one embodiment of implementing solution VII, the $O_{1_s}$ spectrum peaks in the XPS analysis of the sulfur-phosphorus doped carbon material according to the present invention comprise one symmetric and sharp characteristic peak positioned between 530 ev and 535 ev.

Implementing solution VII of the present invention also provides a process for producing a sulfur-phosphorus doped carbon material, comprising:

(1) a step of doping phosphorus: contacting a carbon material with a phosphorus source, and treating in an inert gas at 300° C.-800° C. for 0.5 h-10 h, to obtain the phosphorus doped carbon material;

(2) a step of doping sulfur: contacting the phosphorus doped carbon material of (1) with a sulfur source, and treating in an inert gas at 400° C.-1500° C. for 0.5 h-10 h, to obtain the sulfur-phosphorus doped carbon material;

In one embodiment of implementing solution VII, the sulfur-phosphorus doped carbon material of this implementing solution is prepared by the process for producing a sulfur-phosphorus doped carbon material.

In one embodiment of implementing solution VII, according to the process for producing a sulfur-phosphorus doped carbon material of the present invention, if temperature is required to be raised in steps (1) and (2), the temperature-rising rate is each independently 1° C./min to 20° C./min, preferably 3° C./min to 15° C./min, and more preferably 8° C./min to 15° C./min.

In one embodiment of implementing solution VII, the phosphorus source is not particularly limited in the process for producing the sulfur-phosphorus doped carbon material according to the present invention, and any phosphorus source that can be used in the art for doping carbon materials may be used in the present invention. The phosphorus source can be one or more of phosphoric acid, phosphate, pyrophosphate, polyphosphate, hydrogen phosphate, dihydrogen phosphate, phosphite and hypophosphite.

In one embodiment of implementing solution VII, for the process for producing a sulfur-phosphorus doped carbon material according to the invention, the weight ratio of the carbon material to the phosphorus source, calculated as the phosphorus element comprised in the phosphorus source, is 10000:1-20:1; preferably 2500:1-30:1.

In one embodiment of implementing solution VII, for the process for producing a sulfur-phosphorus doped carbon material of the present invention, the sulfur source is elemental sulfur.

In one embodiment of implementing solution VII, for the process for producing a sulfur-phosphorus doped carbon material according to the invention, the weight ratio of the carbon material to the sulfur source, calculated as the sulfur element comprised in the sulfur source, is 20:1-2:1; preferably, the ratio of 10:1-4:1, more preferably 8:1-4:1.

In one embodiment of implementing solution VII, for the process for producing a sulfur-phosphorus doped carbon material of the present invention, step (1) is carried out at a temperature of 400° C.-600° C.

In one embodiment of implementing solution VII, for the process for producing a sulfur, phosphorus doped carbon material of the present invention, step (2) may be carried out at a temperature of 400° C.-600° C., 600° C.-1000 or 1000° C.-1500° C.

In one embodiment of implementing solution VII, for the process for producing a sulfur-phosphorus doped carbon material of the present invention, steps (1) and (2) are each independently carried out for 1 h-5 h, preferably 2 h-4 h.

In one embodiment of implementing solution VII, according to the process for producing the sulfur-phosphorus doped carbon material of the present invention, the carbon material may be carbon nanotubes, conductive carbon black, or graphene. The conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VII, for the process for producing a sulfur-phosphorus doped carbon material of the present invention, the carbon material in step (1) has generally a $I_D/I_G$ value of 0.8-5, preferably 1-4. In the Raman spectrum, a peak at around 1320 cm⁻¹ is a D peak, and a peak at around 1580 cm⁻¹ is a G peak, $I_D$ representing the intensity of the D peak, and $I_G$ representing the intensity of the G peak.

In one embodiment of implementing solution VII, for the process for producing a sulfur-phosphorus doped carbon material of the present invention, the inert gas is nitrogen gas or argon gas.

In one embodiment of implementing solution VI, according to the process for producing a sulfur-boron doped carbon material of the present invention, the carbon material in step (1) has a resistivity of <10.0 Ω·m, preferably <5 Ω·m, more preferably <2 Ω·m. Ω·

In one embodiment of implementing solution VII, for the process for producing a sulfur-phosphorus doped carbon material of the present invention, the carbon material has an oxygen content by weight of more than 4%, preferably 4% to 15%, in XPS analysis.

In one embodiment of implementing solution VII, for the process for producing a sulfur-phosphorus doped carbon material of the present invention, the specific surface area of the carbon material in step (1) may vary over a wide range. Generally, the specific surface area is 10 $m^2/g$ to 2000 $m^2/g$; and the pore volume is 0.02 mL/g to 6 mL/g.

In one embodiment of implementing solution VII, in step (1) according to the process for producing a sulfur-phosphorus doped carbon material, the carbon material is contacted with a phosphorus source in a manner such that: the carbon material is immersed in an aqueous solution of a phosphorus source and then dried.

In one embodiment of implementing solution VII, in step (2) according to the process for producing a sulfur-sulfur doped carbon material, the phosphorus doped carbon material is contacted with a sulfur source in a manner such that: the phosphorus doped carbon material is mixed with elemental sulfur.

In one embodiment of implementing solution VII, according to the process for producing a sulfur-phosphorus doped carbon material of the present invention, the process of producing the sulfur-phosphorus doped carbon material does not involve the use of a metal-containing catalyst.

In one embodiment of implementing solution VII, the sulfur-phosphorus doped carbon material of this implementing solution is prepared by the process for producing a sulfur-phosphorus doped carbon material.

Implementing solution VII of the present invention also provides use of the sulfur-phosphorus doped carbon material according to any embodiment of the aforementioned implementing solution VII of the present invention as an electrode material in electrochemistry.

Implementing solution VII of the present invention also provides a carbon-supported platinum group metal catalyst (e.g., a platinum on carbon catalyst), comprising a carbon support and a platinum group metal (e.g., a platinum metal) supported thereon, the carbon support being a sulfur-phosphorus doped carbon material; wherein between 160 ev and 170 ev in the $S_{2P}$ spectrum peaks as analyzed by XPS for the carbon-supported platinum group metal catalyst (e.g. platinum on carbon catalyst), the peak area between 162 ev and 166 ev (preferably a characteristic peak of thiophenic sulfur) accounts for greater than 92%, or greater than 95%, or greater than 98%, or there is only a characteristic peak positioned between 162 ev and 166 ev (preferably a characteristic peak of thiophenic sulfur).

In one embodiment of implementing solution VII, the carbon-supported platinum group metal catalyst (e.g., platinum on carbon catalyst) according to the present invention is free of doping elements other than sulfur and phosphorus.

In one embodiment of implementing solution VII, the platinum group metal is platinum.

In one embodiment of implementing solution VII, the carbon-supported platinum group metal catalyst (e.g., platinum on carbon catalyst) according to the present invention is free of metallic elements other than platinum.

In one embodiment of implementing solution VII, in the carbon-supported platinum group metal catalyst (e.g., platinum on carbon catalyst) according to the present invention, sulfur and phosphorus are chemically bound to the carbon material.

In one embodiment of implementing solution VII, the $P_{2p}$ spectrum peaks in the XPS analysis of the carbon-supported platinum group metal catalyst (e.g., a platinum carbon catalyst) according to the present invention do not contain any characteristic peak positioned between 125 ev and 145 ev.

In one embodiment of implementing solution VII, for the carbon-supported platinum group metal catalyst (e.g., a platinum carbon catalyst) according to the present invention, the sulfur-phosphorus doped carbon material is sulfur-phosphorus doped graphene, sulfur-phosphorus doped carbon nanotubes, or sulfur-phosphorus doped conductive carbon black.

In one embodiment of implementing solution VII, for the carbon-supported platinum group metal catalyst (e.g. platinum on carbon catalyst) according to the present invention, the conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VII, for the carbon-supported platinum group metal catalyst (e.g., platinum on carbon catalyst) according to the present invention, the preparation method and source of the conductive carbon black are not particularly limited.

The conductive carbon black can be acetylene black, furnace carbon black or the like.

In one embodiment of implementing solution VII, the carbon-supported platinum group metal catalyst according to the present invention (e.g. platinum on carbon catalyst) comprises platinum in an content by weight of 0.1% to 80%, preferably from 20% to 70%, more preferably from 40% to 70%, based on the weight of the catalyst.

In one embodiment of implementing solution VII, the carbon-supported platinum group metal catalyst (e.g. platinum on carbon catalyst) according to the present invention has a resistivity of <10.0 $\Omega \cdot m$, preferably <2.0 $\Omega \cdot m$.

In one embodiment of implementing solution VII, the carbon-supported platinum group metal catalyst (e.g. platinum on carbon catalyst) according to the present invention has a specific surface of 80 $m^2/g$-1500 $m^2/g$, preferably 100 $m^2/g$-200 $m^2/g$.

In one embodiment of implementing solution VII, for the carbon-supported platinum group metal catalyst (e.g. platinum on carbon catalyst) of the present invention, signals of phosphorus (P, $P_2O_3$ and $P_2O_5$) are detected out in a TG-MS test.

Implementing solution VII of the present invention also provides a process for producing a carbon-supported platinum group metal catalyst (e.g. platinum on carbon catalyst), comprising:

(1) a step of producing a phosphorus doped carbon material: contacting a carbon material with a phosphorus source, and treating in an inert gas at 300° C.-800° C. for 0.5 h-10 h, to obtain the phosphorus doped carbon material;

(2) a step of producing a sulfur-phosphorus doped carbon material: contacting the phosphorus doped carbon material of (1) with a sulfur source, and treating in an inert gas at 400° C.-1500° C. for 0.5 h-10 h, to obtain the sulfur-phosphorus doped carbon material;

(3) a step of supporting platinum group metal (e.g. platinum) using the sulfur-phosphorus doped carbon material obtained in the (2) as a support.

According to the process for producing a carbon-supported platinum group metal catalyst of implementing solution VII of the present invention, if temperature is required to be raised in steps (1) and (2), the temperature-rising rate is each independently 1° C./min to 20° C./min, preferably 3° C./min to 15° C./min, and more preferably 8° C./min to 15° C./min.

According to the process for producing a carbon-supported platinum group metal catalyst of implementing solution VII of the present invention, the phosphorus source is one or more of phosphoric acid, phosphate, pyrophosphate, polyphosphate, hydrogen phosphate, dihydrogen phosphate, phosphite and hypophosphite.

According to the process for producing a carbon-supported platinum group metal catalyst of implementing solution VII of the present invention, during step (1), the weight ratio of the carbon material to the phosphorus source, calculated as the phosphorus element comprised in the phosphorus source, is 10000:1-20:1; preferably 2500:1-30:1.

According to the process for producing a carbon-supported platinum group metal catalyst of implementing solution VII of the present invention, the sulfur source is elemental sulfur.

According to the process for producing a carbon-supported platinum group metal catalyst of implementing solution VII of the present invention, during step (2), the weight ratio of the carbon material to the sulfur source, calculated as the sulfur element comprised in the sulfur source, is 20:1-2:1; preferably 10:1-4:1, more preferably 8:1-4:1.

According to the process for producing a carbon-supported platinum group metal catalyst of implementing solution VII of the present invention, step (1) is carried out at a temperature of 400° C.-600° C.

According to the process for producing a carbon-supported platinum group metal catalyst of implementing solution VII of the present invention, step (2) may be carried out at a temperature of 400° C.-600° C., 600° C.-1000° C. or 1000° C.-1500° C.

According to the process for producing a carbon-supported platinum group metal catalyst of implementing solution VII of the present invention, steps (1) and (2) are each independently carried out for 1 h-5 h, preferably 2 h-4 h.

According to the process for producing a carbon-supported platinum group metal catalyst of implementing solution VII of the present invention, the carbon material is graphene, conductive carbon black or carbon nanotubes. The conductive carbon black is EC-300J, EC-600JD, ECP600JD, VXC72, Black pears 2000, PRINTEX XE2-B, PRINTEX L6, or HIBLAXK 40B2.

According to the process for producing a carbon-supported platinum group metal catalyst according to implementing solution VII of the present invention, the carbon material has an oxygen content by weight of more than 4%, preferably 4% to 15%, in XPS analysis of step (1).

According to the process for producing a carbon-supported platinum group metal catalyst of implementing solution VII of the present invention, in step (1), the carbon material has a resistivity of <10 Ω·m, preferably <5 Ω·m, and more preferably <2 Ω·m.

According to the process for producing a carbon-supported platinum group metal catalyst of implementing solution VII of the present invention, in step (1), the carbon material has a specific surface area of 10 $m^2$/g to 2000 $m^2$/g, preferably 200 $m^2$/g-2000 $m^2$/g; and a pore volume of 0.02 mL/g-6 mL/g, preferably 0.2 mL/g-3 mL/g.

According to the process for producing a carbon-supported platinum group metal catalyst of implementing solution VII of the present invention, in step (1), the carbon material is contacted with a phosphorus source in a manner such that: the carbon material is immersed in an aqueous solution of a phosphorus source and then dried.

According to the process for producing a carbon-supported platinum group metal catalyst of implementing solution VII of the present invention, in step (2), the phosphorus doped carbon material is contacted with a sulfur source in a manner such that: the phosphorus doped carbon material is mixed with elemental sulfur.

According to the process for producing a carbon-supported platinum group metal catalyst of implementing solution VII of the present invention, the step of supporting the platinum group metal (e.g., platinum) comprises:
  (a) dispersing the sulfur-phosphorus doped carbon material obtained in the step (2) and a platinum group metal precursor (such as a platinum precursor) in an aqueous phase, and adjusting the pH value to 8-12 (preferably, adjusting the pH value to 10±0.5);
  (b) adding a reducing agent for reduction; and
  (c) separating out the solid, and subjecting to post-treatment to obtain the carbon-supported platinum group metal (e.g., carbon-supported platinum) catalyst.

According to the process for producing a carbon-supported platinum group metal catalyst of implementing solution VII of the present invention, in step (a), the platinum precursor is chloroplatinic acid, potassium chloroplatinate, or sodium chloroplatinate; and the concentration of the platinum precursor is 0.5 mol/L-5 mol/L.

According to the process for producing a carbon-supported platinum group metal catalyst of implementing solution VII of the present invention, in step (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; and the reduction is carried out at a temperature of 60° C.-90° C. for 4 h-15 h.

In one embodiment of implementing solution VII, the carbon-supported platinum group metal catalyst (e.g., platinum on carbon catalyst) of the present implementing solution is produced by the process for producing a carbon-supported platinum group metal catalyst (e.g., platinum on carbon catalyst).

Implementing solution VII of the present invention also provides a hydrogen fuel cell, which uses the sulfur-phosphorus doped carbon material according to any embodiment above or the carbon-supported platinum group metal catalyst according to any embodiment above in an anode and/or a cathode of the hydrogen fuel cell.

In one embodiment of implementing solution VII, the carbon-supported platinum group metal catalyst according to the present invention is a platinum on carbon catalyst.

Implementing Solution VIII

Implementing solution VIII of the present invention provides a sulfur-phosphorus-boron doped carbon material, wherein between 160 ev and 170 ev in the $S_{2P}$ spectrum peaks thereof as analyzed by XPS, there is only a characteristic peak positioned between 162 ev and 166 ev (preferably a characteristic peak of thiophenic sulfur).

In one embodiment of implementing solution VIII, in the sulfur-phosphorus-boron doped carbon material according to the present invention, sulfur, phosphorus and boron are chemically bonded to the carbon material.

In one embodiment of implementing solution VIII, the sulfur-boron-boron doped carbon material is free of doping elements other than sulfur, phosphorus and boron.

In one embodiment of implementing solution VIII, the sulfur-phosphorus-boron doped carbon material is free of metallic element.

In one embodiment of implementing solution VIII, for the sulfur-phosphorus-boron doped carbon material according to the present invention, the characteristic peak of thiophenic sulfur is positioned between 162 ev and 166 ev.

In one embodiment of implementing solution VIII, the characteristic peak between 162 ev and 166 ev (preferably a characteristic peak of thiophenic sulfur) for the sulfur-phosphorus-boron doped carbon material according to the present invention is bimodal, positioned at $163.4 \pm 0.5$ ev and $164.6 \pm 0.5$ ev, respectively.

In one embodiment of implementing solution VIII, in the $P_{2p}$ spectrum peaks by the XPS analysis of the sulfur-phosphorus-boron doped carbon material according to the present invention, there are two characteristic peaks between 132.5 ev and 134.5 ev, without other characteristic peak between 125 ev and 145 ev.

In one embodiment of implementing solution VIII, the $B_{1s}$ spectrum peaks in the XPS analysis of the sulfur-phosphorus-boron doped carbon material according to the present invention comprise one characteristic peak positioned between 190.2 ev and 191.2 ev.

In one embodiment of implementing solution VIII, in the $B_{1s}$ spectrum peaks by the XPS analysis of the sulfur-phosphorus-boron doped carbon material according to the present invention, there are one characteristic peak positioned between 190.2 ev and 191.2 ev, and one characteristic peak positioned between 191.3 ev and 192.3 ev, without other characteristic peak between 185 ev and 200 ev.

In one embodiment of implementing solution VIII, the XPS analysis on the boron-phosphorus-boron doped carbon material of the present invention shows comprising sulfur in a content by weight of 0.01%-4%, phosphorus in a content by weight of 0.01%-4%, and boron in a content by weight of 0.01%-4%; preferably, sulfur in a content by weight of 0.1%-3%, phosphorus in a content by weight of 0.02%-2%, and boron in a content by weight of 0.05%-3%.

In one embodiment of implementing solution VIII, for the process sulfur-phosphorus-boron doped carbon material of the present invention, the carbon material has a sulfur content by weight of 0.1%-0.6%, preferably phosphorus in a content by weight of 0.01%-0.1%, and preferably, boron in a content by weight of 0.1%-1%, in the XPS analysis of some Examples.

In one embodiment of implementing solution VIII, the sulfur-phosphorus-boron doped carbon material according to the present invention has a resistivity of <10 $\Omega \cdot m$, preferably <5 $\Omega \cdot m$, more preferably <3 $\Omega \cdot m$.

In one embodiment of implementing solution VIII, the oxygen content of the sulfur-phosphorus-boron doped carbon material is not particularly limited. Generally, the XPS analysis shows an oxygen content by weight of 2%-15%.

In one embodiment of implementing solution VIII, the specific surface area and pore volume of the sulfur-phosphorus-boron doped carbon material may vary over a wide range; for example, the specific surface area may be 10 $m^2/g$-2000 $m^2/g$, and the pore volume may be 0.02 mL/g-6.0 mL/g. In one embodiment, the specific surface area is 200 $m^2/g$-2000 $m^2/g$ and the pore volume is 0.2 mL/g-3.0 mL/g.

In one embodiment of implementing solution VIII, the boron-sulfur-phosphorus doped carbon material according to the present invention may be boron-sulfur-phosphorus doped graphene, boron-sulfur-phosphorus doped carbon nanotubes or boron-sulfur-phosphorus doped conductive carbon black. The conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VIII, for the sulfur-phosphorus-boron doped carbon material according to the present invention, the preparation method and source of the conductive carbon black are not particularly limited. The conductive carbon black can be acetylene black, furnace carbon black or the like.

In one embodiment of implementing solution VIII, for the sulfur-phosphorus-boron doped carbon material according to the present invention, the graphene or the carbon nanotube may be graphene or a carbon nanotube that is not subjected to oxidation treatment, or may be graphene or a carbon nanotube that has been subjected to oxidation treatment.

Implementing solution VIII of the present invention also provides a process for doping a carbon material, comprising: (1) contacting firstly a carbon material with a phosphorus source and a boron source, and treating in an inert gas at 300° C.-800° C. (preferably thermostatic treatment) for 0.5 h-10 h, to obtain a phosphorus-boron doped carbon material; (2) then contacting with a sulfur source, and treating in an inert gas at 1000° C.-1500° C. for 0.5 h-10 h, to obtain the sulfur-phosphorus-boron doped carbon material.

In one embodiment of implementing solution VIII, according to the process for doping the carbon material of the present invention, the carbon material may be carbon nanotubes, conductive carbon black, or graphene. The conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VIII, as to the process for doping a carbon material according to the present invention, the graphene or the carbon nanotube may be graphene or a carbon nanotube that is not subjected to oxidation treatment, or may be graphene or a carbon nanotube that has been subjected to oxidation treatment.

In one embodiment of implementing solution VIII, as to the process for doping a carbon material according to the present invention, the preparation method and source of the conductive carbon black are not particularly limited. The conductive carbon black can be acetylene black, furnace carbon black or the like.

In one embodiment of implementing solution VIII, as to the process for doping a carbon material of the present invention, the carbon material has generally a $I_D/I_G$ value of 0.8-5, preferably 1-4. In the Raman spectrum, a peak at around 1320 $cm^{-1}$ is a D peak, and a peak at around 1580 $cm^{-1}$ is a G peak, $I_D$ representing the intensity of the D peak, and $I_G$ representing the intensity of the G peak.

According to implementing solution VIII of the present invention, the manner by which the carbon material is contacted with the phosphorus source and boron source is not limited, and one skilled in the art can select an appropriate manner based on the teaching by the present invention and/or prior knowledge. According to the present invention, the manner of mixing to contact the carbon material with the phosphorus source and boron source is preferred.

According to implementing solution VIII of the present invention, the sequence and manner of the mixing by which the carbon material is contacted with the phosphorus source and boron source is nor limited, and one skilled in the art is ready to select an appropriate manner based on the teaching by the present invention and/or prior knowledge. The present invention provides a preferred mixing manner, comprising: mixing the carbon material with a solution (preferably an aqueous solution) of a phosphorus source and a boron source, immersing and drying.

According to implementing solution VIII of the present invention, the manner by which the phosphorus-boron doped carbon material (an intermediate product) is contacted with the sulfur source is not limited, and one skilled in the art can select an appropriate manner based on the teaching by the present invention and/or prior knowledge. According to the process for doping a carbon material of the present invention, the manner of mixing to contact the intermediate product with a sulfur source (such as elemental sulfur) is preferred.

In one embodiment of implementing solution VIII, as to the process for doping a carbon material according to the present invention, if temperature is required to be raised, the temperature-rising rate during doping phosphorus-boron is 3° C./min-7° C./min, while the temperature-rising rate during doping sulfur is 8° C./min-10° C./min.

In one embodiment of implementing solution VIII, as to the process for doping a carbon material of the present invention, steps (1) and (2) are each independently carried out for 1 h-5 h, preferably 2 h-4 h.

In one embodiment of implementing solution VIII, as to the process for doping a carbon material of the present invention, step (1) is carried out at a temperature of 450° C.-700° C.

In one embodiment of implementing solution VIII, as to the process for doping a carbon material of the present invention, step (2) is carried out at a temperature of 1150° C.-1450° C.

In one embodiment of implementing solution VIII, as to the process for doping a carbon material according to the present invention, the sulfur source is elemental sulfur.

In one embodiment of implementing solution VIII, as to the process for doping a carbon material of the present invention, the weight ratio of the carbon material to the sulfur source, calculated as the sulfur element comprised in the sulfur source, is 20:1-2:1; preferably 10:1-4:1, more preferably 8:1-4:1.

In one embodiment of implementing solution VIII, as to the process for doping a carbon material of the present invention, the phosphorus source is one or more of phosphoric acid, phosphate, pyrophosphate, polyphosphate, hydrogen phosphate, dihydrogen phosphate, phosphite and hypophosphite.

In one embodiment of implementing solution VIII, as to the process for doping a carbon material of the present invention, the weight ratio of the carbon material to the phosphorus source, calculated as the phosphorus element comprised in the phosphorus source, is 10000:1-10:1; preferably 2000:1-20:1.

In one embodiment of implementing solution VIII, as to the process for doping a carbon material according to the present invention, the boron source is one or more of boric acid and borate.

In one embodiment of implementing solution VIII, as to the process for doping a carbon material of the present invention, the weight ratio of the carbon material to the boron source, calculated as the boron element comprised in the boron source, is 10000:1-10:1; preferably 2000:1-20:1.

In one embodiment of implementing solution VIII, as to the process for doping a carbon material according to the present invention, the inert gas is nitrogen gas or argon gas.

In one embodiment of implementing solution VIII, according to the process for doping a carbon material of the present invention, the XPS analysis of the carbon material shows an oxygen content by weight of generally greater than 4%, preferably 4%-15%.

In one embodiment of implementing solution VIII, as to the process for doping a carbon material carbon material according to the present invention the carbon material has a resistivity of <10 $\Omega \cdot m$, preferably <5 $\Omega \cdot m$, more preferably <2 $\Omega \cdot m$.

In one embodiment of implementing solution VIII, according to the process for doping the carbon material of the present invention, the specific surface area of the carbon material may vary over a wide range. Generally, the specific surface area is 10 $m^2/g$ to 2000 $m^2/g$; and the pore volume is 0.02 mL/g to 6 mL/g.

In one embodiment of implementing solution VIII, as to the process for doping a carbon material according to the present invention, one embodiment comprises: (1) drying the carbon material after immersion with a phosphorus source and a boron source in an aqueous solution, placing in a tube furnace, heating in inert gas to 300° C.-800° C. (preferably 450° C.-700° C.) at a rate of 3° C./min-7° C./min, followed by a thermostatic treatment for 0.5 h to 10 h, to obtain a phosphorus-boron doped carbon material (intermediate product); (2) mixing the intermediate product with sulfur powder, placing again in a tube furnace, heating in inert gas to 1000° C.-1500° C. (preferably 1150° C.-1450° C.) at a rate of 8° C./min-10° C./min, followed by a thermostatic treatment for 0.5 h to 10 h, to obtain the sulfur-phosphorus-boron carbon material of the present invention.

The inert gas is nitrogen gas or argon gas.

In one embodiment of implementing solution embodiment VIII, according to the process for doping a carbon material of the present invention, the process for doping the carbon material does not involve the use of a metal-containing catalyst.

In one embodiment of implementing solution VIII, the sulfur-phosphorus-boron doped carbon material of this implementing solution is prepared by the process for producing a sulfur-phosphorus-boron doped carbon material.

Implementing solution VIII of the present invention also provides use of the sulfur-phosphorus-boron doped carbon material according to any embodiment of the aforementioned implementing solution VIII of the present invention as an electrode material in electrochemistry.

Implementing solution VII of the present invention also provides a carbon-supported platinum group metal catalyst (e.g., a platinum carbon catalyst), comprising a carbon support and a platinum group metal (e.g., a platinum metal) supported thereon, wherein the carbon support is a sulfur-phosphorus-boron doped carbon material, and between 160 ev and 170 ev in the $S_{2P}$ spectrum peaks thereof as analyzed by XPS, there is only a characteristic peak positioned between 162 ev and 166 ev (preferably a characteristic peak of thiophenic sulfur).

In one embodiment of implementing solution VIII, for the carbon-supported platinum group metal (e.g. platinum on carbon catalyst) according to the present invention, the characteristic peak of thiophenic sulfur is positioned between 162 ev and 166 ev.

In one embodiment of implementing solution VIII, the characteristic peak between 162 ev and 166 ev (preferably a characteristic peak of thiophenic sulfur) for the carbon-supported platinum group metal catalyst (e.g. platinum on carbon catalyst) according to the present invention is bimodal, positioned at 163.3±0.5 ev and 164.6±0.5 ev, respectively.

In one embodiment of implementing solution VIII, in the XPS analysis of the carbon-supported platinum group metal catalyst (e.g., a platinum carbon catalyst) according to the present invention, there is not $B_{1s}$ characteristic peak between 185 ev and 200 ev and there is not $P_{2p}$ characteristic peak between 125 ev and 145 ev.

In one embodiment of implementing solution VIII, for the carbon-supported platinum group metal catalyst (e.g. platinum on carbon catalyst) of the present invention, signals of P, $P_2O_3$ and $P_2O_5$ are detected out in a TG-MS test.

In one embodiment of implementing solution VIII, for the carbon-supported platinum group metal catalyst (e.g. platinum on carbon catalyst) of the present invention, signals of boron (B and $B_2O_3$) are detected out in a TG-MS (thermogravimetry-mass spectrometry) test.

In one embodiment of implementing solution VIII, the carbon-supported platinum group metal catalyst (e.g., platinum on carbon catalyst) according to the present invention is free of doping elements other than sulfur, phosphorus and boron.

In one embodiment of implementing solution VIII, the platinum group metal is platinum.

In one embodiment of implementing solution VIII, the carbon-supported platinum group metal catalyst (e.g., platinum on carbon catalyst) according to the present invention is free of metallic elements other than platinum.

In one embodiment of implementing solution VIII, in the carbon-supported platinum group metal catalyst (e.g., platinum on carbon catalyst) according to the present invention, sulfur, phosphorus and boron are chemically bound to the carbon material.

In one embodiment of implementing solution VIII, for the carbon-supported platinum group metal (e.g. platinum on carbon catalyst) according to the present invention, the carbon support is any one of the sulfur-phosphorus-boron doped carbon materials of the present invention mentioned above.

In one embodiment of implementing solution VIII, for the carbon-supported platinum group metal catalyst (e.g., a platinum carbon catalyst) according to the present invention, the sulfur-phosphorus-boron doped carbon material may be sulfur-phosphorus-boron doped graphene, sulfur-phosphorus-boron doped carbon nanotubes, or sulfur-phosphorus-boron doped conductive carbon black. The conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

In one embodiment of implementing solution VIII, the carbon-supported platinum group metal catalyst according to the present invention (e.g. platinum on carbon catalyst) comprises platinum in an content by weight of 0.1% to 80%, preferably from 20% to 70%, more preferably from 40% to 70%, based on the weight of the catalyst.

In one embodiment of implementing solution VIII, the carbon-supported platinum group metal catalyst (e.g. platinum on carbon catalyst) according to the present invention has a resistivity of <10.0 Ω·m, preferably <2.0 Ω·m.

In one embodiment of implementing solution VIII, the carbon-supported platinum group metal catalyst (e.g. platinum on carbon catalyst) according to the present invention has a specific surface of 80 $m^2$/g-1500 $m^2$/g, preferably 100 $m^2$/g-200 $m^2$/g.

Implementing solution VIII of the present invention also provides a process for producing a carbon-supported platinum group metal catalyst (e.g. platinum on carbon catalyst), comprising:

(1) a step of producing a carbon support: contacting firstly a carbon material with a phosphorus source and a boron source, and treating in an inert gas at 300° C.-800° C. for 0.5 h-10 h; and then contacting with a sulfur source and a nitrogen source, and treating in an inert gas at 1000° C.-1500° C. for 0.5 h-10 h, to obtain the carbon support;

(2) a step of supporting a platinum group metal (e.g. platinum) using the carbon support obtained (1).

According to the process for producing a carbon-supported platinum group metal catalyst according to implementing solution VIII of the present invention, in the step (1), the manner of contacting "the carbon material with the sulfur source, the phosphorus source, and the boron source" is the same as that of the corresponding parts mentioned above, and the details thereof are not repeated here.

According to the process for producing a carbon-supported platinum group metal catalyst of implementing solution VIII of the present invention, the sulfur source is elemental sulfur.

According to the process for producing a carbon-supported platinum group metal catalyst of implementing solution VIII of the present invention, during step (1), the weight ratio of the carbon material to the sulfur source, calculated as the sulfur element comprised in the sulfur source, is 20:1-2:1; preferably 10:1-4:1, more preferably 8:1-4:1.

According to the process for producing a carbon-supported platinum group metal catalyst of implementing solution VIII of the present invention, the phosphorus source is one or more of phosphoric acid, phosphate, pyrophosphate, polyphosphate, hydrogen phosphate, dihydrogen phosphate, phosphite and hypophosphite.

According to the process for producing a carbon-supported platinum group metal catalyst of implementing solution VIII of the present invention, during step (1), the weight ratio of the carbon material to the phosphorus source, calculated as the phosphorus element comprised in the phosphorus source, is 10000:1-10:1; preferably 2000:1-20:1.

According to the process for producing a carbon-supported platinum group metal catalyst of implementing solution VIII of the present invention, the boron source is one or more of boric acid and borate.

According to the process for producing a carbon-supported platinum group metal catalyst of implementing solution VIII of the present invention, during step (1), the weight ratio of the carbon material to the boron source, calculated as the boron element comprised in the boron source, is 10000:1-10:1; preferably 2000:1-20:1.

According to the process for producing a carbon-supported platinum group metal catalyst of implementing solution VIII of the present invention, during step (1), if temperature is required to be raised, the temperature-rising rate during doping phosphorus-boron is 3° C./min-7° C./min, while the temperature-rising rate during doping sulfur is 8° C./min-10° C./min.

According to the process for producing a carbon-supported platinum group metal catalyst of implementing solution VIII of the present invention, the operation of doping phosphorus-boron in step (1) is carried out at a temperature of 450° C.-700° C.

According to the process for producing a carbon-supported platinum group metal catalyst of implementing solution VIII of the present invention, the operation of doping sulfur-nitrogen in step (1) is carried out at a temperature of 1150° C.-1450° C.

According to the process for producing a carbon-supported platinum group metal catalyst of implementing solution VIII of the present invention, the operation of doping phosphorus-boron in step (1) is carried out for 1 h-5 h, preferably 2 h-4 h.

According to the process for producing a carbon-supported platinum group metal catalyst of implementing solution VIII of the present invention, the operation of doping sulfur-nitrogen in step (2) is carried out for 1 h-5 h, preferably 2 h-4 h.

According to the process for producing a carbon-supported platinum group metal catalyst of implementing solution VIII of the present invention, in step (1), the carbon material may be graphene, conductive carbon black or carbon nanotubes; the conductive carbon black is preferably EC-300J, EC-600JD, ECP600JD, VXC72, Black pears 2000, PRINTEX XE2-B, PRINTEX L6, or HIBLAXK 40B2.

According to the process for producing a carbon-supported platinum group metal catalyst according to implementing solution VIII of the present invention, the sulfur-phosphorus-boron doped carbon material produced in step (1) can be easily dispersed in an aqueous phase.

However, it is difficult to disperse some carbon materials, such as Ketjen black, directly in the aqueous phase.

According to the process for producing a carbon-supported platinum group metal catalyst according to implementing solution VIII of the present invention, the carbon material has an oxygen content by weight of more than 4%, preferably 4% to 15%, in XPS analysis of step (1).

According to the process for producing a carbon-supported platinum group metal catalyst of implementing solution VIII of the present invention, in step (1), the carbon material has a resistivity of <10 Ω·m, preferably <5 Ω·m, and more preferably <2 Ω·m.

According to the process for producing a carbon-supported platinum group metal catalyst of implementing solution VIII of the present invention, in step (1), the carbon material has a specific surface area of 10 m²/g to 2000 m²/g, preferably 200 m²/g-2000 m²/g; and a pore volume of 0.02 mL/g-6 mL/g, preferably 0.2 mL/g-3 mL/g.

In one embodiment of implementing solution VIII, the carbon-supported platinum group metal catalyst (e.g., platinum on carbon catalyst) of the present implementing solution is produced by the process for producing a carbon-supported platinum group metal catalyst (e.g., platinum on carbon catalyst).

Implementing solution VIII of the present invention also provides a hydrogen fuel cell, which uses the carbon-supported platinum group metal catalyst according to any embodiment of implementing solution VIII of the present invention described above in an anode and/or a cathode of the hydrogen fuel cell.

In one embodiment of implementing solution VIII, the carbon-supported platinum group metal catalyst according to the present invention is a platinum on carbon catalyst.

EXAMPLES

The present invention will be described in detail with reference to specific examples.

The following Examples can help those skilled in the art in further understanding the present invention, but are not intended to limit the invention in any manner.

Unless otherwise specified, all reagents used in the invention are analytically pure, and all reagents are commercially available.

Implementing Solution I

Reagents, Instruments and Tests

The invention detects elements on the surface of a material by an X-ray photoelectron spectrum analyzer (XPS). The X-ray photoelectron spectrum analyzer used was an ESCALB 220i-XL type ray electron spectrometer which is produced by VG Scientifc company which was equipped with Avantage V5.926 software, and the analysis and test conditions of the X-ray photoelectron spectrum analyzer were as follows: an excitation source of a monochromatized A1K α X-ray with a power of 330 W and a base vacuum of $3 \times 10^{<-9>}$ mbar for analytical testing. In addition, the electron binding energy was corrected with the C1s peak (284.3 eV) of elemental carbon, and the late peak fitting software was XPSPEAK.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636 A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 0.6V to 0.95V in $O_2$ saturated 0.1M $HClO_4$ and then testing for LSV and ECSA as described above. During the test, the catalyst was produced into homogeneously dispersed slurry and coated on a glassy carbon electrode with a diameter of 5 mm, and the platinum content of the catalyst on the electrode was 3 μg-4 μg.

Resistivity test: a four-probe resistivity tester was used, instrument model KDY-1, and process and test conditions: the applied pressure was 3.9±0.03 MPa, and the current was 500±0.1 mA.

VXC72 (Vulcan XC72, produced by Kabot company, USA) was purchased from Suzhou Yilongcheng energy science and technology Co., Ltd. The results of the tests by the instrument and process above showed that: the specific surface area was 258 m²/g, the pore volume was 0.388 mL/g, the oxygen content by weight was 8.72%, the $I_D/I_G$ was 1.02, and the resistivity was 1.22 Ω·m.

Ketjenblack ECP600JD Ketjen black, produced by Lion company, Japan) was purchased from Suzhou Yilongcheng energy science and technology Co., Ltd. The results of the tests by the instrument and process above showed that: the specific surface area was 1362 m²/g, the pore volume was 2.29 mL/g, the oxygen content by weight was 6.9%, the $I_D/I_G$ was 1.25, and the resistivity was 1.31 Ω·m.

A commercial platinum on carbon catalyst (a trademark of HISPEC4000, from Johnson Matthey company) was purchased from Alfa Aesar. The test result showed that: the platinum content by weight was 40.2%.

Example I-1

This Example illustrated the preparation of a sulfur doped carbon support according to the invention.

Ketjenblack ECP600JD was placed into a tube furnace, a carrier gas (nitrogen) was fed into the tube furnace after passing through a bubbling bottle filled with thiophene, heated to 1200° C. at a rate of 10° C./min, and thermostatic treatment was carried out for 3 h; and naturally cooled to obtain the sulfur doped carbon material, designated as carbon support A. The weight ratio of Ketjenblack ECP600JD to thiophene was 20:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

The sulfur content by weight by XPS analysis was 0.76%; the oxygen content by weight by XPS analysis was 12.8%; the specific surface area was 1161 m²/g, and the pore volume was 2.15 mL/g; $I_D/I_G$ was 1.19; the resistivity was 1.37 Ω·m.

Figure 1A:
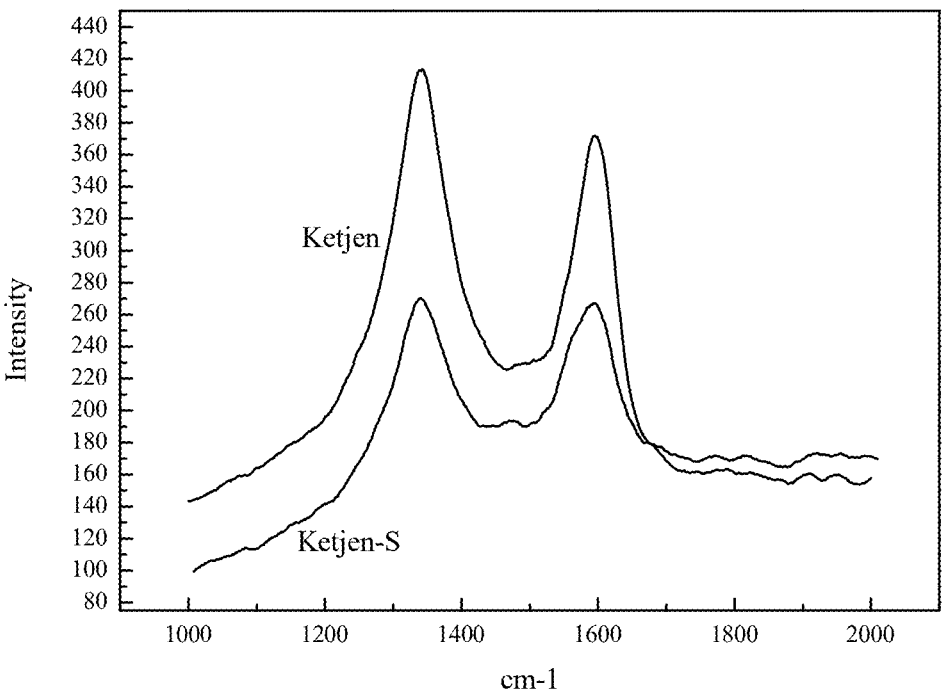
FIG. 1A shows a Raman spectrum of the sulfur doped carbon material (Ketjen-S) and Ketjen of Example I-1.

FIG. 1A is a Raman spectrum of the sulfur doped carbon material (Ketjen-S) and Ketjen of Example 1.

Figure 1B:
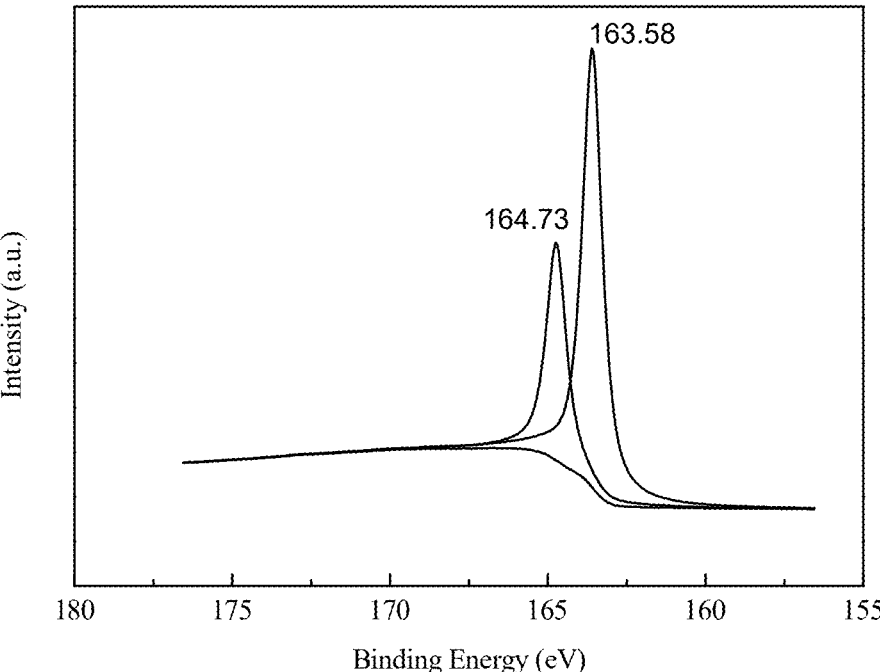
FIG. 1B shows an XPS spectrum of the sulfur doped carbon material of Example I-1.

FIG. 1B shows an XPS spectrum of the sulfur doped carbon material of Example 1.

Example I-2

This Example illustrated the preparation of a sulfur doped carbon support according to the invention.

Vulcan XC72 was placed into a tube furnace, a carrier gas (nitrogen) was fed into the tube furnace after passing through a bubbling bottle filled with thiophene, heated to 1200° C. at a rate of 10° C./min, and thermostatic treatment was carried out for 3 h; and naturally cooled to obtain the sulfur doped carbon material, designated as carbon support B. The weight ratio of Vulcan XC72 to thiophene was 10:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

The sulfur content by weight by XPS analysis was 0.89%; the oxygen content by weight by XPS analysis was 8.39%; the specific surface area was 210 m²/g, and the pore volume was 0.430 mL/g; $I_D/I_G$ was 0.37; the resistivity was 1.25 Ω·m.

Figure 1C:
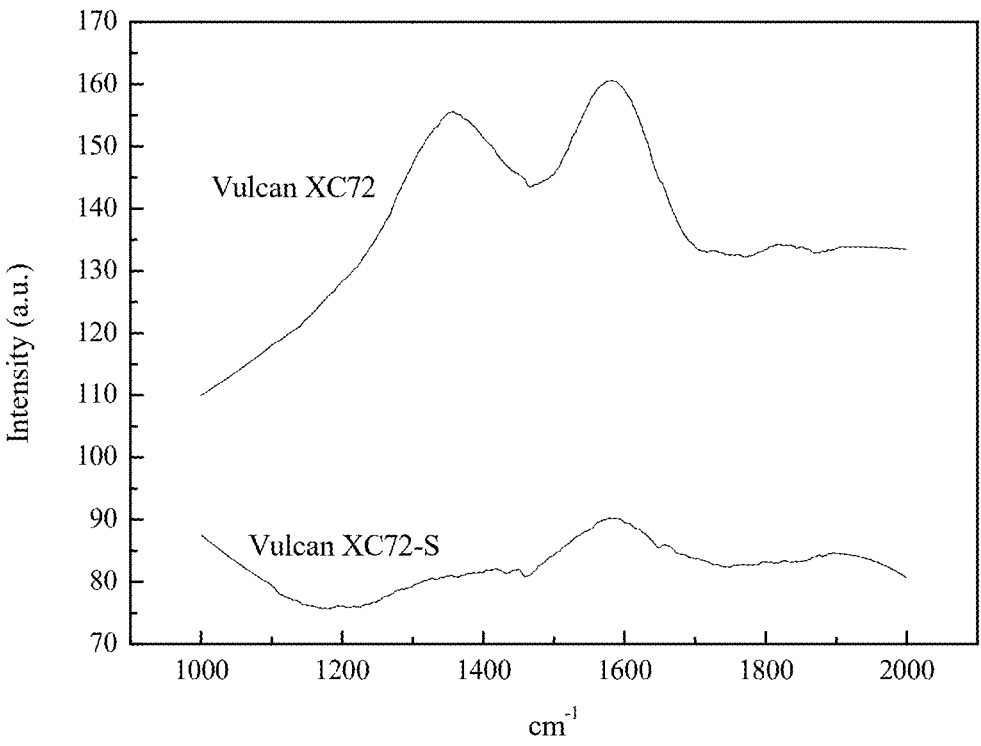
FIG. 1C shows a Raman spectrum of the sulfur doped carbon material (Vulcan XC72-S) and Vulcan XC72 of Example I-2.

FIG. 1C showed a Raman spectrum of the sulfur doped carbon material (Vulcan XC72-S) and Vulcan XC72 of Example I-2.

Figure 1D:
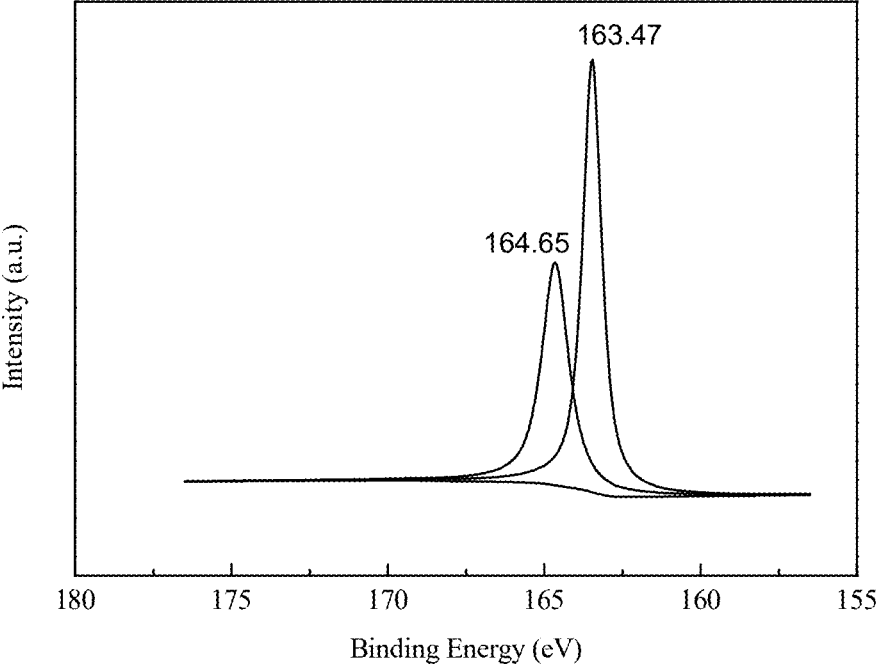
FIG. 1D shows an XPS spectrum of the sulfur doped carbon material of Example I-2.

FIG. 1D showed an XPS spectrum of the sulfur doped carbon material of Example I-2.

Figure 1E:
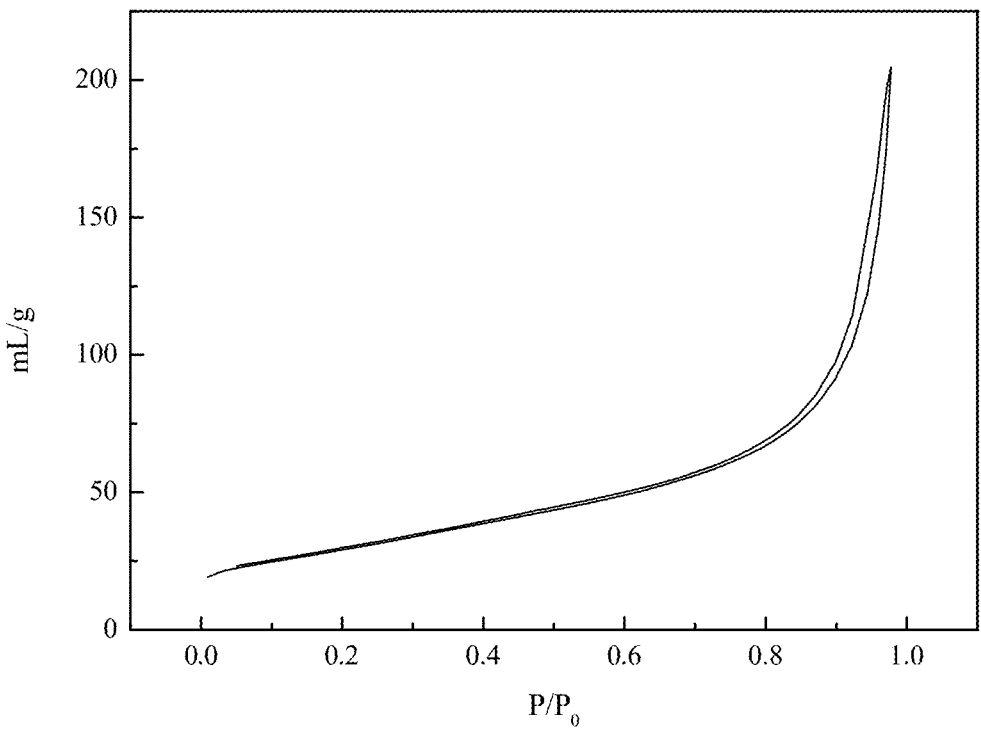
FIG. 1E shows a nitrogen adsorption-desorption curve for the sulfur doped carbon material of Example I-2.

FIG. 1E showed a nitrogen adsorption-desorption curve for the sulfur doped carbon material of Example I-2.

Figure 1F:
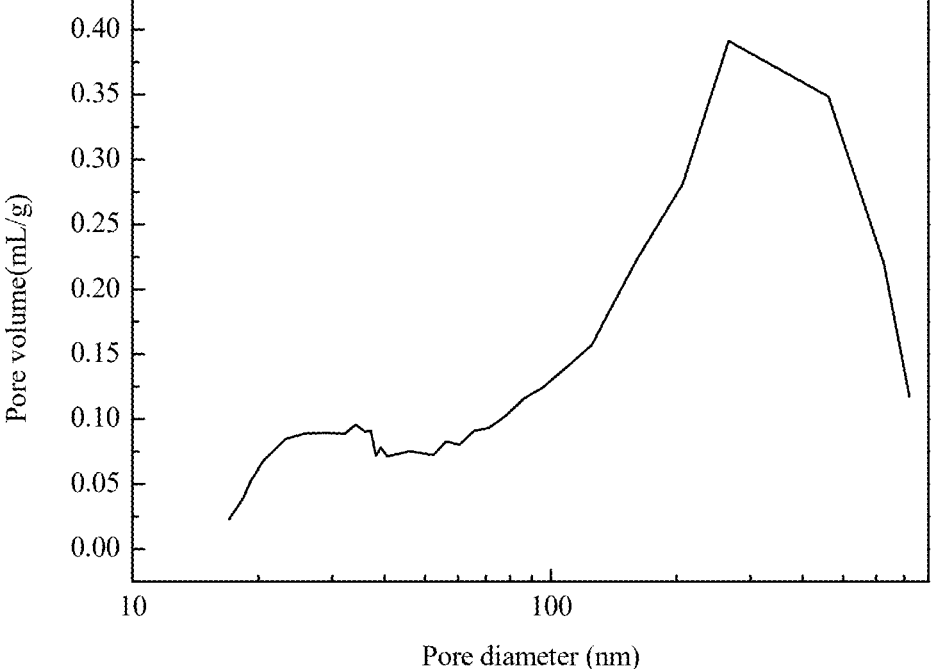
FIG. 1F shows a pore distribution curve of the sulfur doped carbon material of Example I-2.

FIG. 1F showed a pore distribution curve of the sulfur doped carbon material of Example I-2.

Example I-3

This Example illustrated the preparation of a sulfur doped carbon support according to the invention.

A sulfur doped carbon material was produced in the same manner as in Example I-2, except that: the thermostatic treatment was carried out at a temperature of 1400° C., and the sulfur doped carbon support prepared was designated as carbon support C.

Sample Characterization and Tests

Figure 1G:
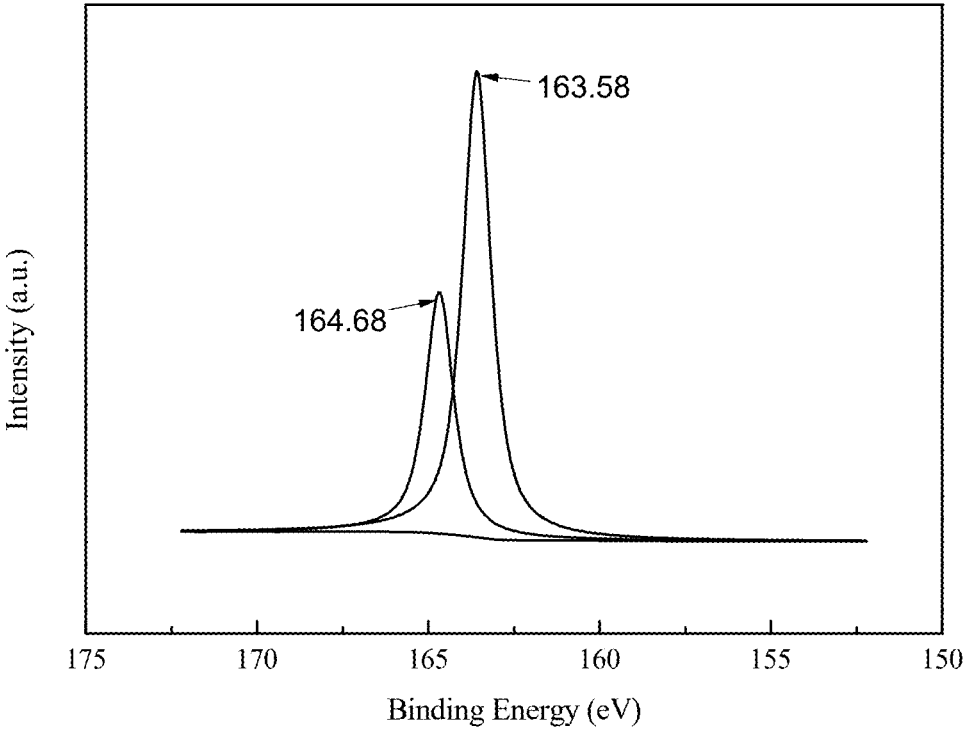
FIG. 1G shows an XPS spectrum of the sulfur doped carbon material of Example I-3.

FIG. 1G showed an XPS spectrum of the sulfur doped carbon material of Example I-3.

Example I-4

The example was provided to illustrate the preparation of a platinum on carbon catalyst according to the present invention.

The carbon support A above was dispersed into deionized water at a ratio of 250 mL water per gram of carbon support, 12 mmol of chloroplatinic acid per each gram of carbon support was added, ultrasonic dispersion was performed to form a suspension, and 1 mol/L of potassium hydroxide aqueous solution was added to allow the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 70.2%.

Figure 1H:
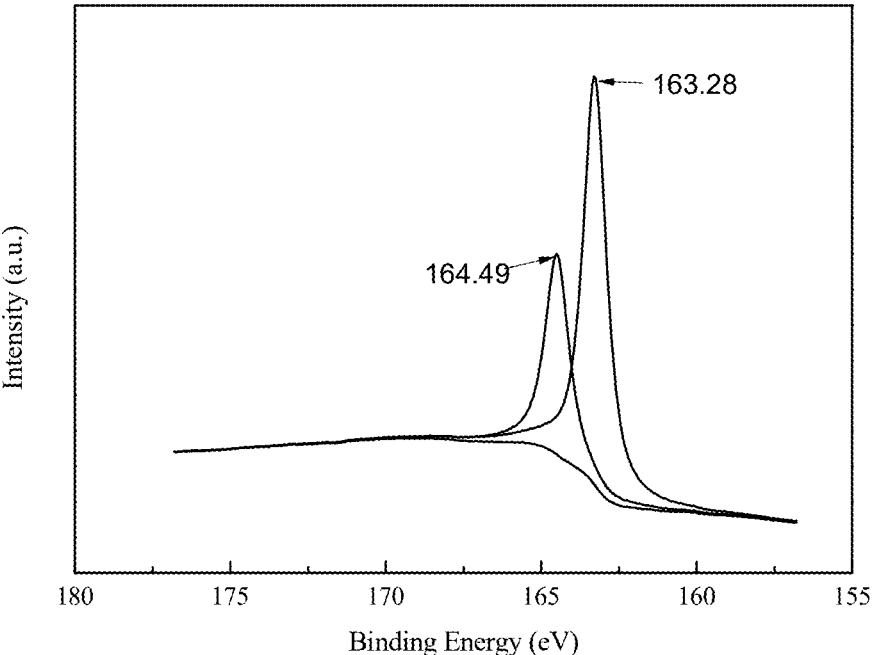
FIG. 1H shows an XPS spectrum of the platinum on carbon catalyst of Example I-4.

FIG. 1H showed an XPS spectrum of the platinum on carbon catalyst of Example I-4.

The results of the platinum on carbon catalyst performance test were shown in Table I-1.

Example I-5

The example was provided to illustrate the preparation of a platinum on carbon catalyst according to the present invention.

The carbon support B was dispersed into deionized water at a ratio of 250 mL water per gram of carbon support, 3.4 mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.1%.

Figure 1I:
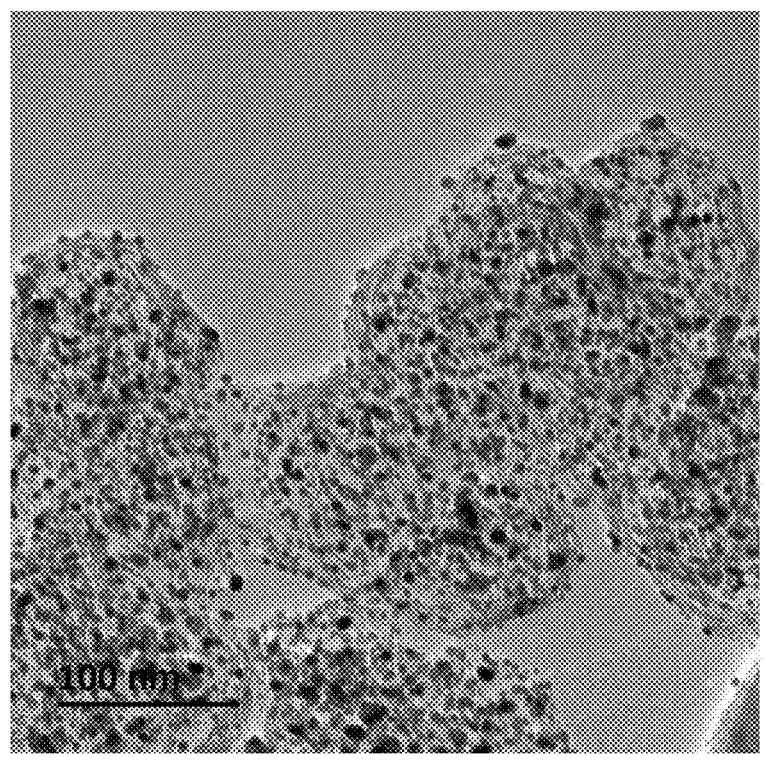
FIG. 1I shows a TEM pattern of the platinum on carbon catalyst of Example I-5.

FIG. 1I showed a TEM pattern of the platinum on carbon catalyst of Example I-5.

Figure 1J:
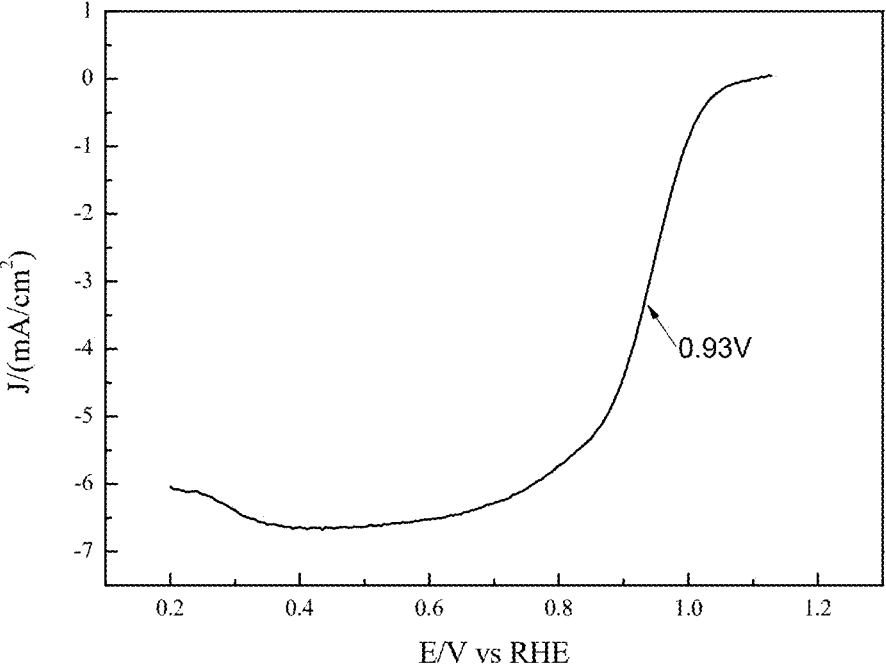
FIG. 1J shows a polarization curve of the platinum on carbon catalyst of Example I-5.

FIG. 1J showed a polarization curve of the platinum on carbon catalyst of Example I-5.

Figure 1K:
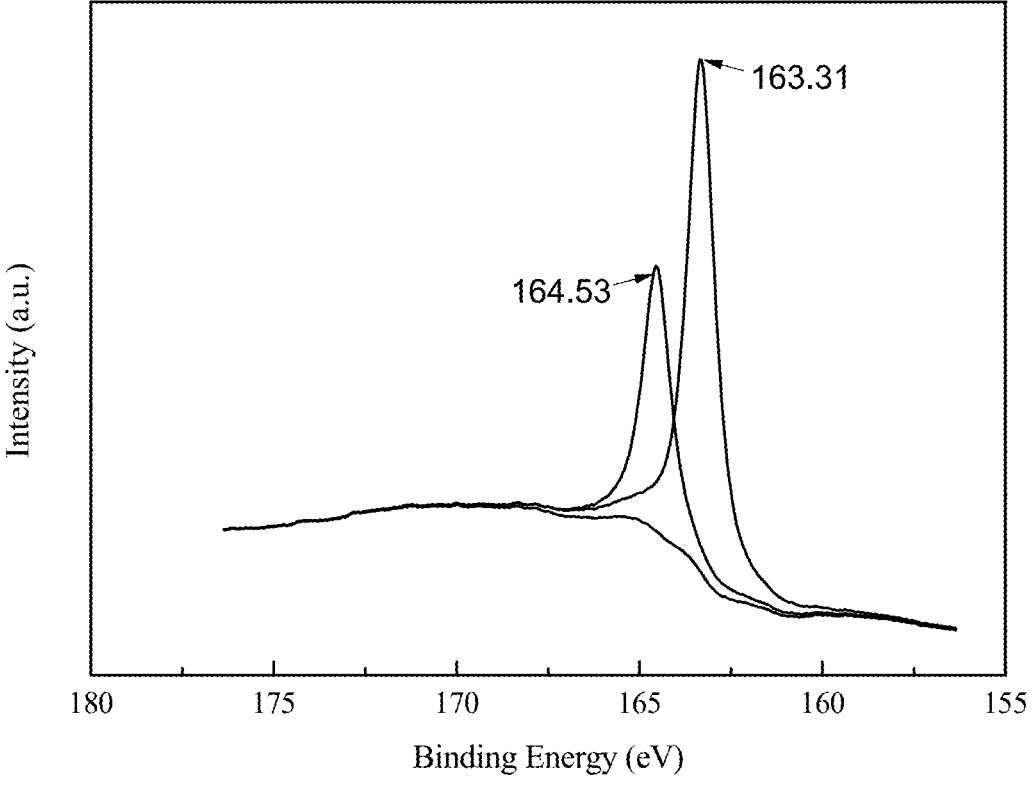
FIG. 1K shows an XPS spectrum of the platinum on carbon catalyst of Example I-5.

FIG. 1K showed an XPS spectrum of the platinum on carbon catalyst of Example I-5.

The results of the platinum on carbon catalyst performance test were shown in Table I-1.

Example I-6

The example was provided to illustrate the preparation of a platinum on carbon catalyst.

A platinum on carbon catalyst was produced according to the process of Example I-5, except that: the carbon support C produced in Example 3 was used.

Sample Characterization and Tests

The platinum content by weight of the platinum on carbon catalyst was 39.8%.

The results of the platinum on carbon catalyst performance test were shown in Table I-1.

Example I-7

The example was provided to illustrate the preparation of a platinum on carbon catalyst.

A platinum on carbon catalyst was produced according to the process of Example I-5, except that: 1.3 mmol chloroplatinic acid per gram of carbon support was added.

Sample Characterization and Tests

The platinum content by weight of the platinum on carbon catalyst was 20.2%.

The results of the platinum on carbon catalyst performance test were shown in Table I-1.

Comparative Example I-1

A platinum on carbon catalyst was produced and tested according to the process of Example I-5, except that: during the production of carbon support B according to Example I-2, the tube furnace was heated to 1200° C. at a rate of 5° C./min.

Sample Characterization and Tests

I. The Sulfur Doped Carbon Material

The sulfur content by weight by XPS analysis was 0.84%; the oxygen content by weight by XPS analysis was 9.4%; the specific surface area was 214 m$^2$/g, and the pore volume was 0.436 mL/g; $I_D/I_G$ was 0.96; the resistivity was 1.28 $\Omega \cdot m$.

Figure 1L:
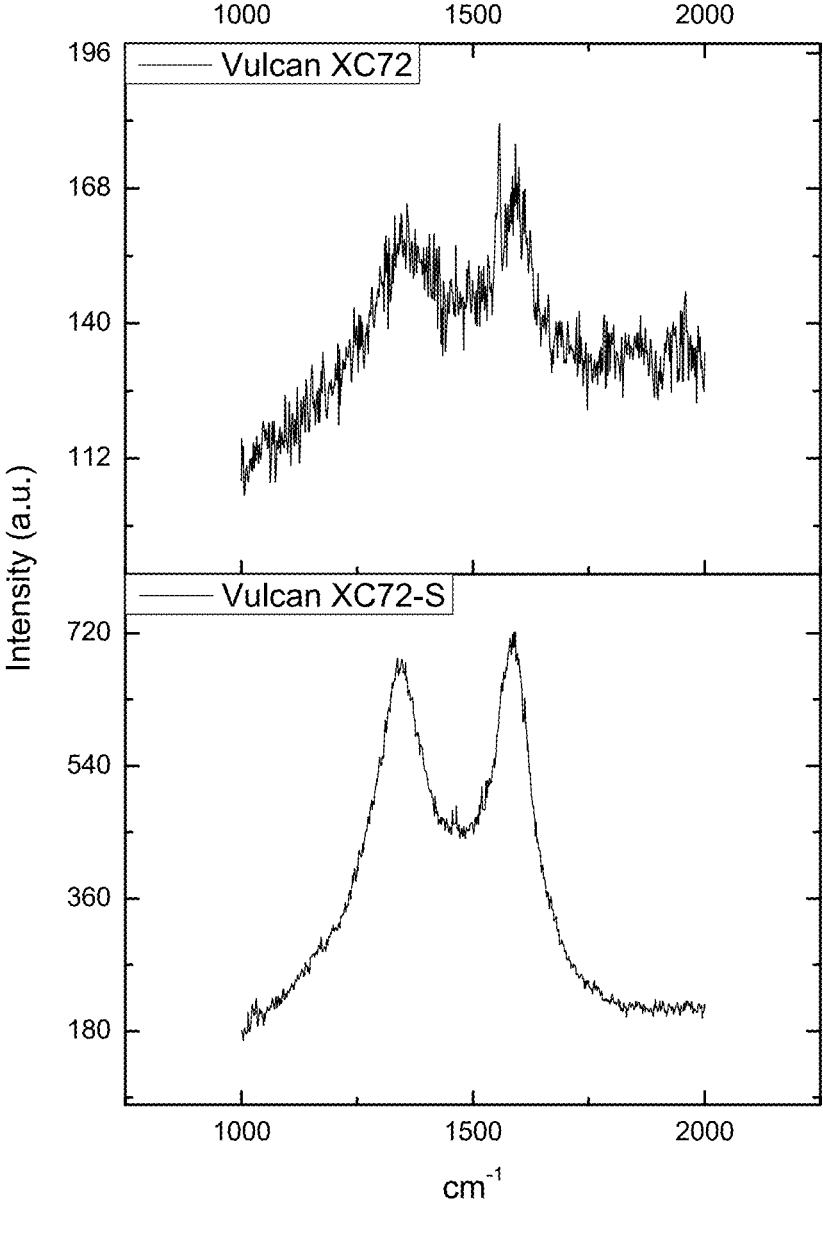
FIG. 1L shows a Raman spectrum of the sulfur doped carbon material (Vulcan XC72-S) and Vulcan XC72 of comparative example I-1.

FIG. 1L showed a Raman spectrum of the sulfur doped carbon material and Vulcan XC72 of comparative example I-1.

Figure 1M:
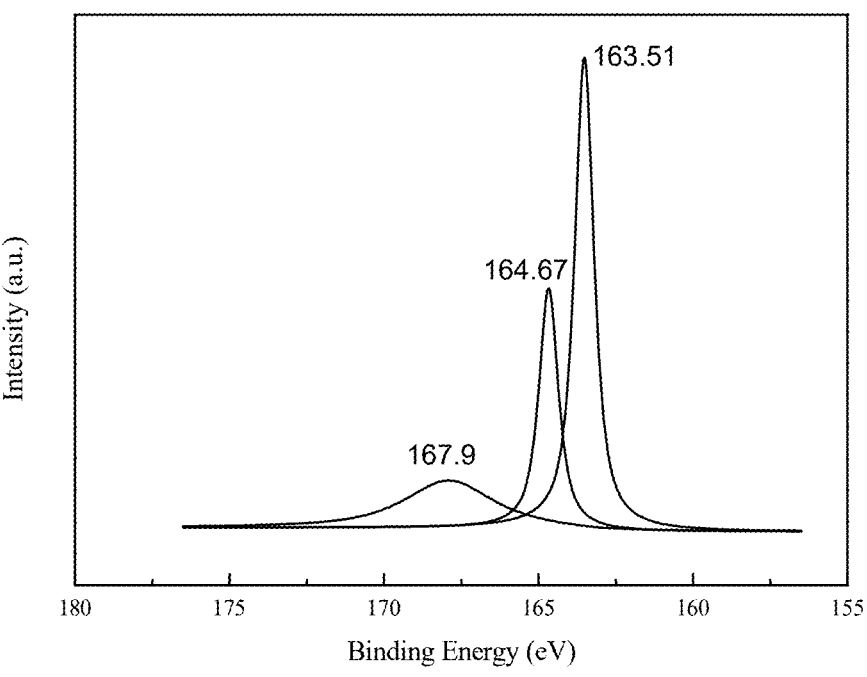
FIG. 1M shows an XPS spectrum of the sulfur doped carbon material of comparative example I-1.

FIG. 1M showed an XPS spectrum of the sulfur doped carbon material of comparative example I-1.

Figure 1N:
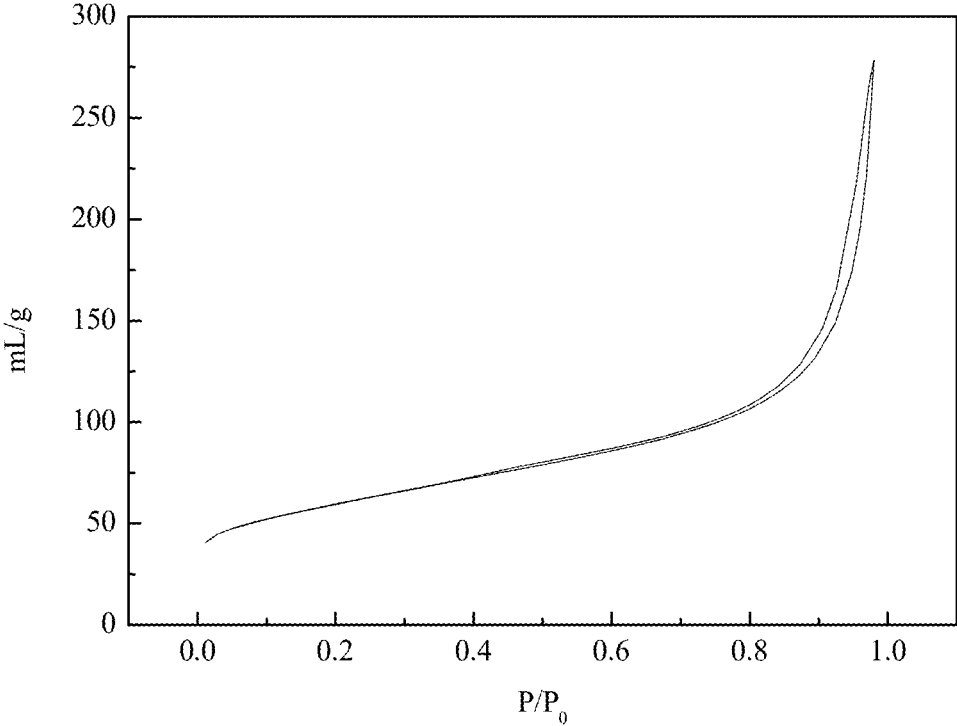
FIG. 1N shows a nitrogen adsorption-desorption curve for the sulfur doped carbon material of comparative example I-1.

FIG. 1N showed a nitrogen adsorption-desorption curve for the sulfur doped carbon material of comparative example I-1.

Figure 1O:
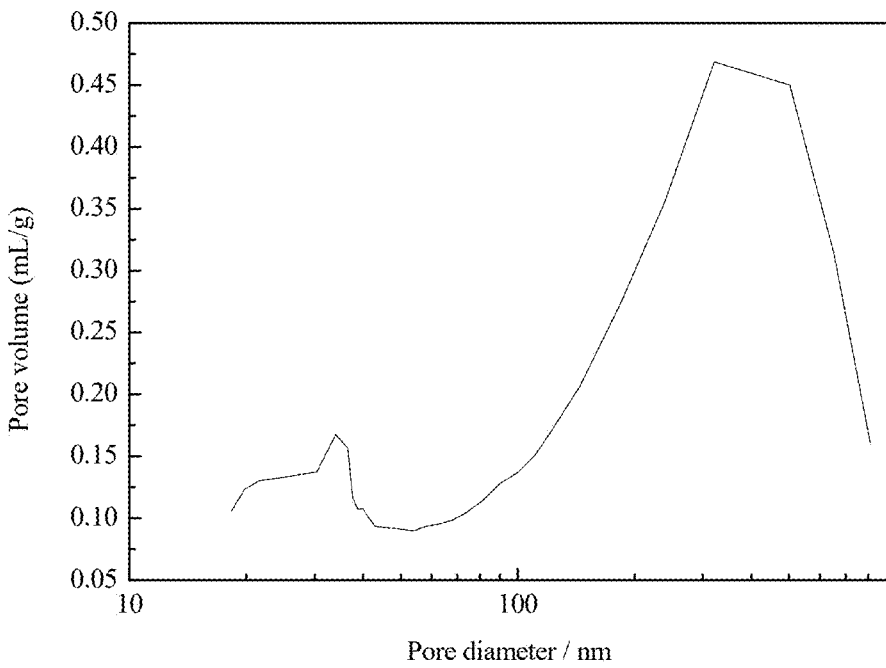
FIG. 1O shows a pore distribution curve of the sulfur doped carbon material of comparative example I-1.

FIG. 1O showed a pore distribution curve of the sulfur doped carbon material of comparative example I-1.

II. Platinum on Carbon Catalyst

The platinum content by weight of the platinum on carbon catalyst was 40.2%.

Figure 1P:
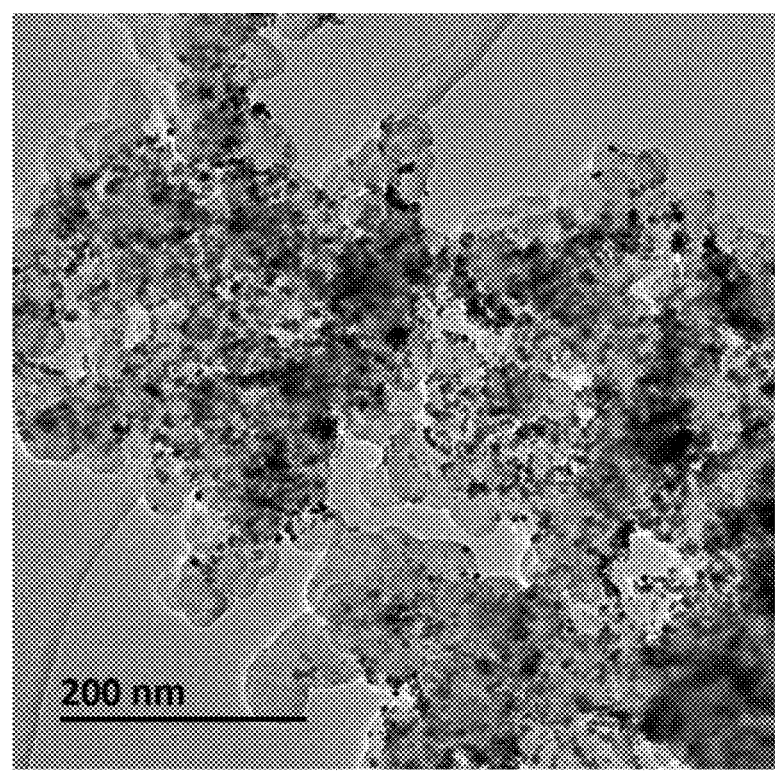
FIG. 1P shows a TEM pattern of the platinum on carbon catalyst of comparative example I-1.
Figure 1Q:
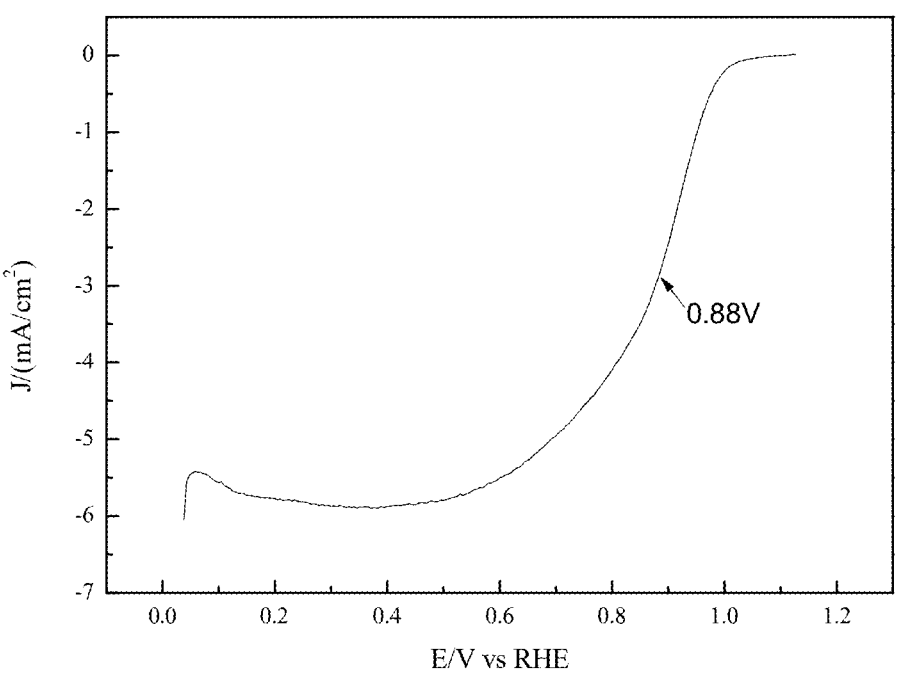
FIG. 1Q shows a polarization curve of the platinum on carbon catalyst of comparative example I-1.

FIG. 1P showed a TEM pattern of the platinum on carbon catalyst of comparative example I-1.

FIG. IQ showed a polarization curve of the platinum on carbon catalyst of comparative example I-1.

The results of the platinum on carbon catalyst performance test were shown in Table I-1.

Comparative Example 2

A platinum on carbon catalyst was produced and tested according to the process of Example I-5, except that: during the production of sulfur doped carbon material This Example I-2, the thermostatic treatment was carried out at a temperature of 400° C.

Sample Characterization and Tests

Sulfur Doped Carbon Material:

The sulfur content by weight by XPS analysis was 1.17%; the oxygen content by weight by XPS analysis was 8.46%.

Figure 1R:
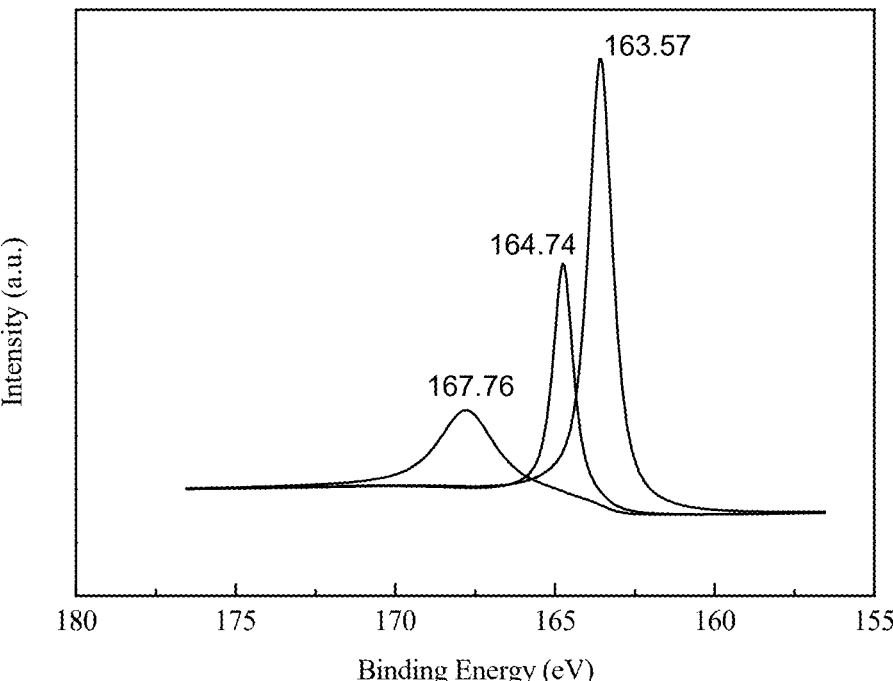
FIG. 1R shows an XPS spectrum of the sulfur doped carbon material of comparative example I-2.

FIG. 1R showed an XPS spectrum of the sulfur doped carbon material of comparative example I-2.

The results of the platinum on carbon catalyst performance test were shown in Table I-1.

Comparative Example 3

A platinum on carbon catalyst was produced and tested according to the process of Example I-4, except that: the support was Ketjenblack ECP600JD, and 200 mL water and 50 mL ethanol per gram of carbon support were used for dispersion when supporting Pt.

Sample Characterization and Tests

The platinum content by weight of the platinum on carbon catalyst was 69.7%.

The results of the platinum on carbon catalyst performance test were shown in Table I-1.

Comparative Example 4

A platinum on carbon catalyst was produced and tested according to the process of Example I-5, except that: the carbon support was Vulcan XC72.

Sample Characterization and Tests

The platinum content by weight of the platinum on carbon catalyst was 40.1%.

The results of the platinum on carbon catalyst performance test were shown in Table I-1.

Comparative Example 5

The platinum on carbon catalyst was a commercial catalyst purchased under the trademark of HISPEC 4000.
Sample Characterization and Tests The platinum content by weight of the platinum on carbon catalyst was 40.2%.

Figure 1S:
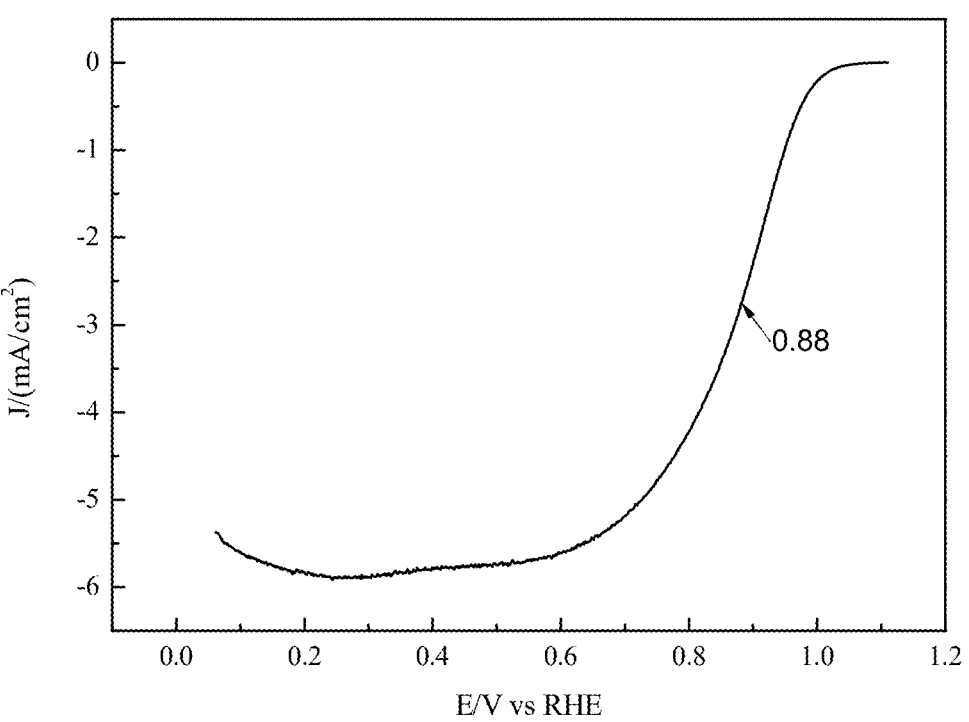
FIG. 1S shows a polarization curve of the platinum on carbon catalyst of comparative example I-5.

FIG. 1S showed a polarization curve of the platinum on carbon catalyst of comparative example I-5.

The results of the platinum on carbon catalyst performance test were shown in Table I-1.

TABLE I-1

| Sample (s) | Half-wave potential/V | ECSA/ m$^2$ g–1-Pt | Specific activity by weight/ A mg$^{-1}$-Pt | Intrinsic Activity/mA cm$^{-2}$ | Reduction of specific activity by weight after 5000 cycles/% |
|---|---|---|---|---|---|
| Example I-4 | 0.89 | 95.59 | 0.181 | 0.189 | 3 |
| Examples I to 5 | 0.93 | 198.5 | 0.337 | 0.170 | 6 |
| Examples I to 6 | 0.90 | 131.79 | 0.210 | 0.159 | 8 |
| Examples I to 7 | 0.93 | 259.97 | 0.386 | 0.149 | 5 |
| Comparative Example I-1 | 0.88 | 70.83 | 0.127 | 0.179 | 9 |
| Comparative Example I-2 | 0.90 | 60.94 | 0.205 | 0.336 | 16 |
| Comparative Example I-3 | 0.83 | 62.26 | 0.086 | 0.138 | 34 |
| Comparative examples I-4 | 0.89 | 33.63 | 0.135 | 0.401 | 28 |
| Comparative examples I-5 | 0.88 | 57.32 | 0.124 | 0.216 | 23 |

As shown in FIGS. 1M and 1R, the sulfur doped carbon material not produced according to the present invention included not only thiophenic sulfur, but also sulfur in an oxidized state.

As shown in Table I-1, the sulfur doped conductive carbon black significantly improved the ECSA and the specific activity by weight and the stability of the platinum on carbon catalyst, by comparing the "Examples, comparative examples 1 and 2" with the "comparative examples 3, 4 and 5".

As shown in Table I-1, the conductive carbon black doped with thiophenic sulfur alone significantly improved the ECSA and the specific activity by weight and the stability of the platinum on carbon catalyst, by comparing the Example I-5 with the comparative examples 1 and 2.
Implementing Solution VI The invention detects elements on the surface of a material by an X-ray photoelectron spectrum analyzer (XPS). The X-ray photoelectron spectrum analyzer used was an ESCALB 220i-XL type ray electron spectrometer which is produced by VG Scientifc company which was equipped with Avantage V5.926 software, and the analysis and test conditions of the X-ray photoelectron spectrum analyzer were as follows: an excitation source of a monochromatized A1K α X-ray with a power of 330 W and a base vacuum of 3×10<–9> mbar for analytical testing. In addition, the electron binding energy was corrected with the C1s peak (284.3 eV) of elemental carbon, and the late peak fitting software was XPSPEAK. The characteristic peaks of thiophenic sulfur and boron in the spectrogram were characteristic peak after peak fitting.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636 A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 0.6V to 0.95V in $O_2$ saturated 0.1M $HClO_4$ and then testing for LSV and ECSA as described above. During the test, the catalyst was produced into homogeneously dispersed slurry and coated on a glassy carbon electrode with a diameter of 5 mm, and the platinum content of the catalyst on the electrode was 3 μg-4 μg.

Resistivity test: a four-probe resistivity tester was used, instrument model KDY-1, and process and test conditions: the applied pressure was 3.9±0.03 MPa, and the current was 500±0.1 mA.

TG-MS test method: the test was carried out using a STA449F5-QMS403D modal thermogravimetry-mass spectrometer from NETZSCH company, Germany, wherein the ion source was an EI source, the quadrupole mass spectrometer adopted an MID mode, the transmission pipeline was a capillary tube with a length of 3 m, and the temperature used was 260° C.; the temperature range was 55° C.-1000° C., with a heating rate of 10° C./min.

VXC72 (Vulcan XC72, produced by Kabot company, USA) was purchased from Suzhou Yilongcheng energy science and technology Co., Ltd. The results of the tests by the instrument and process above showed that: the specific surface area was 258 m$^2$/g, the pore volume was 0.388 mL/g, the oxygen content by weight was 8.72%, the I$_D$/I$_G$ was 1.02, and the resistivity was 1.22 Ω·m.

Ketjenblack ECP600JD (Ketjen black, produced by Lion company, Japan) was purchased from Suzhou Yilongcheng energy science and technology Co., Ltd. The results of the tests by the instrument and process above showed that: the specific surface area was 1362 m$^2$/g, the pore volume was 2.29 mL/g, the oxygen content by weight was 6.9%, the I$_D$/I$_G$ was 1.25, and the resistivity was 1.31 Ω·m. The results of the tests by the instrument and process above showed that: the specific surface area was 1362 m$^2$/g, the pore volume was 2.29 mL/g, the oxygen content by weight was 6.9%, the I$_D$/I$_G$ was 1.25, and the resistivity was 1.31 Ω·m.

A commercial platinum on carbon catalyst (a trademark of HISPEC4000, from Johnson Matthey company) was purchased from Alfa Aesar. The test result showed that: the platinum content by weight was 40.2%.

Example VI-1

The example was provided to illustrate a sulfur-boron doped carbon material of the present invention.

Vulcan XC72 and elemental sulfur were mixed homogeneously at a weight ratio of 6:1, placed into a tube furnace, heated to 800° C. at a rate of 8° C./min, and thermostatic treatment was carried out for 3 h; and naturally cooled to obtain a sulfur doped carbon material.

1 g of the sulfur doped carbon material above was immersed in 15 mL of a 3 wt % aqueous solution of sodium borate for 24 hours; dried in an oven at 100° C.; then placed into a tube furnace, heating the tube furnace to 600° C. at a rate of 8° C./min, followed by a thermostatic treatment for 3 h; and naturally cooled to obtain the sulfur-boron doped carbon material, designated as carbon support A.

Sample Characterization and Tests

For the sulfur-boron doped carbon material of the Example, the sulfur content by weight by XPS analysis was 1.23%; the boron content by weight by XPS analysis was 0.57%; the specific surface area was 253 m$^2$/g; the resistivity was 1.31 Ω·m.

FIG. 2A showed an XPS spectrum of sulfur of the sulfur doped carbon material of Example VI-1.

FIG. 2B showed an XPS spectrum of sulfur of the sulfur-boron doped carbon material of Example VI-1.

FIG. 2C showed an XPS spectrum of boron of the sulfur-boron doped carbon material of Example VI-1.

Example VI-2

The example was provided to illustrate a sulfur-boron doped carbon material of the present invention.

Ketjenblack ECP600JD and elemental sulfur were mixed homogeneously at a weight ratio of 4:1, placed into a tube furnace, heated to 1200° C. at a rate of 5° C./min, and thermostatic treatment was carried out for 2 h; and naturally cooled to obtain a sulfur doped carbon material.

1 g of the sulfur doped carbon material above was added into 35 mL of a 0.6 wt % aqueous solution of sodium borate for immersion for 24 hours; dried in an oven at 100° C.; then placed into a tube furnace, heating the tube furnace to 400° C. at a rate of 5° C./min, followed by a thermostatic treatment for 3 h; and naturally cooled to obtain the sulfur-boron doped carbon material, designated as carbon support B.

Sample Characterization and Tests

For the sulfur-boron doped carbon material of the Example, the sulfur content by weight by XPS analysis was 0.49%; the boron content by weight by XPS analysis was 0.57%; the specific surface area was 241 m$^2$/g; the resistivity was 1.29 Ω·m.

FIG. 2D showed an XPS spectrum of sulfur of the sulfur-boron doped carbon material of Example VI-2.

FIG. 2E showed an XPS spectrum of sulfur of the sulfur-boron doped carbon material of Example VI-2.

FIG. 2F showed an XPS spectrum of boron of the sulfur-boron doped carbon material of Example VI-2.

Example VI-3

The example was provided to illustrate a platinum on carbon catalyst of the present invention.

The carbon support A was dispersed into deionized water at a ratio of 250 mL water per gram of carbon support, 3.4 mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.3%.

In the XPS analysis of the platinum on carbon catalyst, there was not a characteristic peak of B$_{1s}$ between 185 ev and 200 ev.

Signals of B$_2$O$_3$ and B was detected out in a TG-MS test of the platinum on carbon catalyst.

FIG. 2G showed an XPS spectrum of sulfur of the platinum on carbon catalyst of Example VI-3.

The results of the platinum on carbon catalyst performance test were shown in Table VI-1.

Example VI-4

The example was provided to illustrate a platinum on carbon catalyst of the present invention.

A platinum on carbon catalyst was produced according to the process of Example VI-3, except that: 1.3 mmol chloroplatinic acid per gram of carbon support was added.

Sample Characterization and Tests

The platinum content by weight of the platinum on carbon catalyst was 20.1%.

In the XPS analysis of the platinum on carbon catalyst, there is not a characteristic peak of B$_{1s}$ between 185 ev and 200 ev.

Signals of B$_2$O$_3$ and B were detected out in a TG-MS test of the platinum on carbon catalyst.

The results of the platinum on carbon catalyst performance test were shown in Table VI-1.

Example VI-5

The example was provided to illustrate a platinum on carbon catalyst of the present invention.

The carbon support B was dispersed into deionized water at a ratio of 250 mL water per gram of carbon support, 12 mmol of chloroplatinic acid per each gram of carbon support was added, ultrasonic dispersion was performed to form a suspension, and 1 mol/L of potassium hydroxide aqueous solution was added to adjust the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 70.1%.

In the XPS analysis of the platinum on carbon catalyst, there was not a characteristic peak of $B_{1s}$ between 185 ev and 200 ev.

Signals of $B_2O_3$ and B were detected out in a TG-MS test of the platinum on carbon catalyst.

FIG. 2H showed an XPS spectrum of sulfur of the platinum on carbon catalyst of Example VI-6.

The results of the platinum on carbon catalyst performance test were shown in Table VI-1.

Comparative Example VI-1

The Vulcan XC72 was dispersed into deionized water at a ratio of 250 mL water per gram of carbon support, 3.4

The results of the platinum on carbon catalyst performance test were shown in Table VI-1.

Comparative Example VI-2

The Ketjenblack ECP600JD was dispersed at a ratio of 200 mL water and 50 mL ethanol per gram of carbon support, 12 mmol of chloroplatinic acid per each gram of carbon support was added, ultrasonic dispersion was performed to form a suspension, and 1 mol/L of potassium hydroxide aqueous solution was added to adjust the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 69.7%.

The results of the platinum on carbon catalyst performance test were shown in Table VI-1.

Comparative Example VI-3

The platinum on carbon catalyst was a commercial catalyst purchased under the trademark of HISPEC 4000.

Sample Characterization and Tests

The platinum content by weight of the platinum on carbon catalyst was 40.2%.

The results of the platinum on carbon catalyst performance test were shown in Table VI-1.

TABLE VI-1

| Sample (s) | Half-wave potential/V | ECSA/ $m^2$ g–1-Pt | Specific activity by weight/ $A\ mg^{-1}$-Pt | Intrinsic Activity/mA $cm^{-2}$ | Reduction of specific activity by weight after 5000 cycles/% |
|---|---|---|---|---|---|
| Example VI-3 | 0.90 | 36.67 | 0.146 | 4 | 9 |
| Example VI-4 | 0.91 | 59.43 | 0.233 | 5 | 9 |
| Example VI-5 | 0.89 | 81.60 | 0.157 | 8 | 10 |
| Comparative Example VI-1 | 0.89 | 33.63 | 0.135 | 28 | 16 |
| Comparative Example VI-2 | 0.83 | 62.26 | 0.086 | 34 | 23 |
| Comparative Example VI-3 | 0.88 | 57.32 | 0.124 | 23 | 15 | mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.1%.

Implementing Solution VII

The invention detects elements on the surface of material VII by an X-ray photoelectron spectrum analyzer (XPS). The X-ray photoelectron spectrum analyzer used was an ESCALB 220i-XL type ray electron spectrometer which is produced by VG Scientifc company which was equipped with Avantage V5.926 software, and the analysis and test conditions of the X-ray photoelectron spectrum analyzer were as follows: an excitation source of a monochromatized AlK α X-ray with a power of 330 W and a base vacuum of $3 \times 10^{-9}$ mbar for analytical testing. In addition, the electron binding energy was corrected with the C1s peak (284.3 eV) of elemental carbon, and the late peak fitting software was XPSPEAK. The characteristic peaks of thiophenic sulfur in the spectrogram were characteristic peak after peak fitting.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636 A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 0.6V to 0.95V in $O_2$ saturated 0.1M $HClO_4$, and then testing for LSV and ECSA as described above. During the test, the catalyst produced into homogeneously dispersed slurry and coated on a glassy carbon electrode with a diameter of 5 mm, and the platinum content of the catalyst on the electrode was 3 µg-4 µg.

Resistivity test: a four-probe resistivity tester was used, instrument model KDY-1, and process and test conditions: the applied pressure was 3.9±0.03 MPa, and the current was 500±0.1 mA.

TG-MS test method: the test was carried out using a STA449F5-QMS403D modal thermogravimetry-mass spectrometer from NETZSCH company, Germany, wherein the ion source was an EI source, the quadrupole mass spectrometer adopted an MID mode, the transmission pipeline was a capillary tube with a length of 3 m, and the temperature used was 260° C.; the temperature range was 55° C.-1000° C., with a heating rate of 10° C./min.

VXC72 (Vulcan XC72, produced by Kabot company, USA) was purchased from Suzhou Yilongcheng energy science and technology Co., Ltd. The results of the tests by the instrument and process above showed that: the specific surface area was 258 m²/g, the pore volume was 0.388 mL/g, the oxygen content by weight was 8.72%, the $I_D/I_G$ was 1.02, and the resistivity was 1.22 Ω·m.

Ketjenblack ECP600JD (Ketjen black, produced by Lion company, Japan) was purchased from Suzhou Yilongcheng energy science and technology Co., Ltd. The results of the tests by the instrument and process above showed that: the specific surface area was 1362 m²/g, the pore volume was 2.29 mL/g, the oxygen content by weight was 6.9%, the $I_D/I_G$ was 1.25, and the resistivity was 1.31 Ω·m.

A commercial platinum on carbon catalyst (a trademark of HISPEC4000, from Johnson Matthey company) was purchased from Alfa Aesar. The test result showed that: the platinum content by weight was 40.2%.

Example VII-1

This Example illustrated a sulfur-phosphorus doped carbon material according to the invention.

1 g of Vulcan XC72 was immersed in 15 ml of 4.0 wt % aqueous phosphoric acid for 16 h; dried in an oven at 100° C.; then placed into a tube furnace, heating the tube furnace to 400° C. at a rate of 10° C./min, and a thermostatic treatment was carried out for 3 h; and naturally cooled to obtain a phosphorus doped carbon material.

The phosphorus doped carbon material above and 0.167 g of elemental sulfur were mixed homogeneously, placed into a tube furnace, heated to 400° C. at a rate of 8° C./min, and a thermostatic treatment was carried out for 3 h; and naturally cooled to obtain a sulfur-phosphorus doped carbon material.

Sample Characterization and Tests

For the sulfur-phosphorus doped carbon material of the Example, the sulfur content by weight by XPS analysis was 1.44%; the phosphorus content by weight by XPS analysis was 1.57%; the specific surface area was 239 m²/g; the resistivity was 1.31 Ω·m.

FIG. 3A showed an XPS spectrum of phosphorus of the sulfur-phosphorus doped carbon material of Example VII-1.

FIG. 3B showed an XPS spectrum of sulfur of the sulfur-phosphorus doped carbon material of Example VII-1.

FIG. 3C showed an XPS spectrum of oxygen of the sulfur-phosphorus doped carbon material of Example VII-1.

Example VII-2

This Example illustrated a sulfur-phosphorus doped carbon material according to the invention.

1 g of Vulcan XC72 was immersed in 15 ml of 4.8 wt % aqueous sodium phosphate for 24 h;

dried in an oven at 100° C.; then placed into a tube furnace, heating the tube furnace to 400° C. at a rate of 8° C./min, and a thermostatic treatment was carried out for 3 h; and naturally cooled to obtain a phosphorus doped carbon material.

The phosphorus doped carbon material above and 0.2 g of elemental sulfur were mixed homogeneously, placed into a tube furnace, heated to 1400° C. at a rate of 8° C./min, and a thermostatic treatment was carried out for 3 h; and naturally cooled to obtain the sulfur-phosphorus doped carbon material, designated as carbon support A.

Sample Characterization and Tests

For the sulfur-phosphorus doped carbon material of the Example, the sulfur content by weight by XPS analysis was 0.97%; the phosphorus content by weight by XPS analysis was 0.55%; the specific surface area was 231 m²/g; the resistivity was 1.27 Ω·m.

FIG. 3D showed an XPS spectrum of phosphorus of the sulfur-phosphorus doped carbon material of Example VII-2.

FIG. 3E showed an XPS spectrum of sulfur of the sulfur-phosphorus doped carbon material of Example VII-2.

Example VII-3

This Example illustrated a sulfur-phosphorus doped carbon material according to the invention.

10 mL of absolute ethanol was added into 1 g of Ketjenblack ECP600JD, and then 25 mL of 1.8 wt % aqueous phosphoric acid was added for immersion for 24 h; dried in an oven at 100° C.; then placed into a tube furnace, heating the tube furnace to 600° C. at a rate of 10° C./min, and a thermostatic treatment was carried out for 3 h; and naturally cooled to obtain a phosphorus doped carbon material.

The phosphorus doped carbon material above and 0.15 g of elemental sulfur were mixed homogeneously, placed into a tube furnace, heated to 700° C. at a rate of 10° C./min, and a thermostatic treatment was carried out for 3 h; and naturally cooled to obtain a sulfur-phosphorus doped carbon material.

Sample Characterization and Tests

For the sulfur-phosphorus doped carbon material of the Example, the sulfur content by weight by XPS analysis was 1.41%; the phosphorus content by weight by XPS analysis was 0.18%; the specific surface area was 1325 $m^2$/g; the resistivity was 1.37 Ω·m.

FIG. 3F showed an XPS spectrum of phosphorus of the sulfur-phosphorus doped carbon material of Example VII-3.

FIG. 3G showed an XPS spectrum of sulfur of the sulfur-sulfur doped carbon material of Example VII-3.

Example VII-4

This Example illustrated a sulfur-phosphorus doped carbon material according to the invention.

10 mL of absolute ethanol was added into 1 g of Ketjenblack ECP600JD, and then 25 mL of 1 wt % aqueous sodium phosphate was added for immersion for 16 h; dried in an oven at 100° C.; then placed into a tube furnace, heating the tube furnace to 600° C. at a rate of 10° C./min, and a thermostatic treatment was carried out for 3 h; and naturally cooled to obtain a phosphorus doped carbon material.

The phosphorus doped carbon material above and 0.25 g of elemental sulfur were mixed homogeneously, placed into a tube furnace, heated to 1200° C. at a rate of 10° C./min, and a thermostatic treatment was carried out for 3 h; and naturally cooled to obtain the sulfur-phosphorus doped carbon material, designated as carbon support B.

Sample Characterization and Tests

For the sulfur-phosphorus doped carbon material of the Example, the sulfur content by weight by XPS analysis was 1.06%; the phosphorus content by weight by XPS analysis was 0.11%; the specific surface area was 1306 $m^2$/g; the resistivity was 1.35 Ω·m.

FIG. 3H showed an XPS spectrum of phosphorus of the sulfur-phosphorus doped carbon material of Example VII-4.

FIG. 3I showed an XPS spectrum of sulfur of the sulfur-phosphorus doped carbon material of Example VII-4.

FIG. 3J showed an XPS spectrum of oxygen of the sulfur-phosphorus doped carbon material of Example VII-4.

Example VII-5

The example was provided to illustrate a platinum on carbon catalyst of the present invention.

The carbon support A was dispersed into deionized water at a ratio of 250 mL water per gram of carbon support, 3.4 mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.2%.

In the XPS analysis of the platinum on carbon catalyst, there was not a characteristic peak of $P_{2p}$ between 125 ev and 145 ev.

FIG. 3K showed an XPS spectrum of sulfur of the platinum on carbon catalyst of Example VII-5.

Signals of P, $P_2O_3$ and $P_2O_5$ were detected out in a TG-MS test.

The results of the platinum on carbon catalyst performance test were shown in Table VII-1.

Example VII-6

The example was provided to illustrate a platinum on carbon catalyst of the present invention.

The carbon support B was dispersed into deionized water at a ratio of 250 mL water per gram of carbon support, 12 mmol of chloroplatinic acid per each gram of carbon support was added, ultrasonic dispersion was performed to form a suspension, and 1 mol/L of potassium hydroxide aqueous solution was added to adjust the pH value of the system to be 10; the suspension was heated to 80° C., sodium hydrophosphide was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 69.8%.

In the XPS analysis of the platinum on carbon catalyst, there was not a characteristic peak of $P_{2p}$ between 125 ev and 145 ev.

FIG. 3L showed an XPS spectrum of sulfur of the platinum on carbon catalyst of Example VII-6.

Signals of P, $P_2O_3$ and $P_2O_5$ were detected out in a TG-MS test.

The results of the platinum on carbon catalyst performance test were shown in Table VII-1.

Comparative Example VII-1

The Vulcan XC72 was dispersed into deionized water at a ratio of 250 mL water per gram of carbon support, 3.4 mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.1%.

The results of the platinum on carbon catalyst performance test were shown in Table VII-1.

Comparative Example VII-2

The Ketjenblack ECP600JD was dispersed at a ratio of 200 mL water and 50 mL ethanol per gram of carbon support, 12 mmol of chloroplatinic acid per each gram of carbon support was added, ultrasonic dispersion was performed to form a suspension, and 1 mol/L of potassium hydroxide aqueous solution was added to adjust the pH value of the system to be 10; the suspension was heated to 80° C., sodium hydrophosphide was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 69.7%.

The results of the platinum on carbon catalyst performance test were shown in Table VII-1.

Comparative Example VII-3

The platinum on carbon catalyst was a commercial catalyst purchased under the trademark of HISPEC 4000.

Sample Characterization and Tests

The platinum content by weight of the platinum on carbon catalyst was 40.2%.

The results of the platinum on carbon catalyst performance test were shown in Table VII-1.

Comparative Example VII-4

Vulcan XC72 and elemental sulfur were mixed homogeneously at a weight ratio of 6:1, placed into a tube furnace, heated to 400° C. at a rate of 8° C./min, and then a thermostatic treatment was carried out for 3 h; and naturally cooled to obtain a sulfur doped carbon material.

Sample Characterization and Tests

FIG. 3M showed an XPS spectrum of sulfur of the sulfur-phosphorus doped carbon material of comparative example VII-4.

The X-ray photoelectron spectrum analyzer used was an ESCALB 220i-XL type ray electron spectrometer which is produced by VG Scientifc company which was equipped with Avantage V5.926 software, and the analysis and test conditions of the X-ray photoelectron spectrum analyzer were as follows: an excitation source of a monochromatized A1K $\alpha$ X-ray with a power of 330 W and a base vacuum of $3\times10<-9>$ mbar for analytical testing. In addition, the electron binding energy was corrected with the C1s peak (284.3 eV) of elemental carbon, and the late peak fitting software was XPSPEAK. The characteristic peaks of thiophenic sulfur, phosphorus and boron in the spectrogram were characteristic peak after peak fitting.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636 A), and processes and test conditions: the polarization curve LSV of the catalyst was tested at 1600

TABLE VII-1

| Sample (s) | Half-wave potential/V | ECSA/ m² g-1-Pt | Specific activity by weight/ A mg⁻¹-Pt | Reduction of specific activity by weight after 5000 cycles/% | Reduction of ECSA after 5000 cycles/% |
|---|---|---|---|---|---|
| Examples VII-5 | 0.90 | 44.05 | 0.168 | 5 | 8 |
| Examples VII-6 | 0.89 | 62.12 | 0.149 | 8 | 11 |
| Comparative Example VII-1 | 0.89 | 33.63 | 0.135 | 28 | 16 |
| Comparative Example VII-2 | 0.83 | 62.26 | 0.086 | 34 | 23 |
| Comparative examples VII-3 | 0.88 | 57.32 | 0.124 | 23 | 15 |

Implementing Solution VIII

The invention detects elements on the surface of a material by an X-ray photoelectron spectrum analyzer (XPS).

rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 1.0V to 1.5V in $O_2$ saturated 0.1M $HClO_4$, and then testing for LSV and ECSA as described above. During the test, the catalyst was produced into homogeneously dispersed slurry and coated on a glassy carbon electrode with a diameter of 5 mm, and the platinum content of the catalyst on the electrode was 3 μg-4 μg.

Resistivity test: a four-probe resistivity tester was used, instrument model KDY-1, and process and test conditions: the applied pressure was 3.9±0.03 MPa, and the current was 500±0.1 mA.

TG-MS test method: the test was carried out using a STA449F5-QMS403D modal thermogravimetry-mass spectrometer from NETZSCH company, Germany, wherein the ion source was an EI source, the quadrupole mass spectrometer adopted an MID mode, the transmission pipeline was a capillary tube with a length of 3 m, and the temperature used was 260° C.; the temperature range was 55° C.-1000° C., with a heating rate of 10° C./min.

VXC72 (Vulcan XC72, produced by Kabot company, USA) was purchased from Suzhou Yilongcheng energy science and technology Co., Ltd. The results of the tests by the instrument and process above showed that: the specific surface area was 258 $m^2/g$, the pore volume was 0.388 mL/g, the oxygen content by weight by XPS analysis was 8.72%, the $I_D/I_G$ was 1.02, and the resistivity was 1.22 Ω·m.

Ketjenblack ECP600JD (Ketjen black, produced by Lion company, Japan) was purchased from Suzhou Yilongcheng energy science and technology Co., Ltd. The results of the tests by the instrument and process above showed that: the specific surface area was 1362 $m^2/g$, the pore volume was 2.29 mL/g, the oxygen content by weight by XPS analysis was 6.9%, the $I_D/I_G$ was 1.25, and the resistivity was 1.31 Ω·m.

Black Pearls 2000 (produced by Kabot company, USA) was purchased from Suzhou Yilongcheng energy science and technology Co., Ltd. The results of the tests by the instrument and process above showed that: the specific surface area was 1479 $m^2/g$, the oxygen content by weight by XPS analysis was 9.13%, $I_D/I_G$ was 1.14, and the resistivity was 1.19 Ω·m.

A commercial platinum on carbon catalyst (a trademark of HISPEC4000, from Johnson Matthey company) was purchased from Alfa Aesar. The test result showed that: the platinum content by weight was 40.2%.

Example VIII-1

The example was provided to illustrate the preparation of a sulfur-phosphorus-boron doped carbon material.

1 g of Vulcan XC72 was immersed in 15 mL of aqueous solution with sodium borate at a concentration of 1 wt % and phosphoric acid at a concentration of 0.8 wt % for 20 h; dried in an oven at 100° C.; then placed into a tube furnace, heating the tube furnace to 450° C. at a rate of 5° C./min, followed by a thermostatic treatment for 2 h; and naturally cooled to obtain a boron-phosphorus doped carbon material.

The boron-phosphorus doped carbon material above and 0.167 g of elemental sulfur were mixed homogeneously, placed into a tube furnace, heated to 1200° C. at a rate of 8° C./min, and a thermostatic treatment was carried out for 3 h; and naturally cooled to obtain the sulfur-phosphorus-boron doped carbon material, designated as carbon support A.
Sample Characterization and Tests The sulfur content by weight by XPS analysis was 0.3%; the phosphorus content by weight by XPS analysis was 0.04%; the boron content by weight by XPS analysis was 0.5%; the specific surface area was 228 $m^2/g$; the resistivity was 1.26 Ω·m.

FIG. 4A showed an XPS spectrum of sulfur of the sulfur-phosphorus-boron doped carbon material of Example VIII-1.

FIG. 4B showed an XPS spectrum of phosphorus of the sulfur-phosphorus-boron doped carbon material of Example VIII-1.

FIG. 4C showed an XPS spectrum of boron of the sulfur-phosphorus-boron doped carbon material of Example VIII-1.

Example VIII-2

The example was provided to illustrate the preparation of a sulfur-phosphorus-boron doped carbon material.

10 mL of absolute ethanol was added into 1 g of Ketjenblack ECP600JD, and then 25 mL an aqueous solution with boric acid at a concentration of 0.3 wt % and sodium dihydrogen phosphate at a concentration of 0.3 wt % was added for immersion for 24 h; dried in an oven at 100° C.; then placed into a tube furnace, heating the tube furnace to 700° C. at a rate of 5° C./min, followed by a thermostatic treatment for 2 h; and naturally cooled to obtain a boron-phosphorus doped carbon material.

The boron-phosphorus carbon material above and 0.25 g of elemental sulfur were mixed homogeneously, placed into a tube furnace, heated to 1400° C. at a rate of 10° C./min, and a thermostatic treatment was carried out for 3 h; and naturally cooled to obtain the sulfur-phosphorus-boron doped carbon material, designated as carbon support B.
Sample Characterization and Tests The sulfur content by weight by XPS analysis was 0.4%; the phosphorus content by weight by XPS analysis was 0.02%; the boron content by weight by XPS analysis was 0.3%; the specific surface area was 1296 $m^2/g$; the resistivity was 1.36 Ω·m.

FIG. 4D showed an XPS spectrum of sulfur of the sulfur-phosphorus-boron doped carbon material of Example VIII-2.

FIG. 4E showed an XPS spectrum of phosphorus of the sulfur-phosphorus-boron doped carbon material of Example VIII-2.

FIG. 4F showed an XPS spectrum of boron of the sulfur-phosphorus-boron doped carbon material of Example

Example VIII-3

The example was provided to illustrate the preparation of a platinum on carbon catalyst of the present invention.

The carbon support A was dispersed into deionized water at a ratio of 250 mL water per gram of carbon support, 3.4 mmol of chloroplatinic acid per each gram of carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 40.3%.

FIG. 4G showed an XPS spectrum of sulfur of the platinum on carbon catalyst of Example VIII-3.

In the XPS analysis of the platinum on carbon catalyst, there was not a characteristic peak of $P_{2p}$ between 125 ev and 145 ev.

Signals of P, $P_2O_3$ and $P_2O_5$ were detected out in a TG-MS test of the platinum on carbon catalyst.

In the XPS analysis of the platinum on carbon catalyst, there was not a characteristic peak of $B_{1s}$ between 185 ev and 200 ev.

Signals of B and $B_2O_3$ were detected out in a TG-MS test of the platinum on carbon catalyst.

The results of the platinum on carbon catalyst performance test were shown in Table 1.

Example VIII-4

The example was provided to illustrate the preparation of a platinum on carbon catalyst of the present invention.

A platinum on carbon catalyst was produced according to the process of Example VIII-3, except that: 1.3 mmol chloroplatinic acid per gram of carbon support was added.
Sample Characterization and Tests The platinum content by weight of the platinum on carbon catalyst was 20.2%.

Signals of P, $P_2O_3$ and $P_2O_5$ were detected out in a TG-MS test of the platinum on carbon catalyst.

Signals of B and $B_2O_3$ were detected out in a TG-MS test of the platinum on carbon catalyst.

The results of the platinum on carbon catalyst performance test were shown in Table 1.

Example VIII-5

The example was provided to illustrate the preparation of the platinum on carbon catalyst of the present invention.

The carbon support B was dispersed into the solution at a ratio of 600 mL water and 600 mL ethylene glycol per gram of carbon support, 12 mmol of chloroplatinic acid per each gram of carbon support was added, and sodium acetate was added at a molar ratio of 2:1 of sodium acetate to chloroplatinic acid, ultrasonic dispersion was performed to form a suspension, and 1 mol/L of aqueous solution of sodium carbonate was added to allow the pH of the system was 10; the suspension was heated to 80° C., sodium borohydride was added while stirring for reduction reaction, wherein the molar ratio of the sodium borohydride to the chloroplatinic acid was 5:1, and the reaction was continued for 10 hours; the mixture obtained from the reaction was filtered, washed using deionized water until the pH value of the filtrate was neutral, filtered, and dried at 100° C. to obtain the platinum on carbon catalyst.
Sample Characterization and Tests The platinum content by weight of the platinum on carbon catalyst was 69.2%.

FIG. 4H showed an XPS spectrum of sulfur of the platinum on carbon catalyst of Example VIII-5.

FIG. 4I showed a TEM pattern of the platinum on carbon catalyst of Example VIII-5.

In the XPS analysis of the platinum on carbon catalyst, there was not a characteristic peak of $P_{2p}$ between 125 ev and 145 ev.

Signals of P, $P_2O_3$ and $P_2O_5$ were detected out in a TG-MS test of the platinum on carbon catalyst.

In the XPS analysis of the platinum on carbon catalyst, there is not a characteristic peak of $B_{1s}$ between 185 ev and 200 ev.

Signals of B and $B_2O_3$ were detected out in a TG-MS test of the platinum on carbon catalyst.

The results of the platinum on carbon catalyst performance test were shown in Table 1.

Comparative Example VIII-1

A platinum on carbon catalyst was produced according to the process of Example VIII-3, except that: the support was Vulcan XC 72.
Sample Characterization and Tests The platinum content by weight of the platinum on carbon catalyst was 40.1%.

The results of the platinum on carbon catalyst performance test were shown in Table 1.

Comparative Example VIII-2

A platinum on carbon catalyst was produced and tested according to the process of Example VIII-5, except that: the carbon support was Ketjenblack ECP600JD.
Sample Characterization and Tests The platinum content by weight of the platinum on carbon catalyst was 69.9%.

The results of the platinum on carbon catalyst performance test were shown in Table 1.

Comparative Example VIII-3

The platinum on carbon catalyst was a commercial catalyst purchased under the trademark of HISPEC 4000.
Sample Characterization and Tests The platinum content by weight of the platinum on carbon catalyst was 40.2%.

The results of the platinum on carbon catalyst performance test were shown in Table 1.

Comparative Example VIII-4

The comparative example was provided to illustrate the preparation of a phosphorus doped carbon material.

1 g of Vulcan XC72 was immersed in 15 ml of 0.8 wt % aqueous phosphoric acid for 16 h; dried in an oven at 100° C.; then placed into a tube furnace, heating the tube furnace to 400° C. at a rate of 8° C./min, and a thermostatic treatment was carried out for 2 h; and naturally cooled to obtain a phosphorus doped carbon material.
Sample Characterization and Tests FIG. 4J showed an XPS spectrum of phosphorus of the sulfur-phosphorus-boron doped carbon material of comparative example VIII-4.

Comparative Example VIII-5

The comparative example was provided to illustrate the preparation of a boron doped carbon material.

1 g of Vulcan XC72 was immersed in 15 ml of 4.5 wt % aqueous sodium borate for 16 h; dried in an oven at 100° C.; then placed into a tube furnace, heating the tube furnace to 400° C. at a rate of 10° C./min, and a thermostatic treatment was carried out for 3 h; and naturally cooled to obtain a boron doped carbon material.

65 66

Sample Characterization and Tests

FIG. 4K showed an XPS spectrum of boron of the sulfur-phosphorus-boron doped carbon material of comparative example VIII-5.

Comparative Example VIII-6

The comparative example was provided to illustrate the preparation of a sulfur doped carbon material.

1 g of Ketjenblack ECP600JD and 0.25 g of elemental sulfur were mixed homogeneously, placed into a tube furnace, heated to 500° C. at a rate of 5° C./min, and a thermostatic treatment was carried out for 3 h; and naturally cooled to obtain a sulfur doped carbon material.

Sample Characterization and Tests

FIG. 4L showed an XPS spectrum of sulfur of the sulfur-phosphorus-boron doped carbon material of comparative example VIII-6.

6. The carbon-supported platinum group metal catalyst according to claim 1, wherein the dopant for the support further comprises phosphorous.

7. The carbon-supported platinum group metal catalyst according to claim 6, wherein: in the P2p spectrum peaks by XPS analysis, no characteristic peak exists between 125 ev and 145 ev; and signals of P, $P_2O_3$ and $P_2O_5$ are detectable by a TG-MS test.

8. The carbon-supported platinum group metal catalyst according to claim 1, wherein the dopant of the support further comprises boron and phosphorous.

9. The carbon-supported platinum group metal catalyst according to claim 8, wherein, in an XPS analysis, no characteristic peak of B1s exists between 185 ev and 200 ev and no characteristic peak of P2p exists between 125 ev and 145 ev; and signals of $B_2O_3$ and B or signals of P, $P_2O_3$ and $P_2O_5$ are detectable by a TG-MS test.

TABLE 1

| Sample (s) | Half-wave potential/V | Half-wave potential after 5000 cycles/V | ECSA/ $m^2$ $g-1$-Pt | Specific activity by weight/A $mg^{-1}$-Pt | Reduction of specific activity by weight after 5000 cycles/% | Reduction of ECSA after 5000 cycles/% |
|---|---|---|---|---|---|---|
| Example VIII-3 | 0.90 | 0.88 | 45.71 | 0.169 | 21 | 13 |
| Example VIII-4 | 0.91 | 0.90 | 55.26 | 0.197 | 15 | 8 |
| Example VIII-5 | 0.88 | 0.86 | 87.95 | 0.148 | 18 | 10 |
| Comparative Example VIII-1 | 0.89 | 0.87 | 35.65 | 0.141 | 42 | 31 |
| Comparative Example VIII-2 | 0.85 | 0.82 | 62.26 | 0.112 | 38 | 25 |
| Comparative Example VIII-3 | 0.88 | 0.86 | 59.43 | 0.128 | 31 | 20 |

The invention claimed is:

1. A carbon-supported platinum group metal catalyst, comprising:

a support that is a conductive carbon black doped with a dopant comprising sulfur; and a platinum group metal that is 20% to 70% of a total weight of the catalyst, wherein, among S2P spectrum peaks analyzed by XPS, a peak area of peaks between 162 ev and 166 ev accounts for greater than 92% of a total peak area of peaks between 160 ev and 170 ev.

2. The carbon-supported platinum group metal catalyst according to claim 1, wherein, a peak area of a characteristic peak located outside the range from 162 ev to 166 ev accounts for less than 5% of the total peak area between 160 ev to 170 ev.

3. The carbon-supported platinum group metal catalyst according to claim 1, wherein bimodal peaks exist between 162 ev and 166 ev.

4. The carbon-supported platinum group metal catalyst according to claim 1, wherein the dopant for the support further comprises boron.

5. The carbon-supported platinum group metal catalyst according to claim 4, wherein: in the B1s spectrum peaks by XPS analysis, no characteristic peak exists between 185 ev and 200 ev; and signals of $B_2O_3$ and B are detectable by a TG-MS test.

10. The carbon-supported platinum group metal catalyst according to claim 1, wherein the platinum group metal is selected from platinum (Pt), palladium (Pd), rhodium (Rh), iridium (Ir), osmium (Os), and ruthenium (Ru).

11. The carbon-supported platinum group metal catalyst according to claim 1, wherein the carbon-supported platinum group metal catalyst has a resistivity of <10 Ω·m.

12. A hydrogen fuel cell, comprising an anode and a cathode, wherein the anode, the cathode, or both comprises the carbon-supported platinum group metal catalyst according to claim 1.

13. The carbon-supported platinum group metal catalyst according to claim 1, wherein between 160 ev and 170 ev in the $S_{2P}$ spectrum peaks analyzed by XPS, the peak area between 162 ev and 166 ev accounts for greater than 98%; the carbon-supported platinum group metal catalyst comprises the platinum group metal in a content by weight of 45% to 65%.

14. The carbon-supported platinum group metal catalyst according to claim 1, wherein, between 160 eV and 170 eV, there is only a characteristic peak between 162 eV and 166 eV being present.

15. The carbon-supported platinum group metal catalyst according to claim 1, wherein the platinum group metal is platinum.

* * * * *